(12) United States Patent  
Silverbrook

(10) Patent No.: US 7,568,788 B2  
(45) Date of Patent: Aug. 4, 2009

(54) PRINTHEAD WITH BARRIER AT CHAMBER INLET

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 11/926,109

(22) Filed: Oct. 28, 2007

(65) Prior Publication Data

US 2008/0043066 A1  Feb. 21, 2008

Related U.S. Application Data

(63) Continuation of application No. 11/778,572, filed on Jul. 16, 2007, which is a continuation of application No. 11/349,074, filed on Feb. 8, 2006, now Pat. No. 7,255,424, which is a continuation of application No. 10/982,789, filed on Nov. 8, 2004, now Pat. No. 7,086,720, which is a continuation of application No. 10/421,823, filed on Apr. 24, 2003, now Pat. No. 6,830,316, which is a continuation of application No. 09/113,122, filed on Jul. 10, 1998, now Pat. No. 6,557,977.

(30) Foreign Application Priority Data

Jul. 15, 1997 (AU) .................... PO7991  
Jul. 15, 1997 (AU) .................... PO8004

(51) Int. Cl.  
*B41J 2/04* (2006.01)  
*B41J 2/05* (2006.01)

(52) U.S. Cl. ......................... 347/54; 347/65

(58) Field of Classification Search .................... 347/54, 347/56, 65  
See application file for complete search history.

(56) References Cited

U.S. PATENT DOCUMENTS

| 4,032,929 A | 6/1977 | Fischbeck et al. |
| 4,210,920 A | 7/1980 | Burnett et al. |
| 4,460,905 A | 7/1984 | Thomas |
| 4,499,480 A * | 2/1985 | Takatori et al. ............... 347/42 |
| 4,576,111 A | 3/1986 | Slomianny |
| 4,633,267 A | 12/1986 | Meinhof |
| 4,684,913 A | 8/1987 | Yaeger |
| 4,723,131 A | 2/1988 | Droit |
| 4,737,802 A | 4/1988 | Mielke |
| 5,463,413 A * | 10/1995 | Ho et al. ........................ 347/65 |
| 5,719,604 A | 2/1998 | Inui et al. |
| 5,828,275 A | 10/1998 | Kita et al. |
| 5,903,380 A | 5/1999 | Motamedi et al. |
| 5,982,521 A | 11/1999 | Bessho et al. |

(Continued)

FOREIGN PATENT DOCUMENTS

DE  3245283 A  6/1984

(Continued)

*Primary Examiner*—An H Do

(57) ABSTRACT

An inkjet printhead that has an array of ink ejection devices, each ink ejection device having a chamber for holding a quantity of ink, an inlet in fluid communication with the chamber, an actuator disposed in the chambers respectively, a nozzle aperture in fluid communication with each of the chambers respectively. The inlet defines a flow path into the chamber and has a barrier structure extending through the flow path. The barrier structure creates a flow constriction that traps contaminant in the ink flow.

15 Claims, 32 Drawing Sheets

U.S. PATENT DOCUMENTS

| | | |
|---|---|---|
| 6,174,050 B1 | 1/2001 | Kashino et al. |
| 6,481,821 B1 | 11/2002 | Yun et al. |
| 6,557,977 B1 | 5/2003 | Silverbrook |
| 6,574,958 B1 | 6/2003 | MacGregor |
| 7,073,890 B2 * | 7/2006 | Cabal et al. .................. 347/54 |

FOREIGN PATENT DOCUMENTS

| | | |
|---|---|---|
| DE | 4139731 | 6/1993 |
| EP | 0189794 A | 8/1986 |
| EP | 0371763 A2 | 6/1990 |
| EP | 0417673 A | 3/1991 |
| EP | 0479441 A | 4/1992 |
| EP | 0671271 A | 9/1995 |
| GB | 1569425 A | 6/1980 |
| GB | 2262152 | 6/1993 |
| JP | 55-059972 A | 7/1980 |
| JP | 59-093356 A | 5/1984 |
| JP | 60-131254 A | 7/1985 |
| JP | 03-202351 A | 12/1989 |
| JP | 02-034342 A | 2/1990 |
| JP | 02-150353 A | 6/1990 |
| JP | 02-219655 A | 9/1990 |
| JP | 02-265751 A | 10/1990 |
| JP | 02-273241 A | 11/1990 |
| JP | 03-065349 A | 3/1991 |
| JP | 04-001051 A | 1/1992 |
| JP | 04-126255 A | 4/1992 |
| JP | 04-129745 A | 4/1992 |
| JP | 04-357039 A | 12/1992 |
| JP | 04-368851 A | 12/1992 |
| JP | 05-318724 A | 12/1993 |
| JP | 06-106725 A | 4/1994 |
| JP | 06-134985 A | 5/1994 |
| JP | 06-336011 A | 12/1994 |
| SE | 9601403 | 10/1997 |
| WO | WO 86/05722 | 10/1986 |
| WO | WO 97/12689 A | 4/1997 |

* cited by examiner

PRINTHEAD WITH BARRIER AT CHAMBER INLET

CROSS REFERENCE TO RELATED APPLICATION

The present application is a continuation of U.S. application Ser. No. 11/778,572 filed on Jul. 16, 2007, which is a continuation of U.S. application Ser. No. 11/349,074 filed on Feb. 8, 2006, now issued U.S. Pat. No. 7,255,424, which is a continuation of U.S. application Ser. No. 10/982,789 filed on Nov. 8, 2004, now issued U.S. Pat. No. 7,086,720, which is a continuation of U.S. application Ser. No. 10/421,823 filed on Apr. 24, 2003, now issued U.S. Pat. No. 6,830,316, which is a continuation of U.S. application Ser. No. 09/113,122 filed on Jul. 10, 1998, now issued U.S. Pat. No. 6,557,977, all of which are herein incorporated by reference.

CROSS REFERENCES TO RELATED APPLICATIONS

The following US Patents and US Patent Applications are hereby incorporated by cross-reference.

| U.S. Pat. No./PATENT APPLICATION Incorporated by Reference: | Docket No. |
| --- | --- |
| 6750901 | ART01US |
| 6476863 | ART02US |
| 6788336 | ART03US |
| 6322181 | ART04US |
| 6597817 | ART06US |
| 6227648 | ART07US |
| 6727948 | ART08US |
| 6690419 | ART09US |
| 6727951 | ART10US |
| 6196541 | ART13US |
| 6195150 | ART15US |
| 6362868 | ART16US |
| 6831681 | ART18US |
| 6431669 | ART19US |
| 6362869 | ART20US |
| 6472052 | ART21US |
| 6356715 | ART22US |
| 6894694 | ART24US |
| 6636216 | ART25US |
| 6366693 | ART26US |
| 6329990 | ART27US |
| 6459495 | ART29US |
| 6137500 | ART30US |
| 6690416 | ART31US |
| 7050143 | ART32US |
| 6398328 | ART33US |
| 7110024 | ART34US |
| 6431704 | ART38US |
| 6879341 | ART42US |
| 6415054 | ART43US |
| 6665454 | ART45US |
| 6542645 | ART46US |
| 6486886 | ART47US |
| 6381361 | ART48US |
| 6317192 | ART50US |
| 6850274 | ART51US |
| 09/113054 | ART52US |
| 6646757 | ART53US |
| 6624848 | ART56US |
| 6357135 | ART57US |
| 6271931 | ART59US |
| 6353772 | ART60US |
| 6106147 | ART61US |
| 6665008 | ART62US |
| 6304291 | ART63US |
| 6305770 | ART65US |

-continued

| U.S. Pat. No./PATENT APPLICATION Incorporated by Reference: | Docket No. |
| --- | --- |
| 6289262 | ART66US |
| 6315200 | ART68US |
| 6217165 | ART69US |
| 6786420 | DOT01US |
| 6350023 | FLUID01US |
| 6318849 | FLUID02US |
| 6227652 | IJ01US |
| 6213588 | IJ02US |
| 6213589 | IJ03US |
| 6231163 | IJ04US |
| 6247795 | IJ05US |
| 6394581 | IJ06US |
| 6244691 | IJ07US |
| 6257704 | IJ08US |
| 6416168 | IJ09US |
| 6220694 | IJ10US |
| 6257705 | IJ11US |
| 6247794 | IJ12US |
| 6234610 | IJ13US |
| 6247793 | IJ14US |
| 6264306 | IJ15US |
| 6241342 | IJ16US |
| 6247792 | IJ17US |
| 6264307 | IJ18US |
| 6254220 | IJ19US |
| 6234611 | IJ20US |
| 6302528 | IJ21US |
| 6283582 | IJ22US |
| 6239821 | IJ23US |
| 6338547 | IJ24US |
| 6247796 | IJ25US |
| 6557977 | IJ26US |
| 6390603 | IJ27US |
| 6362843 | IJ28US |
| 6293653 | IJ29US |
| 6312107 | IJ30US |
| 6227653 | IJ31US |
| 6234609 | IJ32US |
| 6238040 | IJ33US |
| 6188415 | IJ34US |
| 6227654 | IJ35US |
| 6209989 | IJ36US |
| 6247791 | IJ37US |
| 6336710 | IJ38US |
| 6217153 | IJ39US |
| 6416167 | IJ40US |
| 6243113 | IJ41US |
| 6283581 | IJ42US |
| 6247790 | IJ43US |
| 6260953 | IJ44US |
| 6267469 | IJ45US |
| 6224780 | IJM01US |
| 6235212 | IJM02US |
| 6280643 | IJM03US |
| 6284147 | IJM04US |
| 6214244 | IJM05US |
| 6071750 | IJM06US |
| 6267905 | IJM07US |
| 6251298 | IJM08US |
| 6258285 | IJM09US |
| 6225138 | IJM10US |
| 6241904 | IJM11US |
| 6299786 | IJM12US |
| 6866789 | IJM13US |
| 6231773 | IJM14US |
| 6190931 | IJM15US |
| 6248249 | IJM16US |
| 6290862 | IJM17US |
| 6241906 | IJM18US |
| 6565762 | IJM19US |
| 6241905 | IJM20US |
| 6451216 | IJM21US |
| 6231772 | IJM22US |
| 6274056 | IJM23US |
| 6290861 | IJM24US |

-continued

| U.S. Pat. No./PATENT APPLICATION Incorporated by Reference: | Docket No. |
|---|---|
| 6248248 | IJM25US |
| 6306671 | IJM26US |
| 6331258 | IJM27US |
| 6110754 | IJM28US |
| 6294101 | IJM29US |
| 6416679 | IJM30US |
| 6264849 | IJM31US |
| 6254793 | IJM32US |
| 6235211 | IJM35US |
| 6491833 | IJM36US |
| 6264850 | IJM37US |
| 6258284 | IJM38US |
| 6312615 | IJM39US |
| 6228668 | IJM40US |
| 6180427 | IJM41US |
| 6171875 | IJM42US |
| 6267904 | IJM43US |
| 6245247 | IJM44US |
| 6315914 | IJM45US |
| 6231148 | IR01US |
| 6293658 | IR04US |
| 6614560 | IR05US |
| 6238033 | IR06US |
| 6312070 | IR10US |
| 6238111 | IR12US |
| 6378970 | IR16US |
| 6196739 | IR17US |
| 6270182 | IR19US |
| 6152619 | IR20US |
| 6087638 | MEMS02US |
| 6340222 | MEMS03US |
| 6041600 | MEMS05US |
| 6299300 | MEMS06US |
| 6067797 | MEMS07US |
| 6286935 | MEMS09US |
| 6044646 | MEMS10US |
| 6382769 | MEMS13US |

FIELD OF THE INVENTION

This invention relates to the use of a shape memory alloy in a micro-electromechanical fluid ejection device.

The present invention also relates to ink jet printing and in particular discloses a shape memory alloy ink jet printer.

The present invention further relates to the field of drop on demand ink jet printing.

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques on ink jet printing have been invented. For a survey of the field, reference is made to an article by J Moore, "Non-Impact Printing: Introduction and Historical Perspective", Output Hard Copy Devices, Editors R Dubeck and S Sherr, pages 207-220 (1988).

Ink Jet printers themselves come in many different types. The utilisation of a continuous stream ink in ink jet printing appears to date back to at least 1929 wherein U.S. Pat. No. 1,941,001 by Hansell discloses a simple form of continuous stream electro-static ink jet printing.

U.S. Pat. No. 3,596,275 by Sweet also discloses a process of a continuous ink jet printing including the step wherein the ink jet stream is modulated by a high frequency electro-static field so as to cause drop separation. This technique is still utilized by several manufacturers including Elmjet and Scitex (see also U.S. Pat. No. 3,373,437 by Sweet et al)

Piezoelectric ink jet printers are also one form of commonly utilized ink jet printing device. Piezoelectric systems are disclosed by Kyser et. al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezoelectric operation, Howkins in U.S. Pat. No. 4,459,601 discloses a piezoelectric push mode actuation of the ink jet stream and Fischbeck in U.S. Pat. No. 4,584,590 which discloses a shear mode type of piezoelectric transducer element.

Recently, thermal ink jet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclosed ink jet printing techniques rely upon the activation of an electrothermal actuator which results in the creation of a bubble in a constricted space, such as a nozzle, which thereby causes the ejection of ink from an aperture connected to the confined space onto a relevant print media. Manufacturers such as Canon and Hewlett Packard manufacture printing devices utilizing the electro-thermal actuator.

As can be seen from the foregoing, many different types of printing technologies are available. Ideally, a printing technology should have a number of desirable attributes. These include inexpensive construction and operation, high-speed operation, safe and continuous long-term operation etc. Each technology may have its own advantages and disadvantages in the areas of cost, speed, quality, reliability, power usage, simplicity of construction operation, durability and consumables.

SUMMARY OF THE INVENTION

It is an object of the present invention to provide an alternative arrangement of a buckle/diaphragm actuated ink jet print head, simple and compact in construction however, allowing for a higher speed operation of the ink jet head through the utilization of substantially less energy per ink drop ejected.

It is another object to provide for a new form of ink jet printing device that utilizes a shape memory alloy in its activation method.

According to a first aspect of the invention, there is provided a printhead for an inkjet printer, the printhead comprising:

an array of ink ejection devices, each ink ejection device having a chamber for holding a quantity of ink, an inlet in fluid communication with the chamber, an actuator disposed in the chambers respectively, a nozzle aperture in fluid communication with each of the chambers respectively; wherein, the inlet defines a flow path into the chamber and has a barrier structure extending through the flow path.

Preferably, the barrier structure has column features extending through the flow path.

Preferably the column features are integrally formed with one side of the inlet.

Preferably the nozzle is formed in a nozzle plate on the printhead exterior, and the column features are integrally formed with the nozzle plate.

Preferably the actuator is configured to displace a surface within the chamber to eject ink from the nozzle.

Preferably the actuator has a heater element for displacing the surface using thermal expansion.

Preferably the surface is positioned in the chamber such that it opposes the nozzle and the flow path from the inlet feeds ink between the nozzle and the surface of the actuator.

Preferably the surface defines a wall of the chamber opposite the nozzle.

Preferably the surface is formed from material including polytetrafluoroethylene.

Preferably, during use, the surface reduces the chamber volume to eject ink from the nozzle.

Preferably, during use, the surface increases the chamber volume as the actuator returns to its quiescent position after ejecting ink in order to draw refill ink through the barrier structure in the inlet.

Preferably the surface has a quadrilateral geometry and is fixed at two opposing parallel sides such that the surface buckles into the chamber when during actuation, and flattens when returning to its quiescent state.

Preferably the heater element is a conductor with a serpentine geometry extending across most of the surface.

Preferably, the printhead further comprising an air space on non-ink contacting side of the surface.

Preferably the air space is vented to atmosphere.

Preferably the non-ink contacting side of the surface is hydrophobic for maintaining the air space.

Preferably the barrier structure creates a flow restriction for the refill ink flow to damp oscillations in ink in the chamber immediately after refill.

Preferably the barrier structure in a grille for filtering contaminants out of the ink flow into the chamber.

In another aspect, the invention provides a micro-electromechanical fluid ejection device which comprises a wafer substrate;

drive circuitry positioned on the wafer substrate;

a nozzle chamber structure arranged on the wafer substrate to define a nozzle chamber and a fluid ejection port in fluid communication with the nozzle chamber; and a fluid ejection member that is operatively positioned with respect to the nozzle chamber such that displacement of the fluid ejection member results in the ejection of fluid from the fluid ejection port, wherein at least a portion of the fluid ejection member is of a shape memory alloy which defines an electrical heating circuit and which is connected to the drive circuitry to be heated by an electrical current received from the drive circuitry, the shape memory alloy being displaceable towards the fluid ejection port when heated to transform from its martensitic phase to its austenitic phase to eject fluid from the fluid ejection port.

The nozzle chamber structure may be defined partly by the substrate which is etched to define walls of the nozzle chamber. The substrate may include a structural layer which is etched to define the fluid ejection port.

The heating circuit defined by the shape memory alloy may be interposed between a pair of structural layers. One of the structural layers may be pre-stressed so that, upon release, the fluid ejection member is drawn away from the fluid ejection port while the shape memory alloy is in the martensitic phase.

The structural layers may be of a resiliently flexible material which is configured so that the shape memory alloy can be drawn away from the fluid ejection port when the heating circuit cools and the alloy becomes martensitic.

The heating circuit defined by the shape memory alloy may trace a serpentine path from one via to another, the via providing an electrical connection to the heating circuit.

The nozzle chamber may be in fluid communication with a fluid reservoir. One of the structural layers may form part of a fluid passivation layer that covers the drive circuitry layer to protect the drive circuitry layer from fluid damage.

In accordance with a second aspect of the present invention there is provided a method of ejecting ink from a chamber comprising the steps of: a) providing a cantilevered beam actuator incorporating a shape memory alloy; and b) transforming said shape memory alloy from its martensitic phase to its austenitic phase or vice versa to cause the ink to eject from said chamber. Further, the actuator comprises a conductive shape memory alloy panel in a quiescent state and which transfers to an ink ejection state upon heating thereby causing said ink ejection from the chamber. Preferably, the heating occurs by means of passing a current through the shape memory alloy. The chamber is formed from a crystallographic etch of a silicon wafer so as to have one surface of the chamber substantially formed by the actuator. Advantageously, the actuator is formed from a conductive shape memory alloy arranged in a serpentine form and is attached to one wall of the chamber opposite a nozzle port from which ink is ejected. Further, the back etching of a silicon wafer to the epitaxial layer and etching a nozzle porthole in the epitaxial layer forms the nozzle port. The crystallographic etch includes providing side wall slots of non-etched layers of a processed silicon wafer so as to extend the dimensions of the chamber as a result of the crystallographic etch process. Preferably, the shape memory alloy comprises nickel titanium alloy.

By way of background, reference is made to U.S. patent application Ser. No. 09/113,097 by the applicant. It is an object of the invention of that application to provide an alternative form of drop on demand ink jet printing utilising a reverse spring lever arrangement to actuate the ejection of ink from a nozzle chamber.

In accordance with a third aspect of that invention, there is provided an ink jet printing nozzle apparatus with a connected ink supply chamber, the apparatus comprising an ink ejection means having one surface in fluid communication with the ink in the nozzle chamber, a recoil means connected to the ink ejection means and a first actuator means connected to the ink ejection means. The method of ejecting ink from the ink chamber comprises the steps of activation of the first actuator means which drives the ink ejection means from a quiescent position to a pre-firing position and deactivation of the first actuator means, causing the recoil means to drive the ink ejection means to eject ink from the nozzle chamber through the ink ejection port. Further, the recoil means includes a resilient member and the movement of the first actuator results in resilient movement of this recoil means and the driving of the ink ejection means comprises the resilient member acting upon the ink ejection means. Preferably, the first actuator means comprises an electromagnetic actuator and the recoil means comprises a torsional spring. The ink ejection means and the first actuator are interconnected in a cantilever arrangement wherein small movements of the first actuator means result in larger movements of the ink ejection means. Advantageously, the recoil means is located substantially at the pivot point of the cantilever construction. The first actuator includes a solenoid coil surrounded by a magnetic actuator having a first mixed magnetic pole and a second moveable magnetic pole, such that, upon activation of the coil, the poles undergo movement relative to one another with the moveable magnetic pole being connected to the actuator side of the cantilever construction. Preferably, the moveable magnetic pole includes a plurality of slots for the flow of ink through the pole upon movement. The ink ejection means comprises a piston or plunger having a surface substantially mating with at least one surface of the nozzle chamber.

Also by way of background, reference is made to U.S. patent application Ser. No. 09/113,061 by the applicant. It is an object of the invention of that application to provide for an alternative form of ink jet printer which uses a linear stepper actuator to eject ink from a nozzle chamber.

In accordance with a fourth aspect of that invention, an ink jet nozzle arrangement is presented comprising: a nozzle chamber having an ink ejection port for the ejection of ink, an ink supply reservoir for supplying ink to the nozzle chamber, a plunger located within the nozzle chamber and further, a linear stepper actuator interconnected to the plunger and adapted to actuate the plunger so as to cause the ejection of ink from the ink ejection port. At least one surface of the plunger located alongside a wall of the nozzle chamber is hydrophobic. Preferably, the linear actuator interconnected to the plunger in the nozzle chamber is driven in three phases by a series of electromagnets. Preferably, a series of twelve electromagnets is arranged in opposing pairs alongside the linear actuator. Further, each phase is duplicated resulting in four electromagnets for each phase. The ink jet nozzle has an open wall along a back surface of the plunger which comprises a series of posts adapted to form a filter to filter ink flowing through the open wall into the nozzle chamber. The linear actuator construction includes a guide at the end opposite to the nozzle chamber for guiding the linear actuator.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment, shape memory materials are utilised to construct an actuator suitable for injecting ink from the nozzle of an ink chamber.

Figure 1:
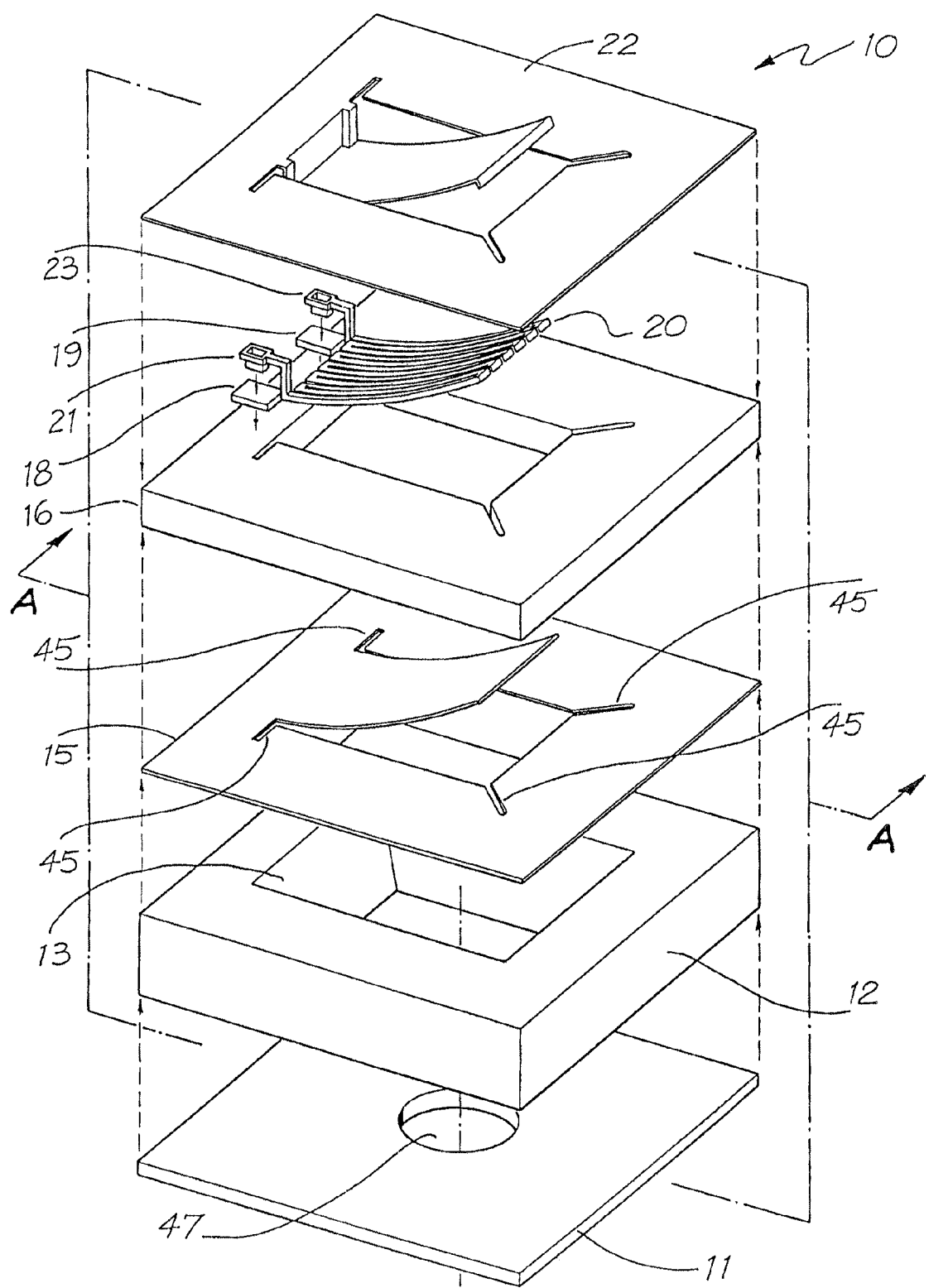
FIG. 1 is an exploded, perspective view of a single ink jet nozzle as constructed in accordance with the preferred embodiment of the invention.

Turning to FIG. 1, there is illustrated an exploded perspective view 10 of a single ink jet nozzle as constructed in accordance with the preferred embodiment. The ink jet nozzle 10 is constructed from a silicon wafer base utilizing back etching of the wafer to a boron doped epitaxial layer. Hence, the ink jet nozzle 10 comprises a lower layer 11 which is constructed from boron-doped silicon. The boron doped silicon layer is also utilized as a crystallographic etch stop layer. The next layer comprises the silicon layer 12 that includes a crystallographic pit that defines a nozzle chamber 13 having side walls etched at the conventional angle of 54.74 degrees. The layer 12 also includes the various required circuitry and transistors for example, a CMOS layer (not shown). After this, a 0.5-micron thick thermal silicon oxide layer 15 is grown on top of the silicon wafer 12.

After this, come various layers which can comprise two-level metal CMOS process layers which provide the metal interconnect for the CMOS transistors formed within the layer 12. The various metal pathways etc. are not shown in FIG. 1 but for two metal interconnects 18, 19 which provide interconnection between a shape memory alloy layer 20 and the CMOS metal layers 16. The shape memory metal layer is next and is shaped in the form of a serpentine coil to be heated by end interconnect/via portions 21,23. A top nitride layer 22 is provided for overall passivation and protection of lower layers in addition to providing a means of inducing tensile stress to curl the shape memory alloy layer 20 in its quiescent state.

The preferred embodiment relies upon the thermal transition of a shape memory alloy 20 (SMA) from its martensitic phase to its austenitic phase. The basis of a shape memory effect is a martensitic transformation from a thermoelastic martensite at a relatively low temperature to an austenite at a higher temperature. The thermal transition is achieved by passing an electrical current through the SMA. The layer 20 is suspended at the entrance to a nozzle chamber connected via leads 18, 19 to the layers 16.

Figure 2:
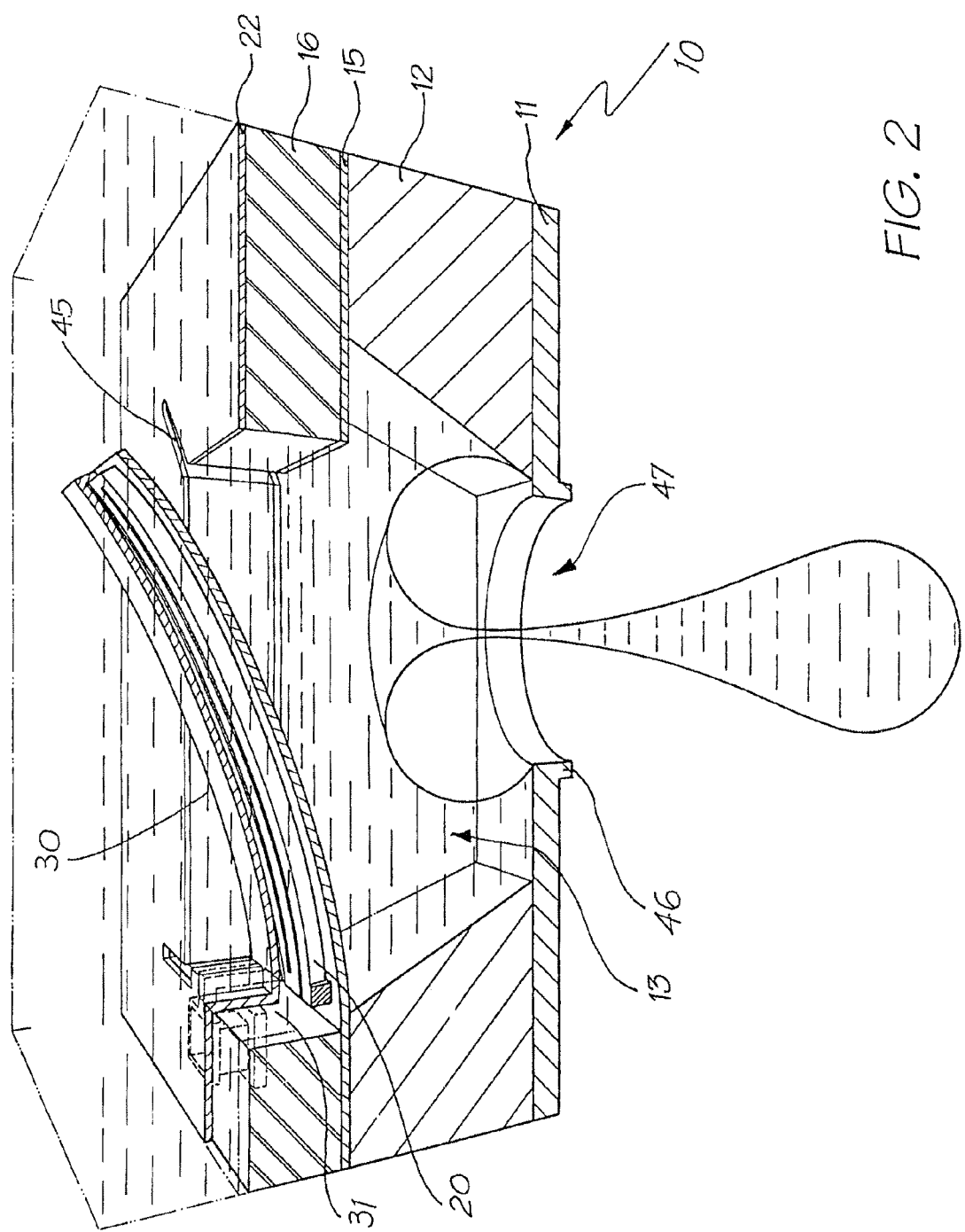
FIG. 2 is a cross-sectional view of a single ink jet nozzle in its quiescent state taken along line A-A in FIG. 1.
Figure 3:
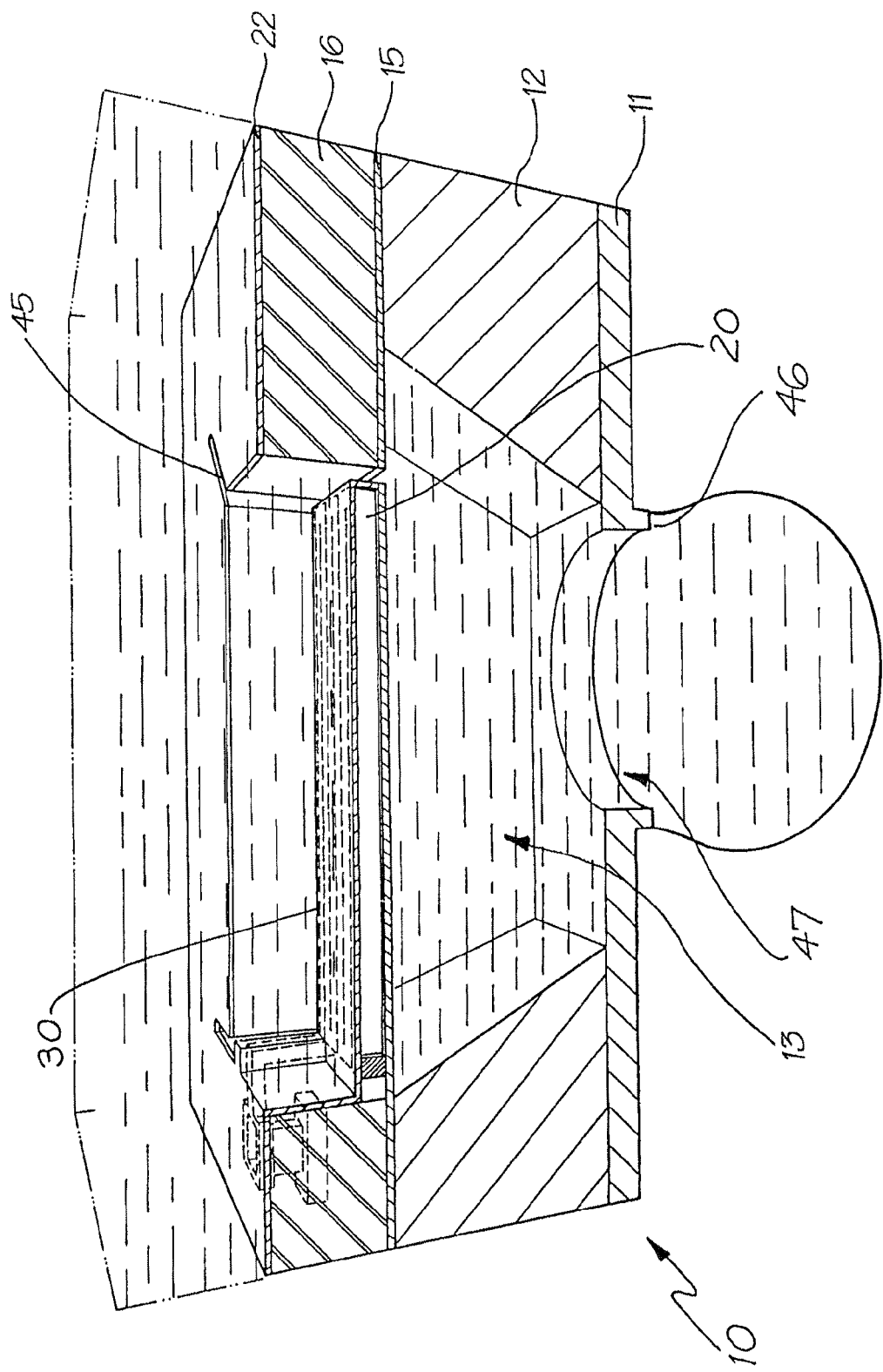
FIG. 3 is a top cross sectional view of a single ink jet nozzle in its actuated state taken along line A-A in FIG. 1.

In FIG. 2, there is shown a cross-section of a single nozzle 10 when in its quiescent state, the section being taken through the line A-A of FIG. 1. An actuator 30 that includes the layers 20, 22, is bent away from a nozzle port 47 when in its quiescent state. In FIG. 3, there is shown a corresponding cross-section for the nozzle 10 when in an actuated state. When energized, the actuator 30 straightens, with the corresponding result that the ink is pushed out of the nozzle. The process of energizing the actuator 30 requires supplying enough energy to raise the SMA layer 20 above its transition temperature so that the SMA layer 20 moves as it is transformed into its austenitic phase.

The SMA martensitic phase must be pre-stressed to achieve a different shape from the austenitic phase. For printheads with many thousands of nozzles, it is important to achieve this pre-stressing in a bulk manner. This is achieved by depositing the layer of silicon nitride 22 using Plasma Enhanced Chemical Vapour Deposition (PECVD) at around 300° C. over the SMA layer. The deposition occurs while the SMA is in the austenitic shape. After the printhead cools to room temperature the substrate under the SMA bend actuator is removed by chemical etching of a sacrificial substance. The silicon nitride layer 22 is thus placed under tensile stress and curls away from the nozzle port 47. The weak martensitic phase of the SMA provides little resistance to this curl. When the SMA is heated to its austenitic phase, it returns to the flat shape into which it was annealed during the nitride deposition. The transformation is rapid enough to result in the ejection of ink from the nozzle chamber.

There is one SMA bend actuator 30 for each nozzle. One end 31 of the SMA bend actuator 30 is mechanically connected to the substrate. The other end is free to move under the stresses inherent in the layers.

Returning to FIG. 1, the actuator layer is composed of three layers:

1. The $SiO_2$ lower layer 15. This layer acts as a stress 'reference' for the nitride tensile layer. It also protects the SMA from the crystallographic silicon etch that forms the nozzle chamber. This layer can be formed as part of the standard CMOS process for the active electronics of the printhead.

2. An SMA heater layer 20. An SMA such as a nickel titanium (NiTi) alloy is deposited and etched into a serpentine form to increase the electrical resistance so that the SMA is heated when an electrical current is passed through the SMA.

3. A silicon nitride top layer 22. This is a thin layer of high stiffness which is deposited using PECVD. The nitride stoichiometry is adjusted to achieve a layer with significant tensile stress at room temperature relative to the $SiO_2$ lower layer. Its purpose is to bend the actuator at the low temperature martensitic phase, away from the nozzle port 47.

As noted previously, the ink jet nozzle of FIG. 1 can be constructed by utilizing a silicon wafer having a buried boron epitaxial layer. The 0.5 micron thick dioxide layer 15 is then formed having side slots 45 which are utilized in a subsequent crystallographic etch. Next, the various CMOS layers 16 are formed including drive and control circuitry (not shown). The SMA layer 20 is then created on top of layers 15/16 and is connected with the drive circuitry. The silicon nitride layer 22 is then formed on the layer 20. Each of the layers 15, 16, 22 includes the various slots 45 which are utilized in a subsequent crystallographic etch. The silicon wafer is subsequently thinned by means of back etching with the etch stop being the boron-doped silicon layer 11. Subsequent etching of the layer 11 forms the nozzle port 47 and a nozzle rim 46. A nozzle chamber is formed by means of a crystallographic etch with the slots 45 defining the extent of the etch within the silicon oxide layer 12.

A large array of nozzles can be formed on the same wafer which in turn is attached to an ink chamber for filling the nozzle chambers.

One form of detailed manufacturing process which can be used to fabricate monolithic ink jet printheads operating in accordance with the principles taught by the present embodiment can proceed utilizing the following steps:

1. Using a double-sided polished wafer 50, deposit 3 microns of epitaxial silicon 11 heavily doped with boron.

2. Deposit 10 microns of epitaxial silicon 12, either p-type or n-type, depending on the CMOS process used.

Figure 4:
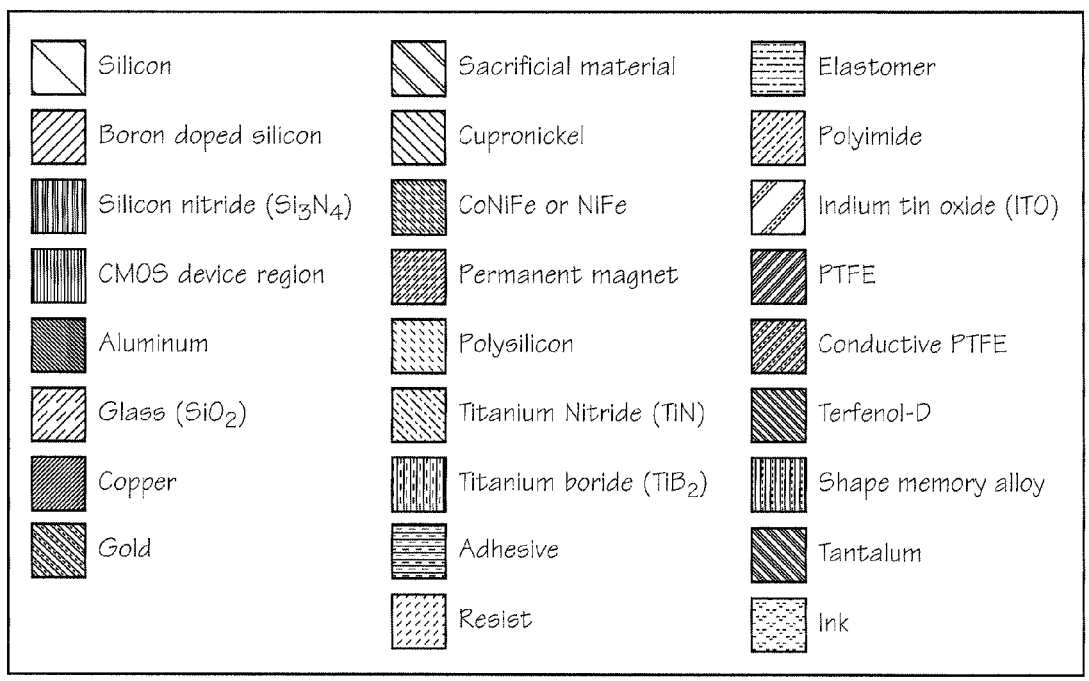
FIG. 4 provides a legend of the materials indicated in FIG. 5 to 15.
Figure 5:
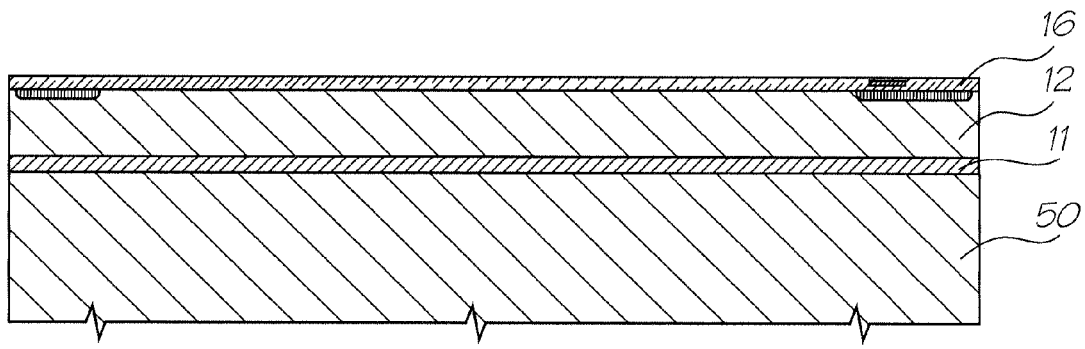
FIG. 5 to FIG. 15 illustrate sectional views of the manufacturing steps in one form of construction of an ink jet printhead nozzle.

3. Complete drive transistors, data distribution, and timing circuits using a 0.5-micron, one poly, 2 metal CMOS process to define the CMOS metal layers 16. This step is shown in FIG. 5. For clarity, these diagrams may not be to scale, and may not represent a cross section though any single plane of the nozzle. FIG. 4 is a key to representations of various materials in these manufacturing diagrams, and those of other cross-referenced ink jet configurations.

Figure 6:
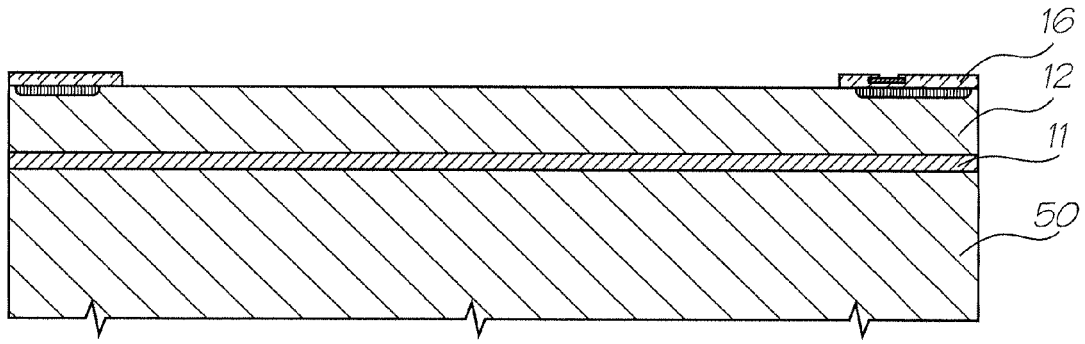

4. Etch the CMOS oxide layers down to silicon or aluminum using Mask 1. This mask defines the nozzle chamber, and the edges of the printheads chips. This step is shown in FIG. 6.

Figure 7:
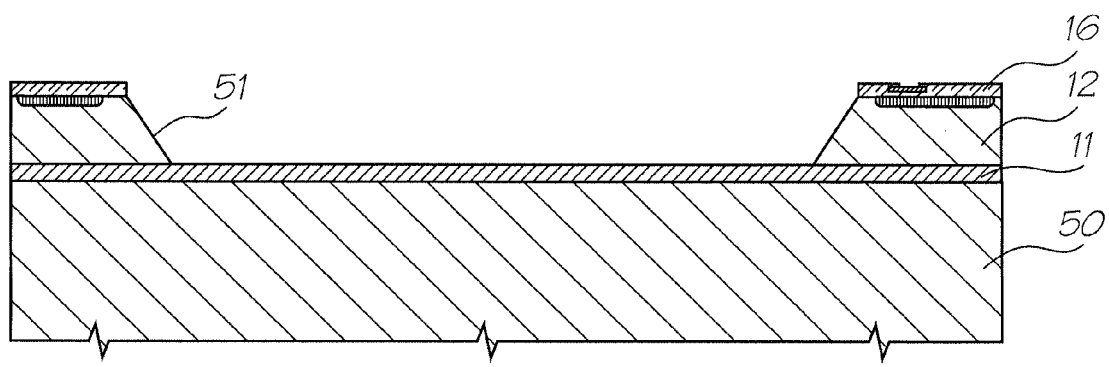

5. Crystallographically etch the exposed silicon using, for example, KOH or EDP (ethylenediamine pyrocatechol). This etch stops on <111> crystallographic planes 51, and on the boron doped silicon buried layer. This step is shown in FIG. 7.

Figure 8:
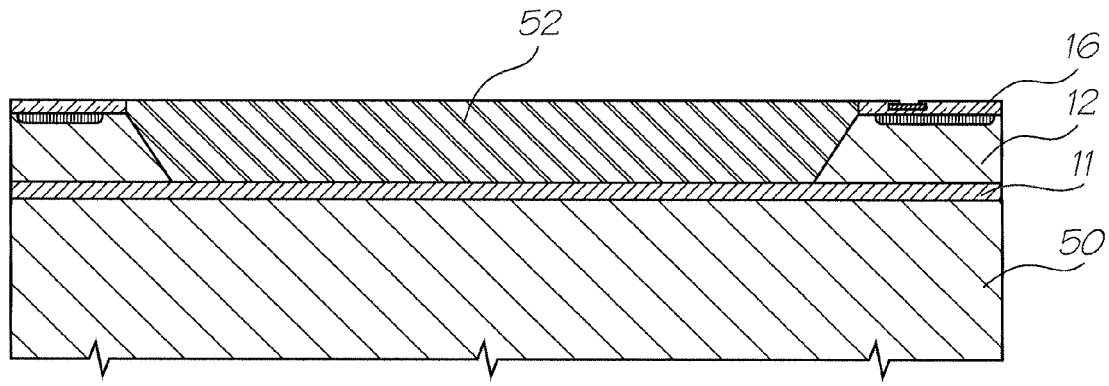

6. Deposit 12 microns of sacrificial material 52. Planarize down to oxide using CMP. The sacrificial material 52 temporarily fills the nozzle cavity. This step is shown in FIG. 8.

7. Deposit 0.1 microns of high stress silicon nitride ($Si_3N_4$) 53.

8. Etch the nitride layer 53 using Mask 2. This mask defines the contact vias from the shape memory heater to the second-level metal contacts.

9. Deposit a seed layer.

Figure 9:
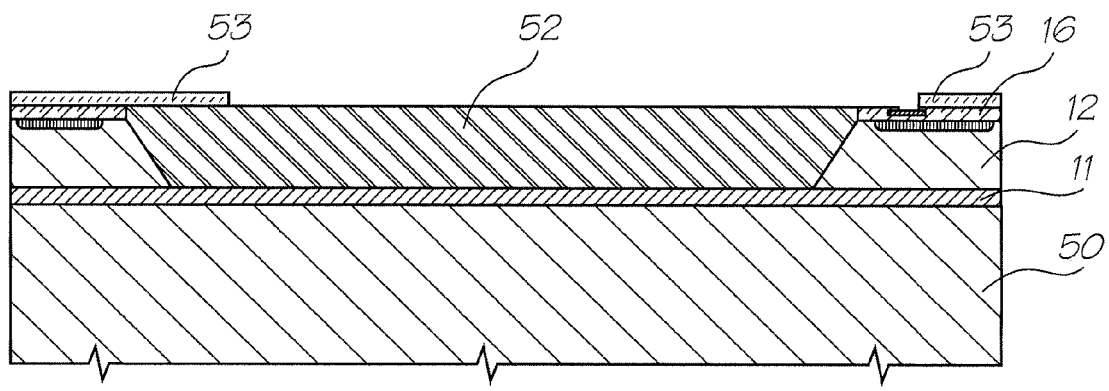

10. Spin on 2 microns of resist, expose with Mask 3, and develop. This mask defines the shape memory wire embedded in the paddle. The resist acts as an electroplating mold. This step is shown in FIG. 9.

11. Electroplate 1 micron of Nitinol 55 on the sacrificial material 52 to fill the electroplating mold. Nitinol is a 'shape memory' alloy of nickel and titanium, developed at the Naval Ordnance Laboratory in the US (hence Ni—Ti—NOL). A shape memory alloy can be thermally switched between its weak martensitic state and its high stiffness austenitic state.

Figure 10:
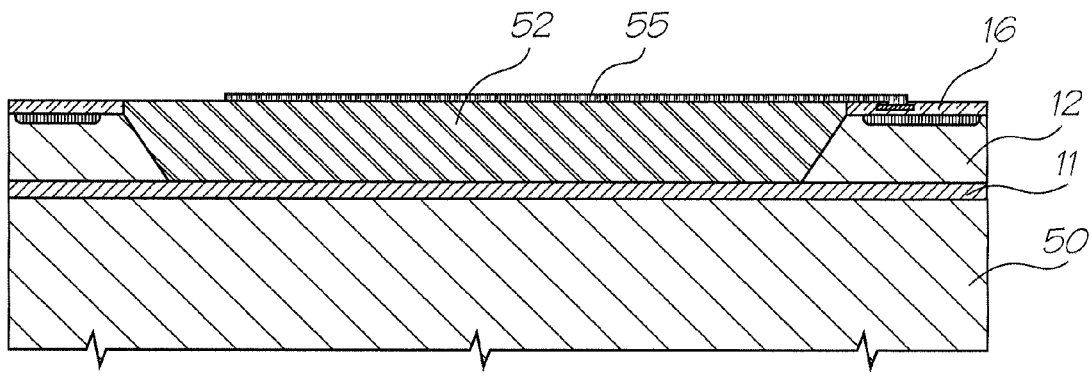

12. Strip the resist and etch the exposed seed layer. This step is shown in FIG. 10.

13. Wafer probe. All electrical connections are complete at this point, bond pads are accessible, and the chips are not yet separated.

14. Deposit 0.1 microns of high stress silicon nitride. High stress nitride is used so that once the sacrificial material is etched, and the paddle is released, the stress in the nitride layer will bend the relatively weak martensitic phase of the shape memory alloy. As the shape memory alloy, in its austenitic phase, is flat when it is annealed by the relatively high temperature deposition of this silicon nitride layer, it will return to this flat state when electrothermally heated.

Figure 11:
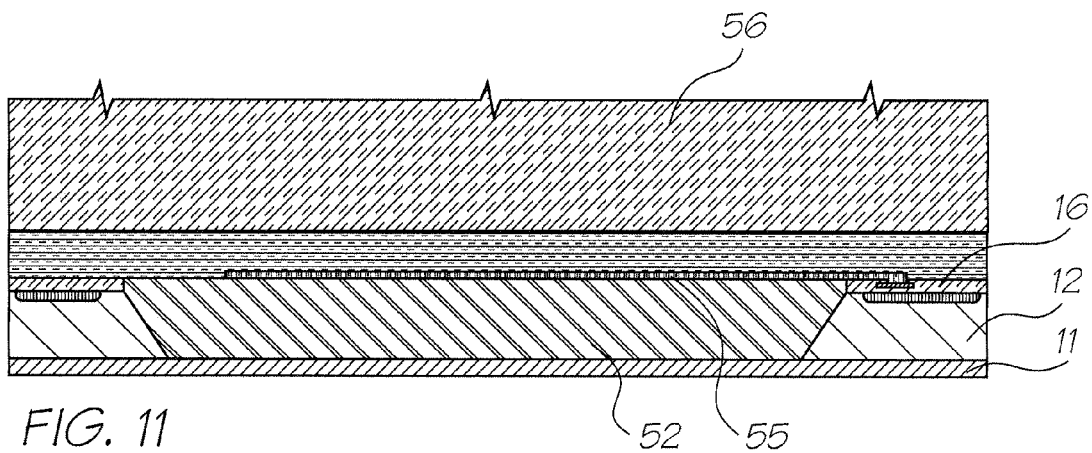

15. Mount the wafer 50 on a glass blank 56 and back-etch the wafer using KOH with no mask. This etch thins the wafer and stops at the buried boron doped silicon layer. This step is shown in FIG. 11.

Figure 12:
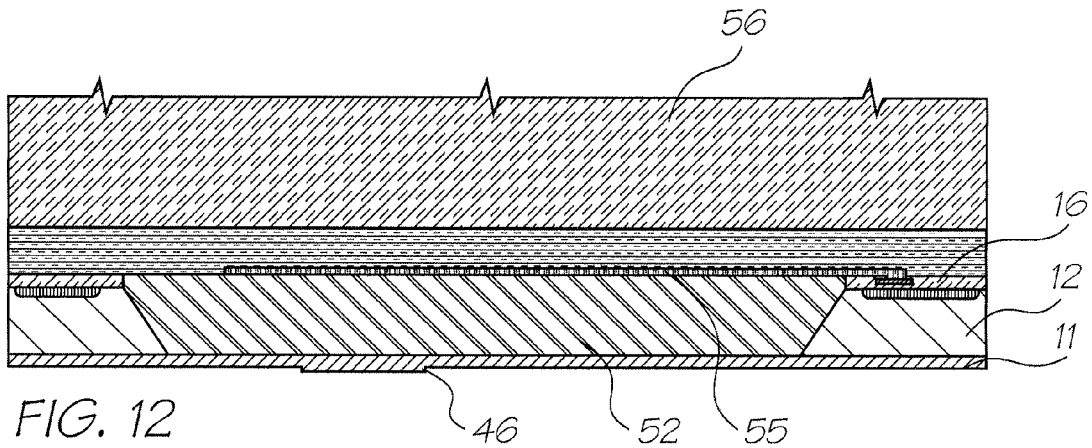

16. Plasma back-etch the boron doped silicon layer to a depth of 1 micron using Mask 4. This mask defines the nozzle rim 46. This step is shown in FIG. 12.

Figure 13:
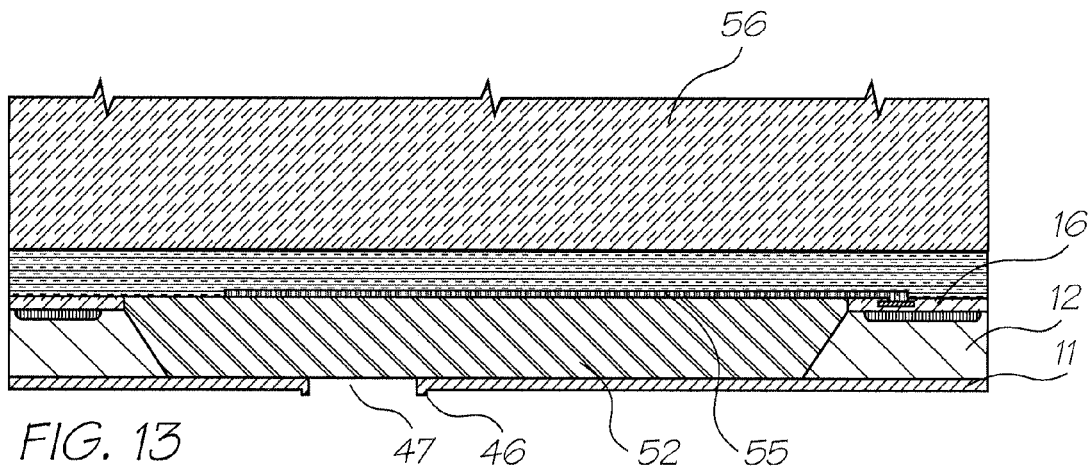

17. Plasma back-etch through the boron doped layer using Mask 5. This mask defines the nozzle port 47, and the edge of the chips. At this stage, the chips are still mounted on the glass blank 56. This step is shown in FIG. 13.

Figure 14:
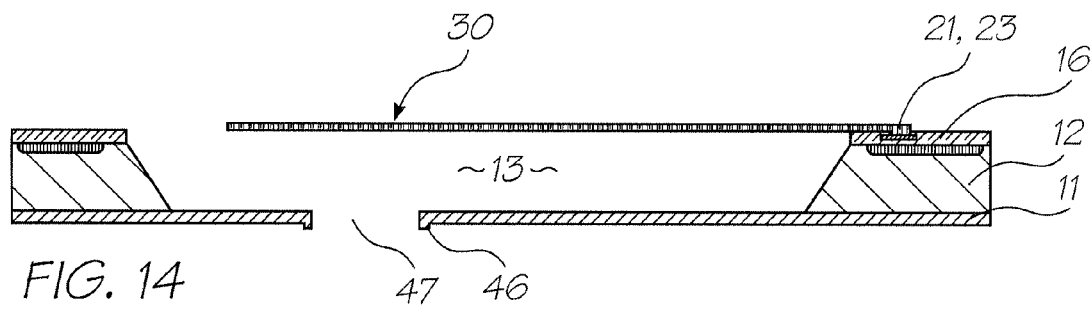

18. Strip the adhesive layer to detach the chips from the glass blank. Etch the sacrificial layer 52 away. This process completely separates the chips. This step is shown in FIG. 14.

19. Mount the printheads in their packaging, which may be a molded plastic former incorporating ink channels which supply different colors of ink to the appropriate regions of the front surface of the wafer.

20. Connect the printheads to their interconnect systems.

21. Hydrophobize the front surface of the printheads.

Figure 15:
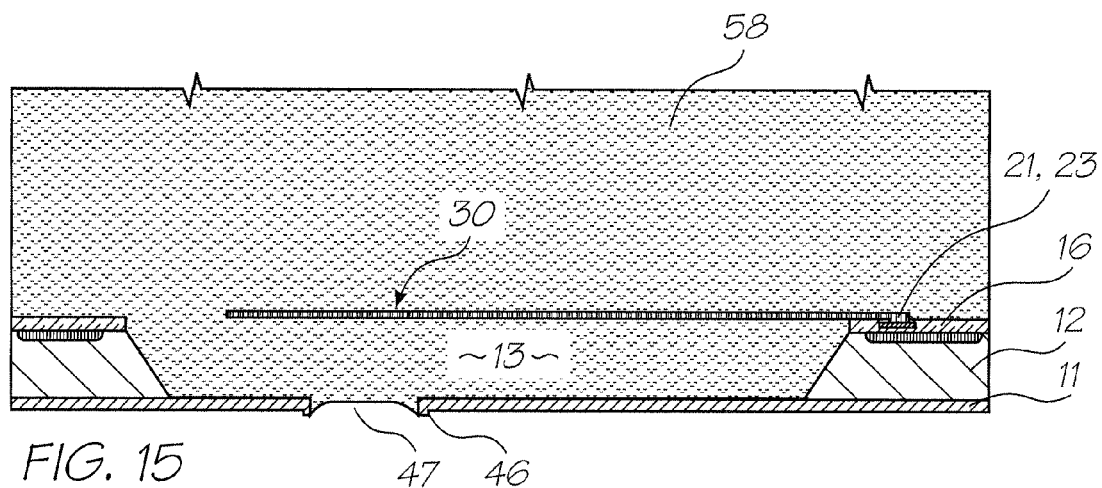

22. Fill with ink and test the completed printheads. A filled nozzle is shown in FIG. 15.

An embodiment of U.S. patent application Ser. No. 09/113,097 by the applicant is now described. This embodiment relies upon a magnetic actuator to "load" a spring, such that, upon deactivation of the magnetic actuator the resultant movement of the spring causes ejection of a drop of ink as the spring returns to its original position.

Figure 16:
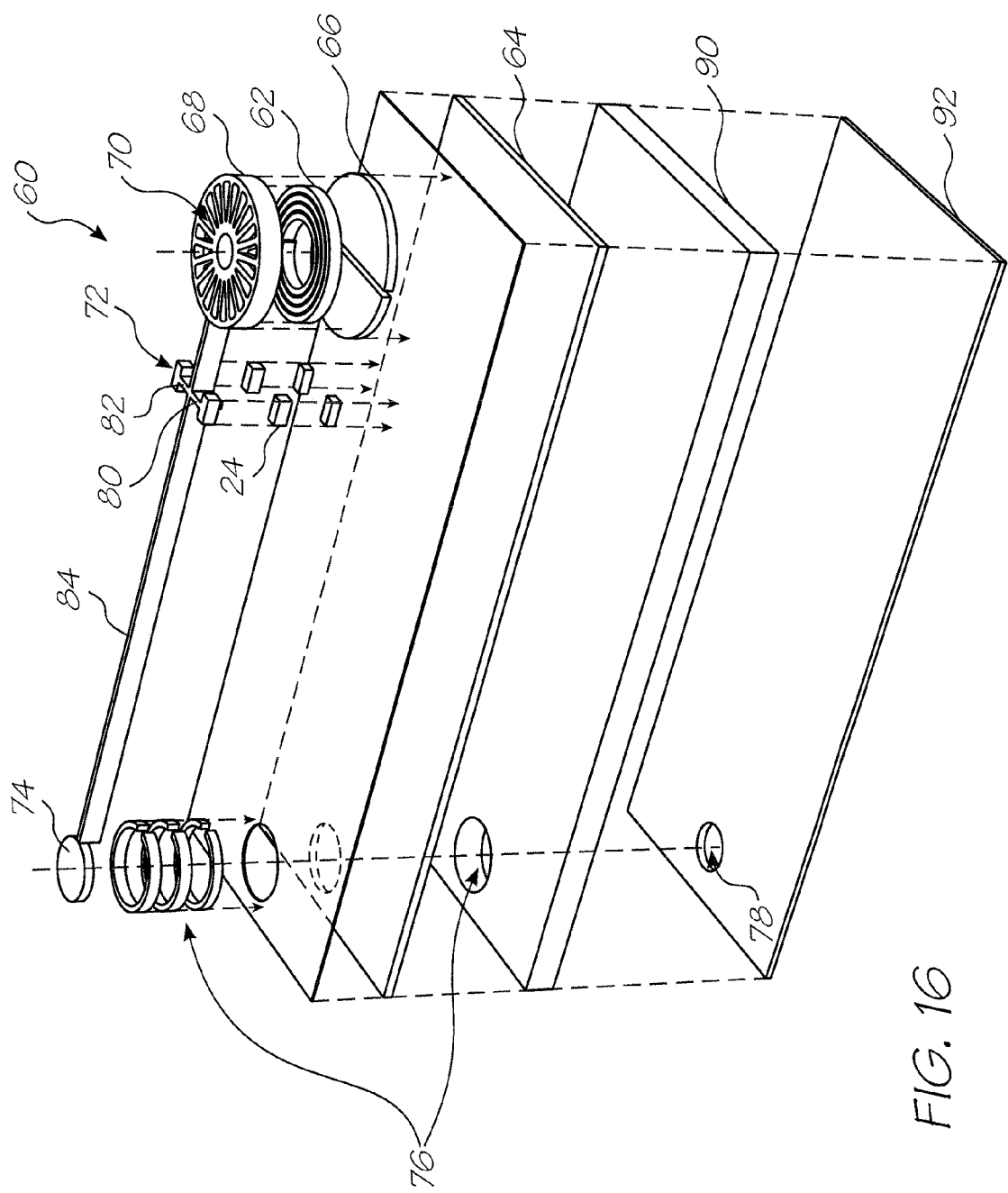
FIG. 16 is an exploded perspective view illustrating the construction of a single ink jet nozzle of U.S. patent application Ser. No. 09/113,097 by the Applicant, referred to in the table of cross-referenced material as set out above.

In FIG. 16, there is illustrated an exploded perspective view of an ink nozzle arrangement 60 constructed in accordance with the preferred embodiment. It would be understood that the preferred embodiment can be constructed as an array of nozzle arrangements 60 so as to together form an array for printing.

The operation of the ink nozzle arrangement 60 of FIG. 16 proceeds by a solenoid 62 being energized by way of a driving circuit 64 when it is desired to print out an ink drop. The energized solenoid 62 induces a magnetic field in a fixed soft magnetic pole 66 and a moveable soft magnetic pole 68. The solenoid power is turned on to a maximum current for long enough to move the moveable pole 68 from its rest position to a stopped position close to the fixed magnetic pole 66. The ink nozzle arrangement 60 of FIG. 1 sits within an ink chamber filled with ink. Therefore, holes 70 are provided in the moveable soft magnetic pole 68 for "squirting" out of ink from around the solenoid 62 when the pole 66 undergoes movement.

A fulcrum 72 with a piston head 74 balances the moveable soft magnetic pole 66. Movement of the magnetic pole 66 closer to the fixed pole 66 causes the piston head 74 to move away from a nozzle chamber 76 drawing air into the chamber 76 via an ink ejection port 78. The piston head 74 is then held open above the nozzle chamber 76 by means of maintaining a low "keeper" current through the solenoid 62. The keeper level current through solenoid 62 is sufficient to maintain the moveable pole 68 against the fixed soft magnetic pole 66. The level of current will be substantially less than the maximum current level because a gap 114 (FIG. 35) between the two poles 66 and 68 is at a minimum. For example, a keeper level current of 10% of the maximum current level may be suitable. During this phase of operation, the meniscus of ink at the nozzle tip or ink ejection port 78 is a concave hemisphere due to the inflow of air. The surface tension on the meniscus exerts a net force on the ink which results in ink flow from an ink chamber into the nozzle chamber 76. This results in the nozzle chamber 76 refilling, replacing the volume taken up by the piston head 74 which has been withdrawn. This process takes approximately 100 μs.

The current within solenoid 62 is then reversed to half that of the maximum current. The reversal demagnetises the magnetic poles 66, 68 and initiates a return of the piston 74 to its rest position. The piston 74 is moved to its normal rest position by both magnetic repulsion and by energy stored in a stressed torsional spring 80, 82 which was put in a state of torsion upon the movement of moveable pole 68.

The forces applied to the piston 74 as a result of the reverse current and spring 80, 82 is greatest at the beginning of the movement of the piston 74 and decreases as the spring elastic stress falls to zero. As a result, the acceleration of piston 74 is high at the beginning of a reverse stroke and the resultant ink velocity within the nozzle chamber 76 becomes uniform during the stroke. This results in an increased operating tolerance before ink flow over the printhead surface occurs.

At a predetermined time during the return stroke, the solenoid reverse current is turned off. The current is turned off when the residual magnetism of the movable pole is at a minimum. The piston 74 continues to move towards its original rest position.

The piston 74 overshoots the quiescent or rest position due to its inertia. Overshoot in the piston movement achieves two things: greater ejected drop volume and velocity, and improved drop break off as the piston 74 returns from overshoot to its quiescent position.

The piston 74 eventually returns from overshoot to the quiescent position. This return is caused by the springs 80, 82 which are now stressed in the opposite direction. The piston return "sucks" some of the ink back into the nozzle chamber 76, causing the ink ligament connecting the ink drop to the ink in the nozzle chamber 76 to thin. The forward velocity of the drop and the backward velocity of the ink in the nozzle chamber 76 are resolved by the ink drop breaking off from the ink in the nozzle chamber 76.

The piston 74 stays in the quiescent position until the next drop ejection cycle.

A liquid ink printhead has one ink nozzle arrangement 60 associated with each of the multitude of nozzles. The arrangement 60 has the following major parts:

(1) Drive circuitry 64 for driving the solenoid 62.

(2) The ejection port 78. The radius of the ejection port 78 is an important determinant of drop velocity and drop size.

(3) The piston 74. This is a cylinder which moves through the nozzle chamber 76 to expel the ink. The piston 74 is connected to one end of a lever arm 84. The piston radius is approximately 1.5 to 2 times the radius of the ejection port 78. The volume of ink displaced by the piston 74 during the piston return stroke mostly determines the ink drop volume output.

(4) The nozzle chamber 76. The nozzle chamber 76 is slightly wider than the piston 74. The gap 114 (FIGS. 34 & 35) between the piston 74 and the nozzle chamber walls is as small as is required to ensure that the piston does not make contact with the nozzle chamber 76 during actuation or return. If the printheads are fabricated using 0.5 μm semiconductor lithography, then a 1 μm gap 114 will usually be sufficient. The nozzle chamber 76 is also deep enough so that air ingested through the ejection port 78 when the piston 74 returns to its quiescent state does not extend to the piston 74. If it does, the ingested bubble may form a cylindrical surface instead of a hemispherical surface. If this happens, the nozzle will not refill properly.

(5) The solenoid 62. This is a spiral coil of copper. Copper is used for its low resistivity and high electro-migration resistance.

(6) The fixed magnetic pole 66 of ferromagnetic material.

(7) The moveable magnetic pole 68 of ferromagnetic material. To maximise the magnetic force generated, the moveable magnetic pole 68 and fixed magnetic pole 66 surround the solenoid 62 to define a torus. Thus, little magnetic flux is lost, and the flux is concentrated across the gap between the moveable magnetic pole 68 and the fixed pole 66. The moveable magnetic pole 68 has the holes 70 above the solenoid 62 to allow trapped ink to escape. These holes 70 are arranged and shaped so as to minimise their effect on the magnetic force generated between the moveable magnetic pole 68 and the fixed magnetic pole 66.

(8) The magnetic gap 114. The gap 114 between the fixed pole 66 and the moveable pole 68 is one of the most important "parts" of the print actuator. The size of the gap 114 strongly affects the magnetic force generated, and also limits the travel of the moveable magnetic pole 68. A small gap is desirable to achieve a strong magnetic force. The travel of the piston 74 is related to the travel of the moveable magnetic pole 68 (and therefore the gap 114) by the lever arm 84.

(9) Length of the lever arm 84. The lever arm 84 allows the travel of the piston 74 and the moveable magnetic pole 68 to be independently optimised. At the short end of the lever arm 84 is the moveable magnetic pole 68. At the long end of the lever arm 84 is the piston 74. The spring 80, 82 is at the fulcrum 72. The optimum travel for the moveable magnetic pole 68 is less than 1 mm, so as to minimise the magnetic gap. The optimum travel for the piston 74 is approximately 5 μm for a 1200 dpi printer. A lever arm 84 resolves the difference in optimum travel with a 5:1 or greater ratio in arm length.

(10) The springs 80, 82 (FIG. 1). The springs 80, 82 return the piston 74 to its quiescent position after a deactivation of the solenoid 62. The springs 80, 82 are at the fulcrum 72 of the lever arm 84.

(11) Passivation layers (not shown). All surfaces are preferably coated with passivation layers, which may be silicon nitride ($Si_3N_4$), diamond like carbon (DLC), or other chemically inert, highly impermeable layer. The passivation layers are especially important for device lifetime, as the active device is immersed in the ink.

As will be evident from the foregoing description, there is an advantage in ejecting the drop on deactivation of the solenoid 62. This advantage comes from the rate of acceleration of the moving magnetic pole 68.

The force produced by the moveable magnetic pole 68 by an electromagnetically induced field is approximately proportional to the inverse square of the gap between the moveable and static magnetic poles 68, 66. When the solenoid 62 is off, this gap is at a maximum. When the solenoid 62 is turned on, the moveable pole 68 is attracted to the static pole 66. As the gap decreases, the force increases, accelerating the movable pole 68 faster. The velocity increases in a highly non-linear fashion, approximately with the square of time. During the reverse movement of the moveable pole 68 upon deactivation, the acceleration of the moveable pole 68 is greatest at the beginning and then slows as the spring elastic stress falls to zero. As a result, the velocity of the moveable pole 68 is more uniform during the reverse stroke movement.

(1) The velocity of the piston or plunger 74 is constant over the duration of the drop ejection stroke.

(2) The piston or plunger 74 can be entirely removed from the ink chamber 76 during the ink fill stage, and thereby the nozzle filling time can be reduced, allowing faster printhead operation.

However, this approach does have some disadvantages over a direct firing type of actuator:

(1) The stresses on the spring 80, 82 are relatively large. Careful design is required to ensure that the springs operate at below the yield strength of the materials used.

(2) The solenoid 62 must be provided with a "keeper" current for the nozzle fill duration. The keeper current will typically be less than 10% of the solenoid actuation current. However, the nozzle fill duration is typically around 50 times the drop firing duration, so the keeper energy will typically exceed the solenoid actuation energy.

(3) The operation of the actuator is more complex due to the requirement for a "keeper" phase.

The printhead is fabricated from two silicon wafers. A first wafer is used to fabricate the print nozzles (the printhead wafer) and a second wafer (the Ink Channel Wafer) is utilised to fabricate the various ink channels in addition to providing a support means for the first channel. The fabrication process then proceeds as follows:

(1) Start with a single crystal silicon wafer 90, which has a buried epitaxial layer 92 of silicon which is heavily doped with boron. The boron should be doped to preferably $10^{20}$ atoms per $cm^3$ of boron or more, and be approximately 3 μm thick, and be doped in a manner suitable for the active semiconductor device technology chosen. The wafer diameter of the printhead wafer should be the same as the ink channel wafer.

(2) Fabricate the drive transistors and data distribution circuitry 64 according to the process chosen (eg. CMOS).

(3) Planarize the wafer 90 using chemical mechanical planarization (CMP).

(4) Deposit 5 mm of glass ($SiO_2$) over the second level metal.

(5) Using a dual damascene process, etch two levels into the top oxide layer. Level 1 is 4 μm deep, and level 2 is 5 μm deep. Level 2 contacts the second level metal. The masks for the static magnetic pole are used.

(6) Deposit 5 μm of nickel iron alloy (NiFe).

(7) Planarize the wafer using CMP, until the level of the $SiO_2$ is reached forming the magnetic pole 66.

(8) Deposit 0.1 μm of silicon nitride ($Si_3N_4$).

(9) Etch the $Si_3N_4$ for via holes for the connections to the solenoids, and for the nozzle chamber region 76.

(10) Deposit 4 μm of $SiO_2$.

(11) Plasma etch the $SiO_2$ in using the solenoid and support post mask.

(12) Deposit a thin diffusion barrier, such as Ti, TiN, or TiW, and an adhesion layer if the diffusion layer chosen has insufficient adhesion.

(13) Deposit 4 μm of copper for forming the solenoid 62 and spring posts 94. The deposition may be by sputtering, CVD, or electroless plating. As well as lower resistivity than aluminium, copper has significantly higher resistance to electro-migration. The electro-migration resistance is significant, as current densities in the order of $3\times10^6$ Amps/$cm^2$ may be required. Copper films deposited by low energy kinetic ion bias sputtering have been found to have 1,000 to 100,000 times larger electro-migration lifetimes larger than aluminium silicon alloy. The deposited copper should be alloyed and layered for maximum electro-migration lifetimes than aluminium silicon alloy. The deposited copper should be alloyed and layered for maximum electro-migration resistance, while maintaining high electrical conductivity.

(14) Planarize the wafer using CMP, until the level of the $SiO_2$ is reached. A damascene process is used for the copper layer due to the difficulty involved in etching copper. However, since the damascene dielectric layer is subsequently removed, processing is actually simpler if a standard deposit/etch cycle is used instead of damascene. However, it should be noted that the aspect ratio of the copper etch would be 8:1 for this design, compared to only 4:1 for a damascene oxide etch. This difference occurs because the copper is 1 μm wide and 4 μm thick, but has only 0.5 μm spacing. Damascene processing also reduces the lithographic difficultly, as the resist is on oxide, not metal.

(15) Plasma etch the nozzle chamber 76, stopping at the boron doped epitaxial silicon layer 92. This etch will be through around 13 μm of $SiO_2$, and 8 μm of silicon. The etch should be highly anisotropic, with near vertical sidewalls. The etch stop detection can be on boron in the exhaust gasses. If this etch is selective against NiFe, the masks for this step and the following step can be combined, and the following step can be eliminated. This step also etches the edge of the printhead wafer down to the boron layer, for later separation.

(16) Etch the $SiO_2$ layer. This need only be removed in the regions above the NiFe fixed magnetic poles, so it can be removed in the previous step if an Si and $SiO_2$ etch selective against NiFe is used.

(17) Conformably deposit 0.5 μm of high density $Si_3N_4$. This forms a corrosion barrier, so should be free of pinholes, and be impermeable to OH ions.

(18) Deposit a thick sacrificial layer. This layer should entirely fill the nozzle chambers, and coat the entire wafer to an added thickness of 8 μm. The sacrificial layer may be $SiO_2$.

(19) Etch two depths in the sacrificial layer for a dual damascene process. The deep etch is 8 μm, and the shallow etch is 3 μm. The masks define the piston 74, the lever arm 84, the springs 80, 82 and the moveable magnetic pole 68.

(20) Conformably deposit 0.1 μm of high density $Si_3N_4$. This forms a corrosion barrier, so should be free of pinholes, and be impermeable to OH ions.

(21) Deposit 8 μm of nickel iron alloy (NiFe).

(22) Planarize the wafer using CMP, until the level of the $SiO_2$ is reached.

(23) Deposit 0.1 μm of silicon nitride ($Si_3N_4$).

(24) Etch the $Si_3N_4$ everywhere except the top of the plungers.

(25) Open the bond pads.

(26) Permanently bond the wafer onto a pre-fabricated ink channel wafer. The active side of the printhead wafer faces the ink channel wafer. The ink channel wafer is attached to a backing plate, as it has already been etched into separate ink channel chips.

(27) Etch the printhead wafer to entirely remove the backside silicon to the level of the boron doped epitaxial layer 92. This etch can be a batch wet etch in ethylenediamine pyrocatechol (EDP).

(28) Mask a nozzle rim 96 from the underside of the printhead wafer. This mask also includes the chip edges.

(31) Etch through the boron doped silicon layer 92, thereby creating the nozzle holes 70. This etch should also etch fairly deeply into the sacrificial material in the nozzle chambers 76 to reduce time required to remove the sacrificial layer.

(32) Completely etch the sacrificial material. If this material is $SiO_2$ then a HF etch can be used. The nitride coating on the various layers protects the other glass dielectric layers and other materials in the device from HF etching. Access of the HF to the sacrificial layer material is through the nozzle, and simultaneously through the ink channel chip. The effective depth of the etch is 21 μm.

(33) Separate the chips from the backing plate. Each chip is now a full printhead including ink channels. The two wafers have already been etched through, so the printheads do not need to be diced.

(34) Test the printheads and TAB bond the good printheads.

(35) Hydrophobize the front surface of the printheads.

(36) Perform final testing on the TAB bonded printheads.

Figure 17:
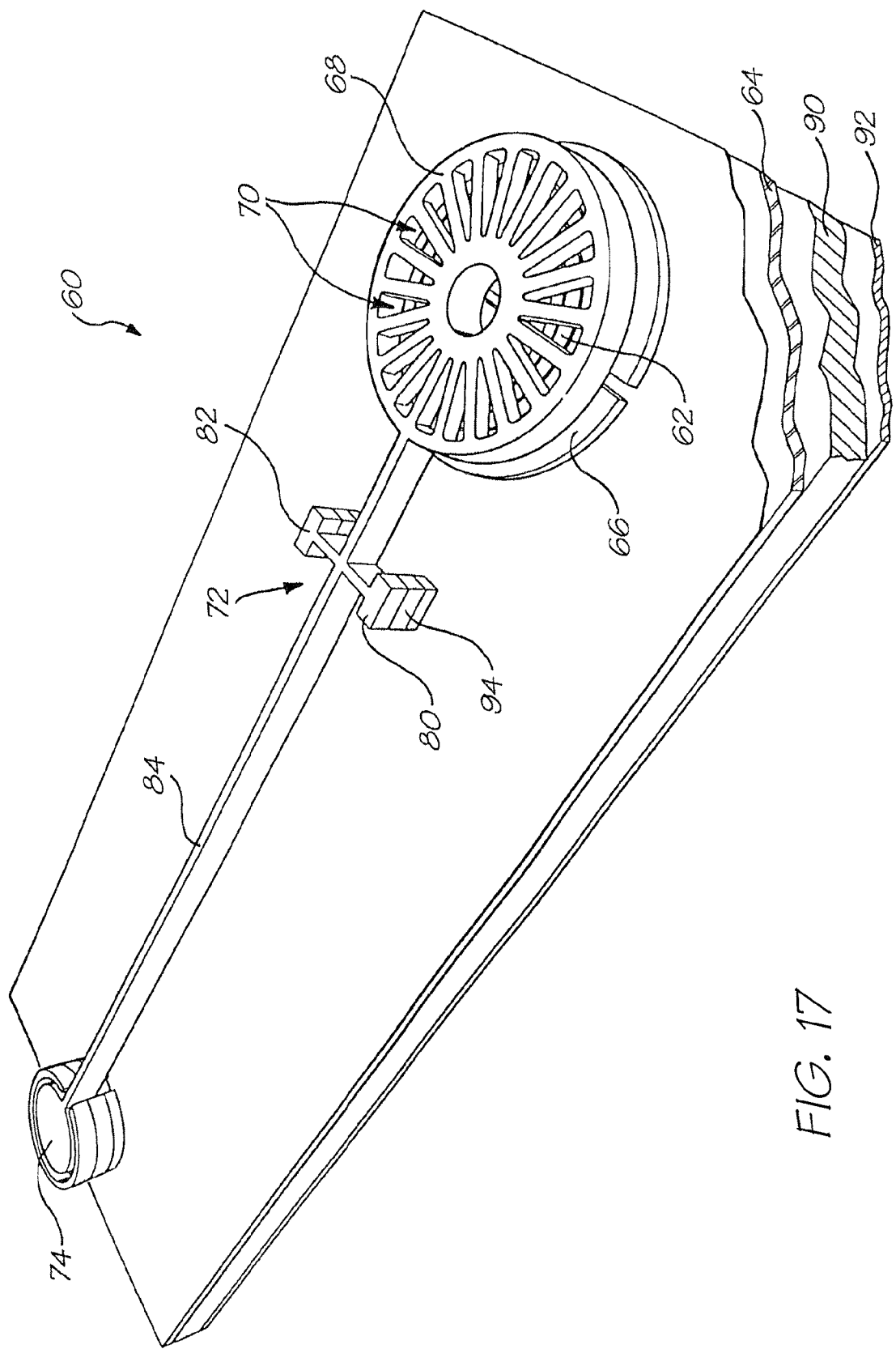
FIG. 17 is a perspective view, in part in section, of the ink jet nozzle of FIG. 16.

FIG. 17 shows a perspective view, in part in section, of a single ink jet nozzle arrangement 60 constructed in accordance with the preferred embodiment.

One alternative form of detailed manufacturing process which can be used to fabricate monolithic ink jet printheads operating in accordance with the principles taught by the present embodiment can proceed utilizing the following steps:

1. Using a double-sided polished wafer 90 deposit 3 microns of epitaxial silicon 92 heavily doped with boron.

2. Deposit 10 microns of epitaxial silicon 98, either p-type or n-type, depending upon the CMOS process used.

Figure 18:
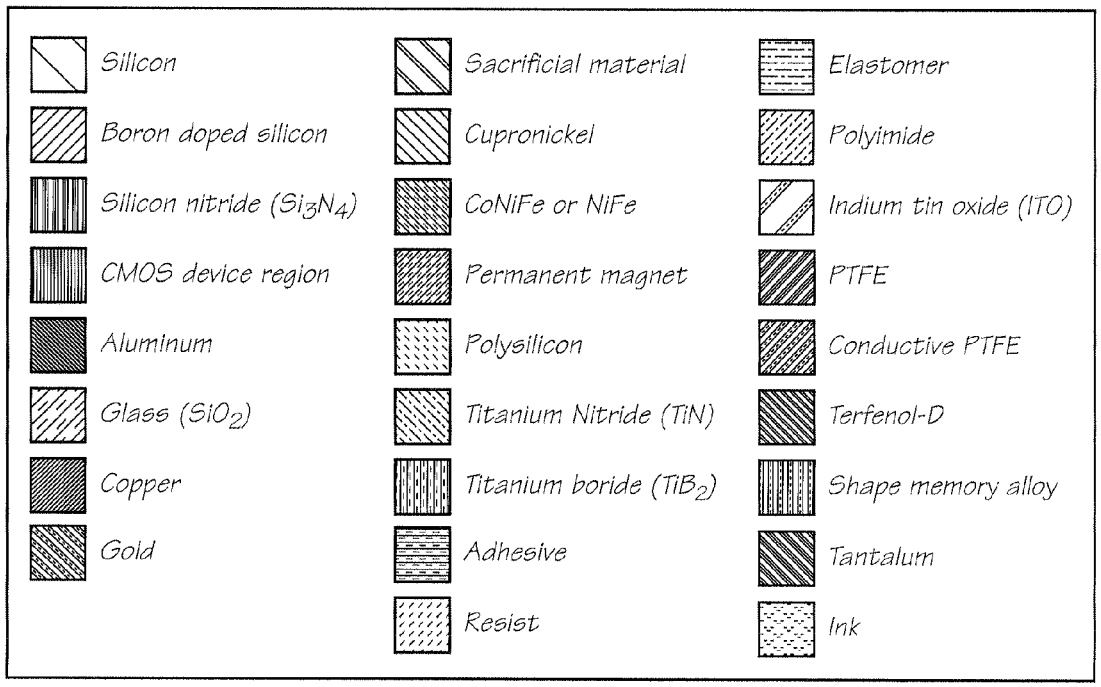
FIG. 18 provides a legend of the materials indicated in FIGS. 19 to 35.
Figure 19:
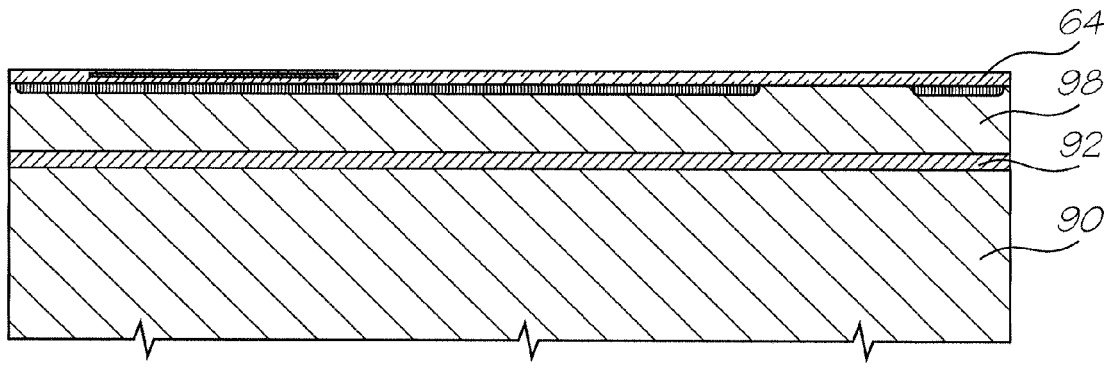
FIGS. 19 to 35 illustrate sectional views of the manufacturing steps in one form of construction of the ink jet printhead nozzle of FIG. 16.

3. Complete a 0.5-micron, one poly, 2 metal CMOS process. This step is shown in FIG. 19. For clarity, these diagrams may not be to scale, and may not represent a cross section though any single plane of the nozzle. FIG. 18 is a key to representations of various materials in these manufacturing diagrams.

4. Etch the CMOS oxide layers down to silicon or aluminum using Mask 1. This mask defines the nozzle chamber 76, the edges of the printheads chips, and the vias for the contacts from the aluminum electrodes to two halves of the fixed magnetic pole 66.

Figure 20:
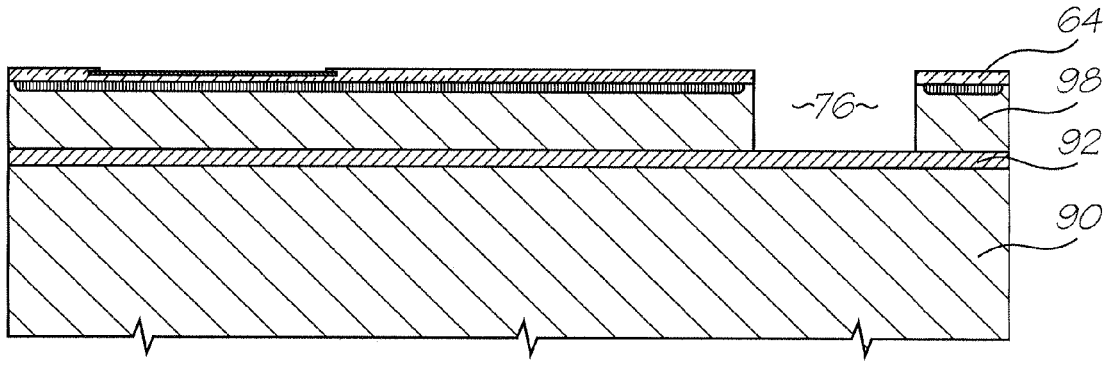

5. Plasma etch the silicon 90 down to the boron doped buried layer 92, using oxide from step 4 as a mask. This etch does not substantially etch the aluminum. This step is shown in FIG. 20.

6. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 21:
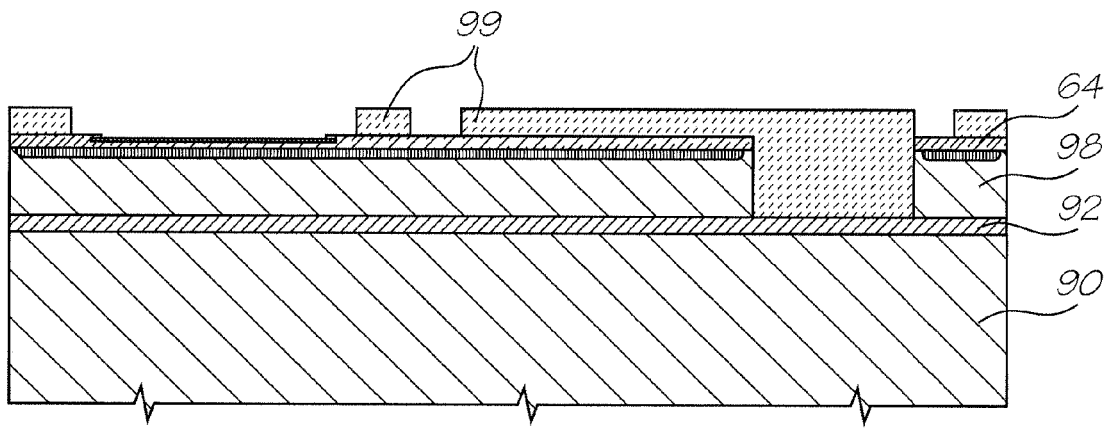

7. Spin on 4 microns of resist 99, expose with Mask 2, and develop. This mask defines the fixed magnetic pole 66 and the nozzle chamber wall, for which the resist 99 acts as an electroplating mold. This step is shown in FIG. 21.

Figure 22:
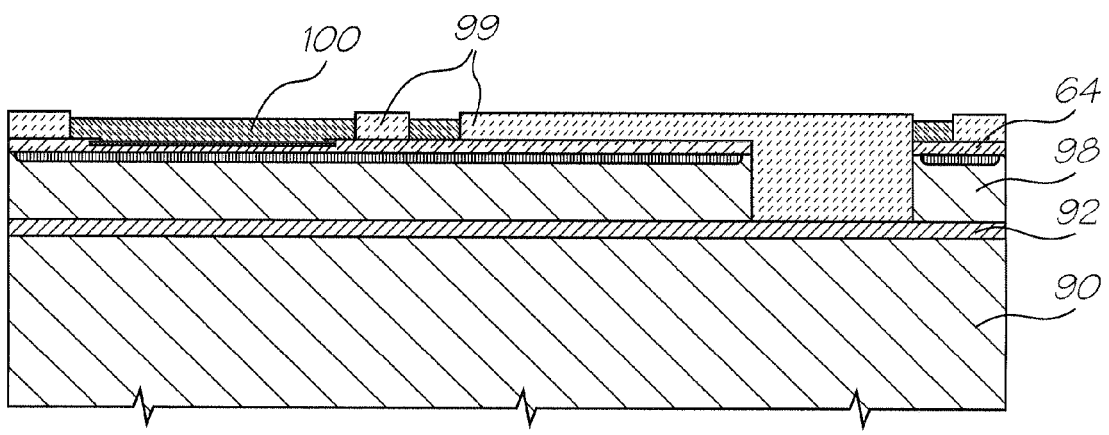

8. Electroplate 3 microns of CoNiFe 100. This step is shown in FIG. 22.

Figure 23:
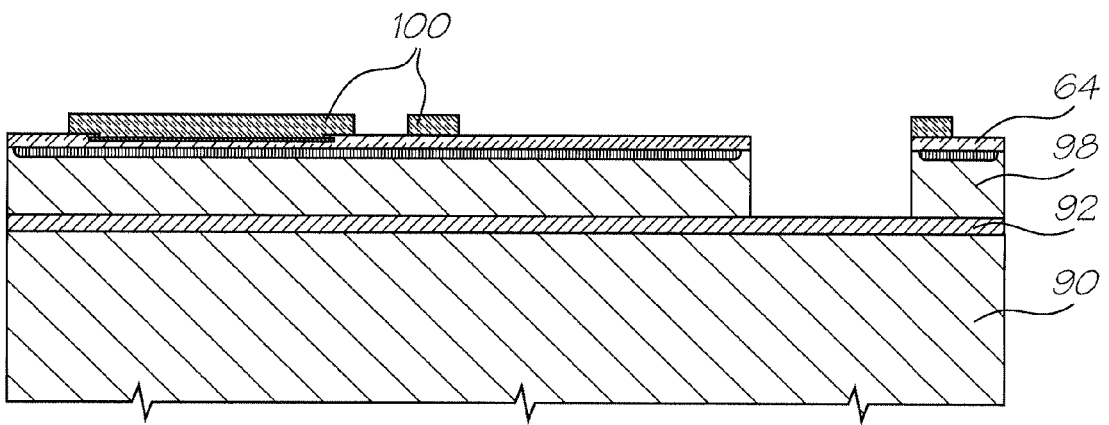

9. Strip the resist and etch the exposed seed layer. This step is shown in FIG. 23.

10. Deposit 0.1 microns of silicon nitride (Si3N4).

11. Etch the nitride layer using Mask 3. This mask defines the contact vias from each end of the solenoid 62 to the two halves of the fixed magnetic pole 66.

12. Deposit a seed layer of copper. Copper is used for its low resistivity (which results in higher efficiency) and its high electromigration resistance, which increases reliability at high current densities.

Figure 24:
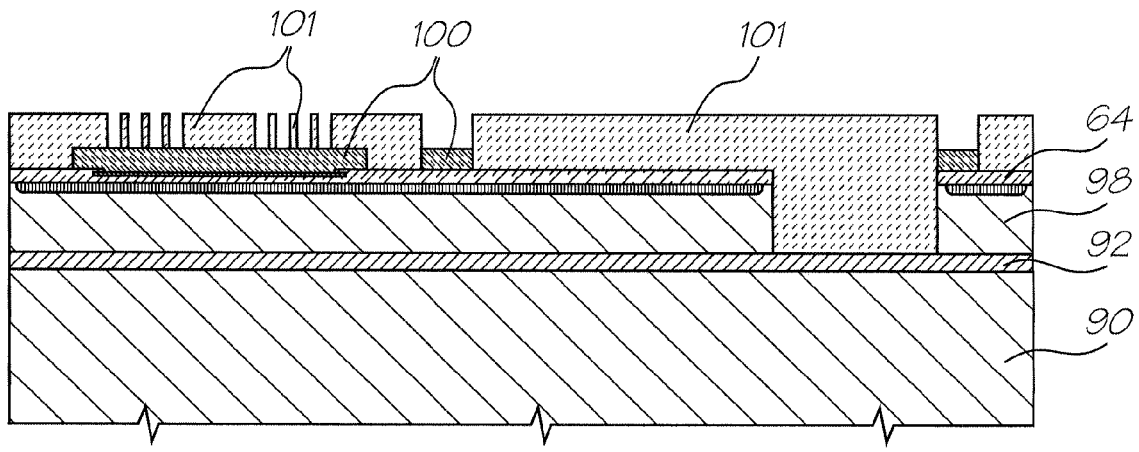

13. Spin on 5 microns of resist 101, expose with Mask 4, and develop. This mask defines a spiral coil for the solenoid 62, the nozzle chamber wall and the spring posts 94, for which the resist acts as an electroplating mold. This step is shown in FIG. 24.

14. Electroplate 4 microns of copper 103.

Figure 25:
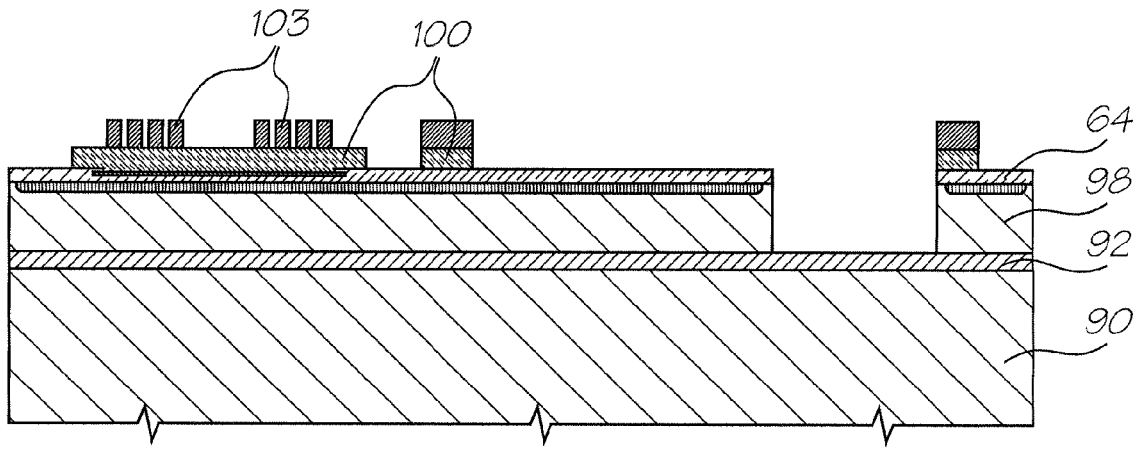

15. Strip the resist 101 and etch the exposed copper seed layer. This step is shown in FIG. 25.

16. Wafer probe. All electrical connections are complete at this point, bond pads are accessible, and the chips are not yet separated.

17. Deposit 0.1 microns of silicon nitride.

18. Deposit 1 micron of sacrificial material 102. This layer determines the magnetic gap 114.

Figure 26:
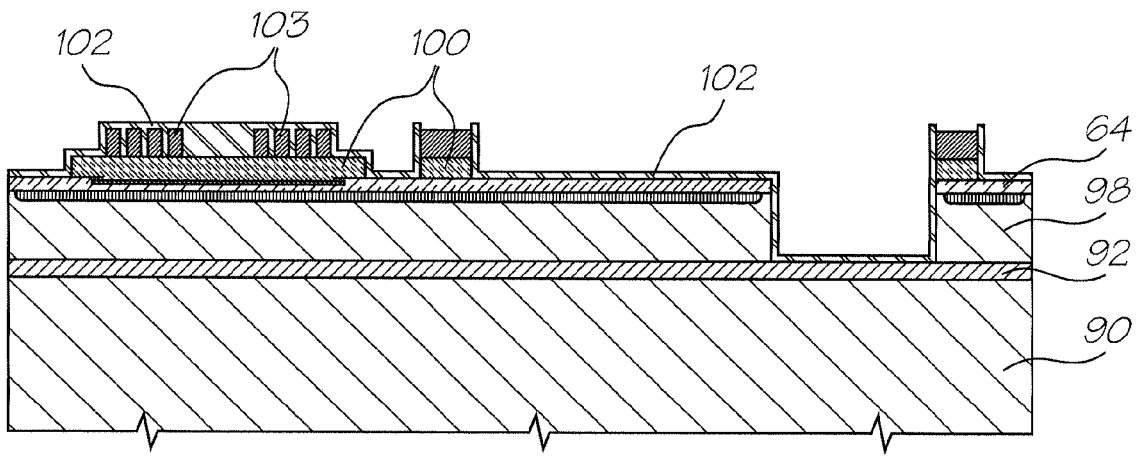

19. Etch the sacrificial material 102 using Mask 5. This mask defines the spring posts 94 and the nozzle chamber wall. This step is shown in FIG. 26.

20. Deposit a seed layer of CoNiFe.

Figure 27:
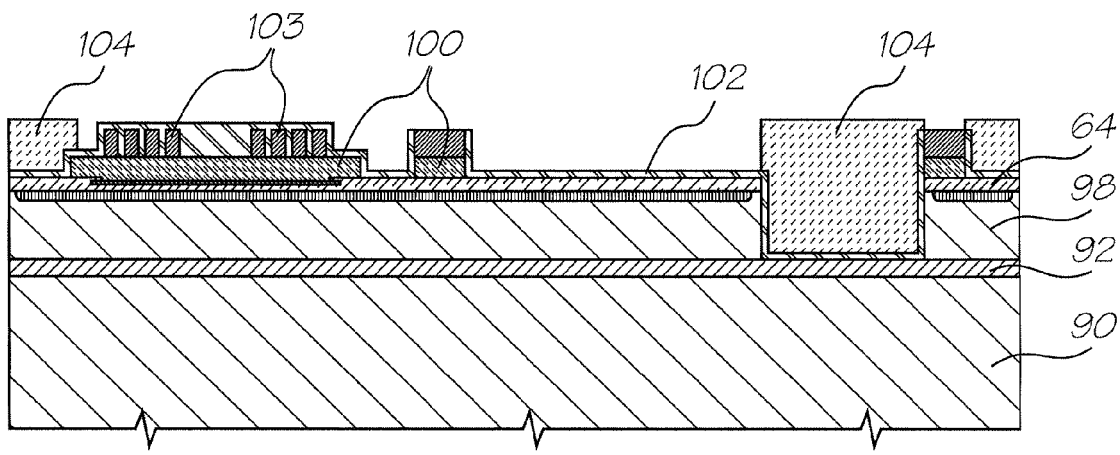
Figure 28:
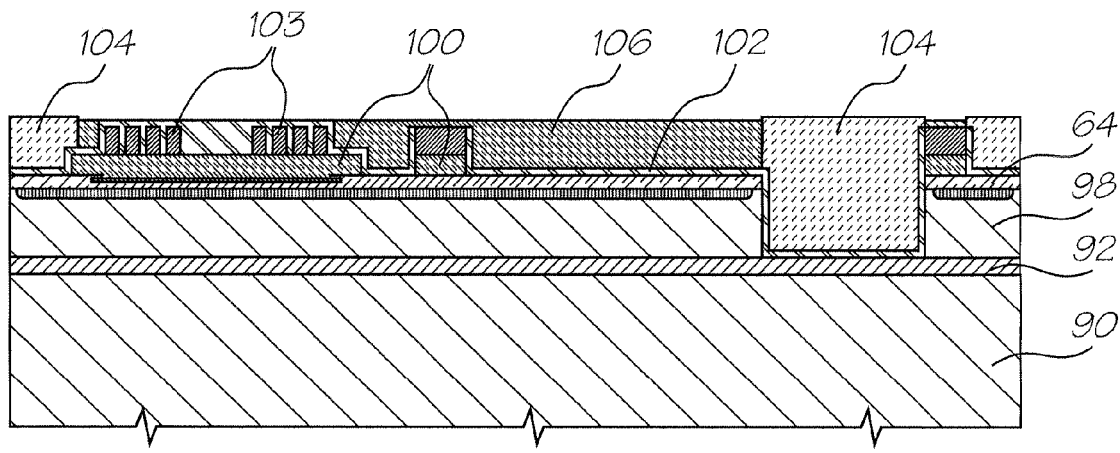

21. Spin on 4.5 microns of resist 104, expose with Mask 6, and develop. This mask defines the walls of the magnetic plunger or piston 74, the lever arm 84, the nozzle chamber wall and the spring posts 94. The resist forms an electroplating mold for these parts. This step is shown in FIG. 27.

22. Electroplate 4 microns of CoNiFe 106. This step is shown in FIG. 13.

23. Deposit a seed layer of CoNiFe.

Figure 29:
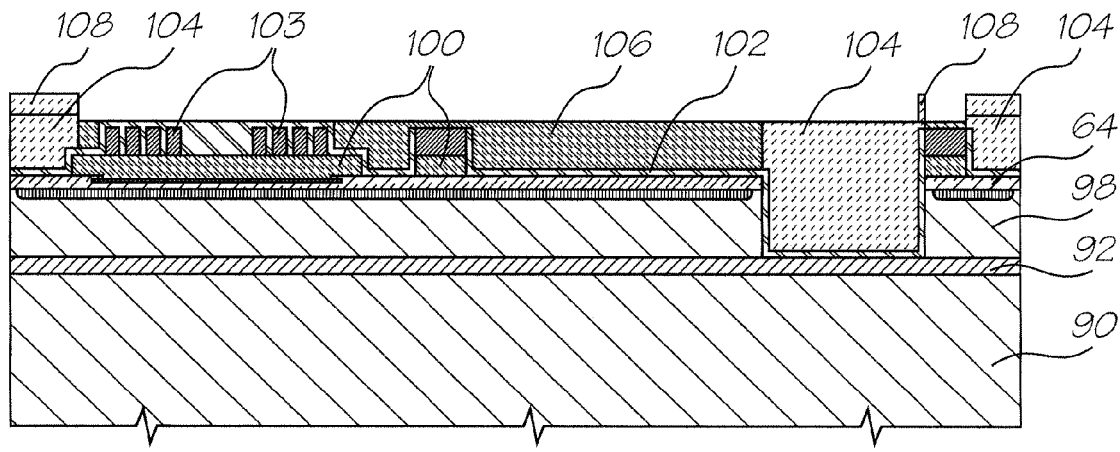

24. Spin on 4 microns of resist 108, expose with Mask 7, and develop. This mask defines the roof of the magnetic plunger 74, the nozzle chamber wall, the lever arm 84, the springs 80, 82, and the spring posts 94. The resist 108 forms an electroplating mold for these parts. This step is shown in FIG. 29.

Figure 30:
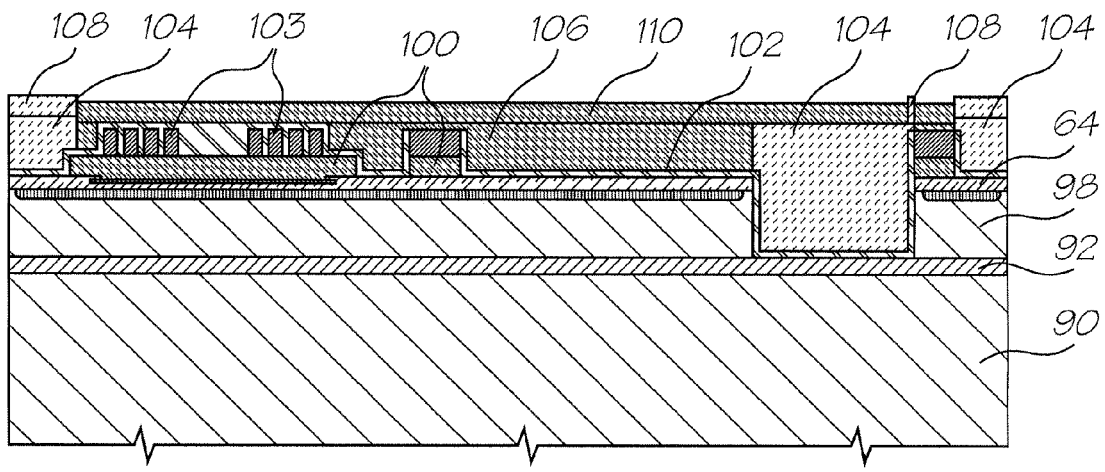

25. Electroplate 3 microns of CoNiFe 110. This step is shown in FIG. 30.

Figure 31:
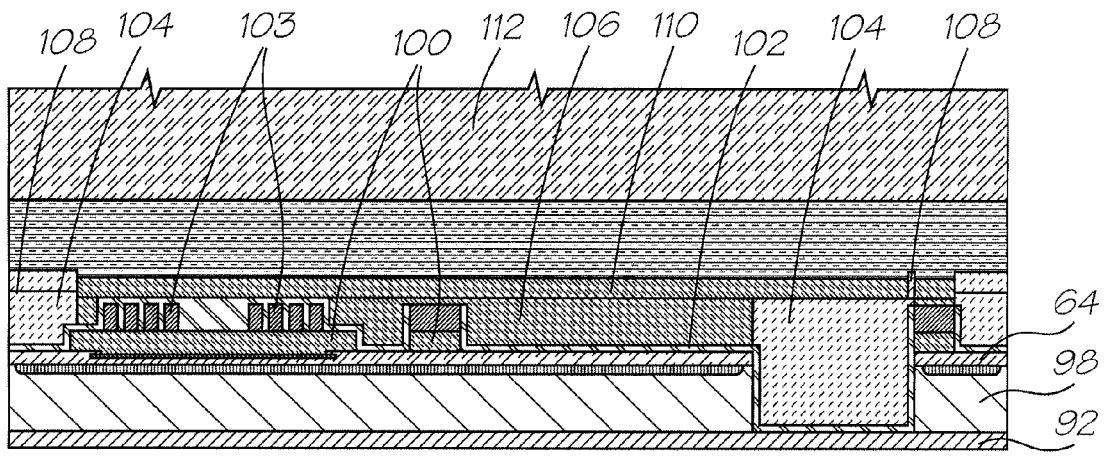

26. Mount the wafer 90 on a glass blank 112 and back-etch the wafer 90 using KOH, with no mask. This etch thins the wafer 90 and stops at the buried boron doped silicon layer 92. This step is shown in FIG. 31.

Figure 32:
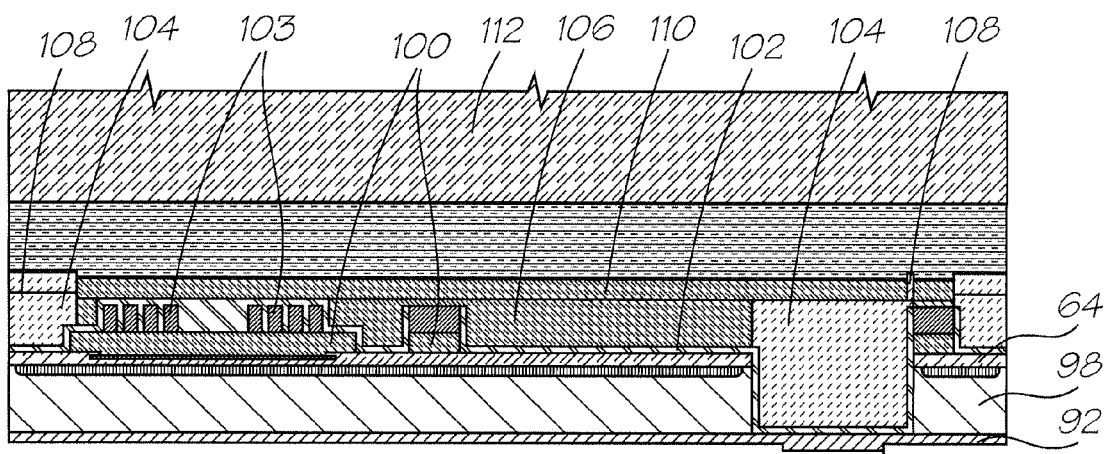

27. Plasma back-etch the boron doped silicon layer 92 to a depth of 1 micron using Mask 8. This mask defines the nozzle rim 96. This step is shown in FIG. 32.

Figure 33:
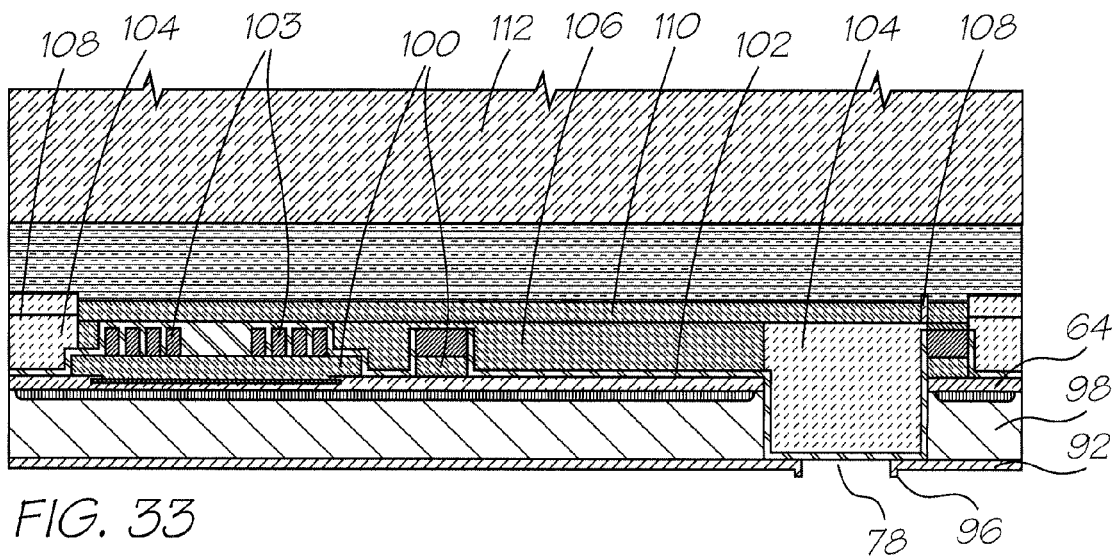

28. Plasma back-etch through the boron doped layer 92 using Mask 9. This mask defines the ink ejection port 78, and the edge of the chips. At this stage, the chips are separate, but are still mounted on the glass blank 112. This step is shown in FIG. 33.

Figure 34:
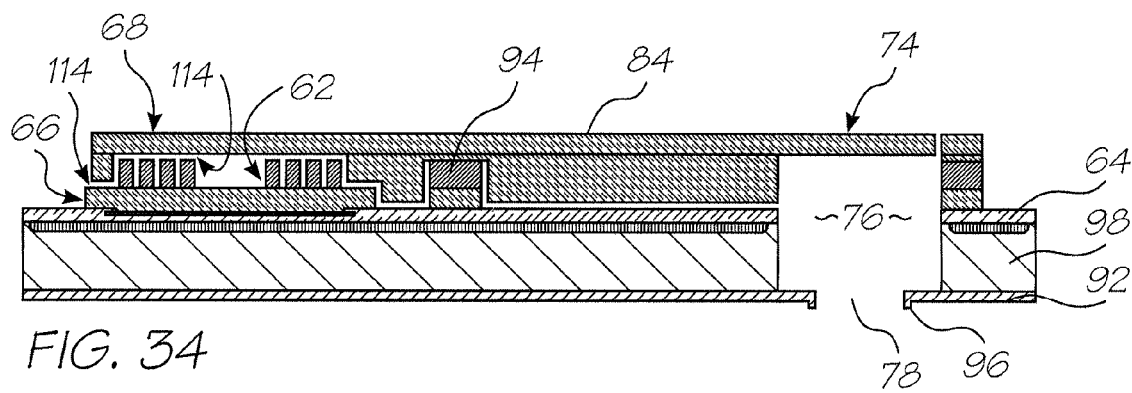

29. Detach the chips from the glass blank 112. Strip all adhesive, resist, sacrificial, and exposed seed layers. This step is shown in FIG. 34.

30. Mount the printheads in their packaging, which may be a molded plastic former incorporating ink channels which supply different colors of ink to the appropriate regions of the front surface of the wafer.

31. Connect the printheads to their interconnect systems.

32. Hydrophobize the front surface of the printheads.

Figure 35:
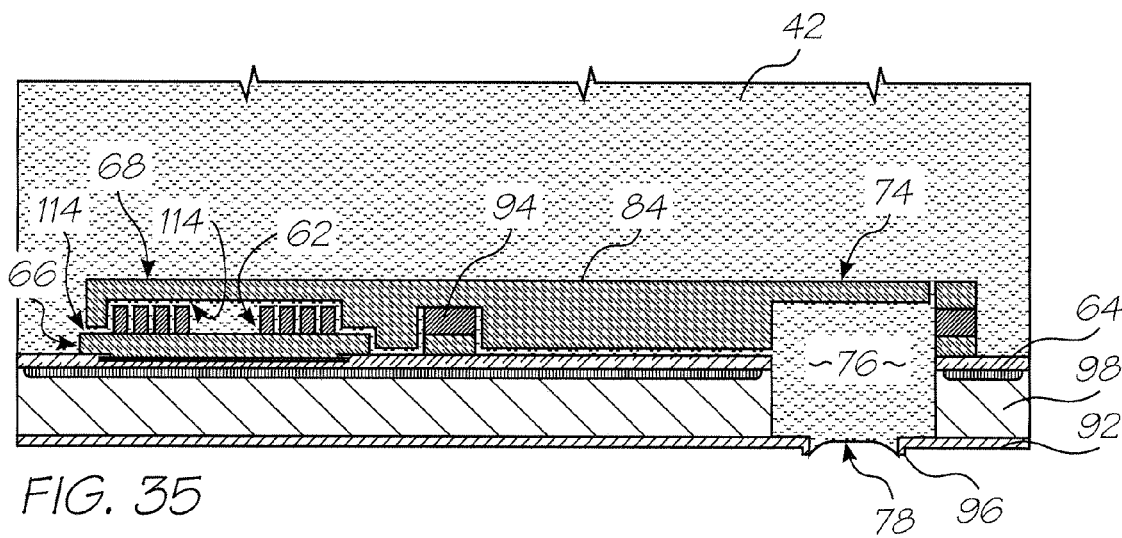

33. Fill the completed printheads with ink and test them. A filled nozzle is shown in FIG. 35.

The following description is of an embodiment of the invention covered by U.S. patent application Ser. No. 09/113,061 to the applicant. In this embodiment, a linear stepper motor is utilised to control a plunger device. The plunger device compresses ink within a nozzle chamber to cause the ejection of ink from the chamber on demand.

Figure 36:
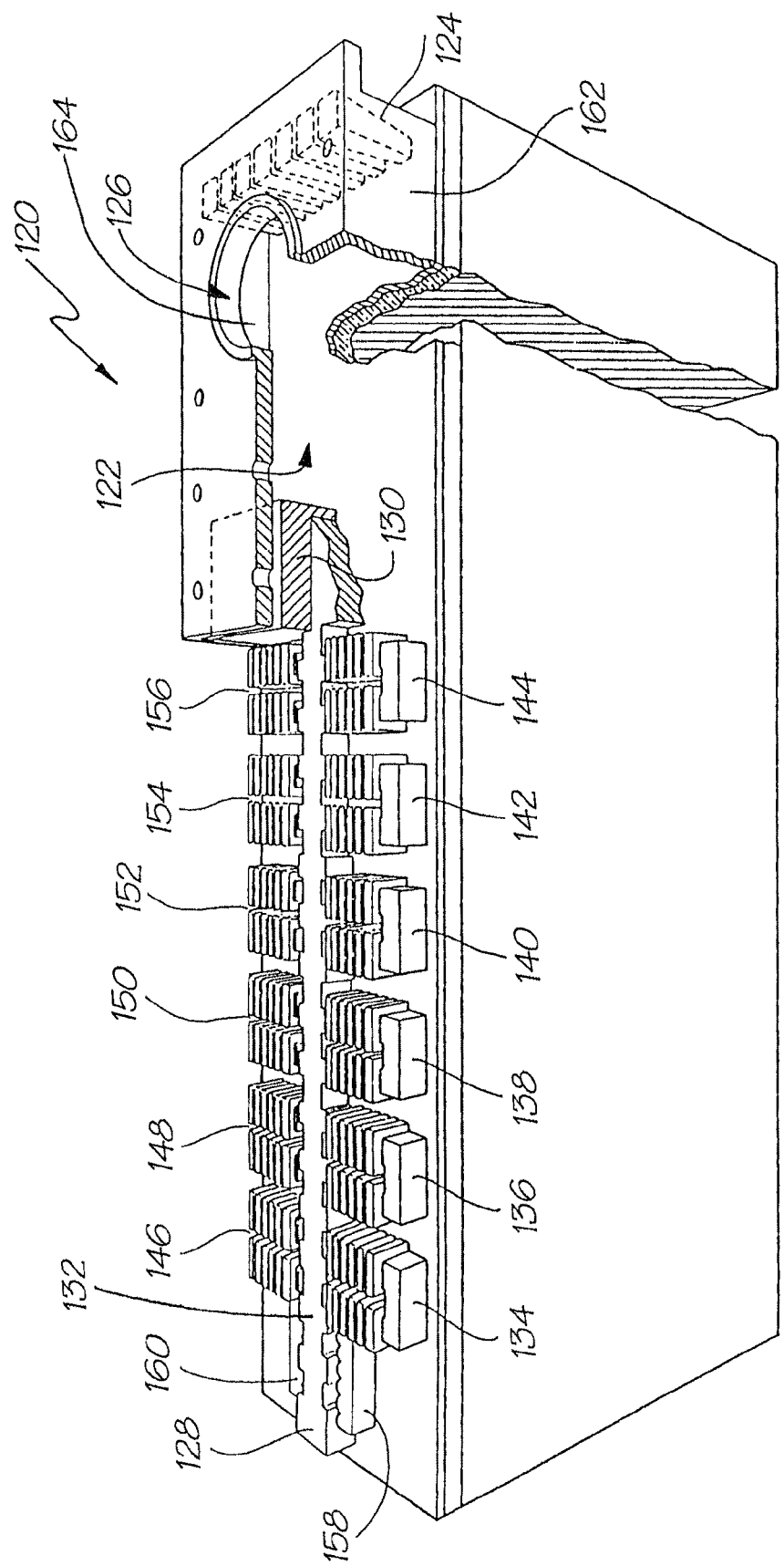
FIG. 36 is a cut-out top view of an ink jet nozzle of U.S. patent application Ser. No. 09/113,061 by the Applicant, referred to in the table of cross-referenced material as set out above.

Turning to FIG. 36, there is illustrated a single nozzle arrangement 120 as constructed in accordance with this embodiment. The nozzle arrangement 120 includes a nozzle chamber 122 into which ink flows via a nozzle chamber filter portion 124 which includes a series of posts which filter out foreign bodies in the ink inflow. The nozzle chamber 122 includes an ink ejection port 126 for the ejection of ink on demand. Normally, the nozzle chamber 122 is filled with ink.

A linear actuator 128 is provided for rapidly compressing a nickel ferrous plunger 130 into the nozzle chamber 122 so as to compress the volume of ink within the chamber 122 to thereby cause ejection of drops from the ink ejection port 126. The plunger 130 is connected to a stepper moving pole device 132 of the linear actuator 128 which is actuated by means of a three phase arrangement of electromagnets 134, 136, 138, 140, 142, 144, 146, 148, 150, 152, 154, 156. The electromagnets are driven in three phases with electro magnets 134, 146, 140 and 152 being driven in a first phase, electromagnets 136, 148, 142, 154 being driven in a second phase and electromagnets 138, 150, 144, 156 being driven in a third phase. The electromagnets are driven in a reversible manner so as to de-actuate the plunger 130 via actuator 128. The actuator 128 is guided at one end by a means of a guide 158, 160. At the other end, the plunger 130 is coated with a hydrophobic material such as polytetrafluoroethylene (PTFE) which can form a major part of the plunger 130. The PTFE acts to repel the ink from the nozzle chamber 122 resulting in the creation of menisci 224, 226 (FIG. 59(*a*)) between the plunger 130 and side walls 162, 164. The surface tension characteristics of the menisci 224, 226 act to guide the plunger 130 within the nozzle chamber 122. The menisci 224, 226 further stop ink from flowing out of the chamber 122 and hence the electromagnets 134 to 156 can be operated in the atmosphere.

The nozzle arrangement 120 is therefore operated to eject drops on demand by means of activating the actuator 128 by appropriately synchronised driving of electromagnets 134 to 156. The actuation of the actuator 128 results in the plunger 130 moving towards the nozzle ink ejection port 126 thereby causing ink to be ejected from the port 126.

Subsequently, the electromagnets 134 to 156 are driven in reverse thereby moving the plunger 130 in an opposite direction resulting in the inflow of ink from an ink supply connected to an ink inlet port 166.

Preferably, multiple ink nozzle arrangements 120 can be constructed adjacent to one another to form a multiple nozzle ink ejection mechanism. The nozzle arrangements 120 are preferably constructed in an array print head constructed on a single silicon wafer which is subsequently diced in accordance with requirements. The diced print heads can then be interconnected to an ink supply which can comprise a through chip ink flow or ink flow from the side of a chip.

Figure 37:
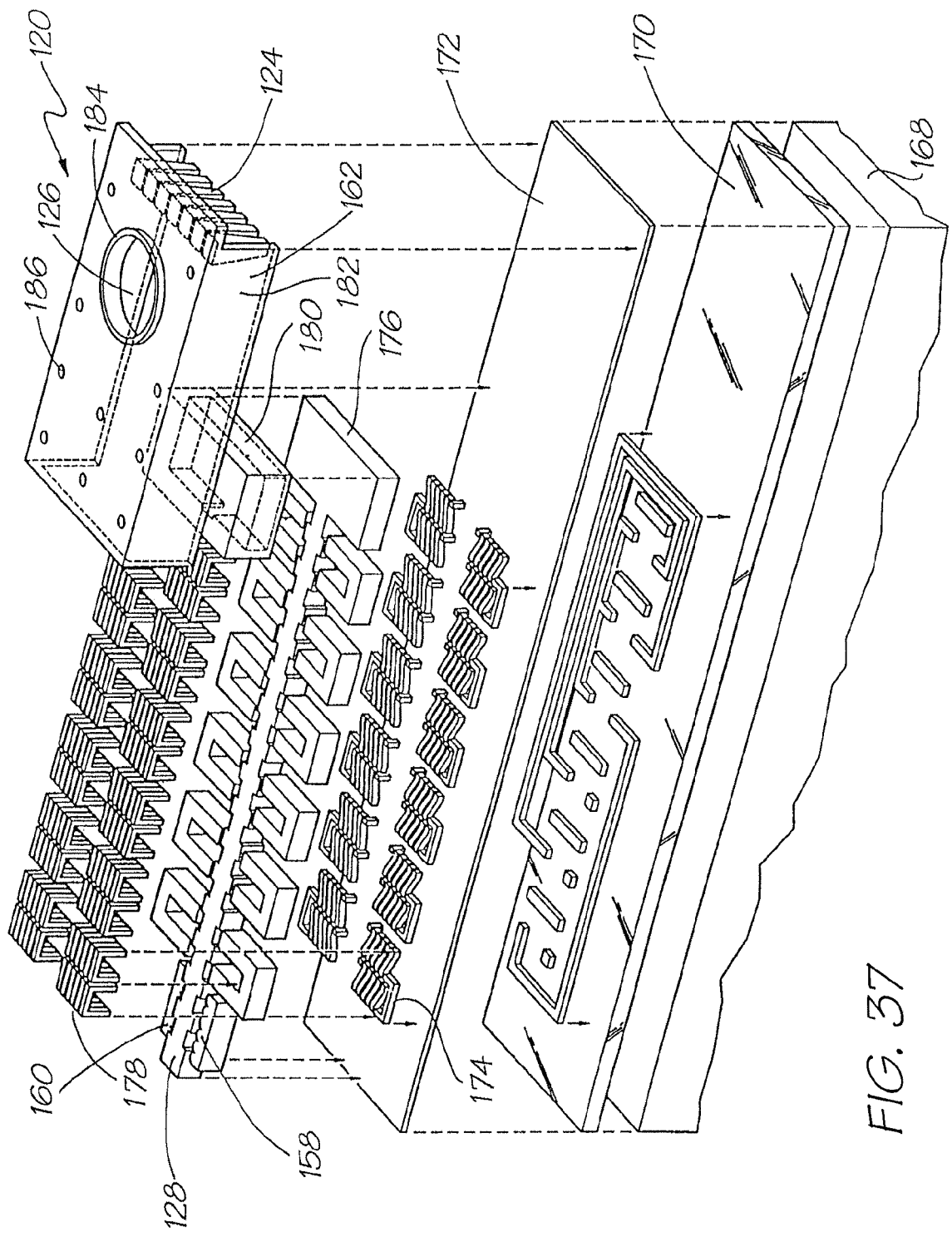
FIG. 37 is an exploded perspective view illustrating the construction of the ink jet nozzle of FIG. 36.

Turning now to FIG. 37, there is shown an exploded perspective of the various layers of the nozzle arrangement 120. The nozzle arrangement 120 can be constructed on top of a silicon wafer 168 which has a standard electronic circuitry layer such as a two level metal CMOS layer 170. The two metal CMOS layer 170 provides the drive and control circuitry for the ejection of ink from the nozzles 120 by interconnection of the electromagnets to the CMOS layer 170. On top of the CMOS layer 170 is a nitride passivation layer 172 which passivates the lower layers against any ink erosion in addition to any etching of the lower CMOS glass layer 170 should a sacrificial etching process be used in the construction of the nozzle arrangement 120.

On top of the nitride layer 172 are constructed various other layers. The wafer layer 168, the CMOS layer 170 and the nitride passivation layer 172 are constructed with the appropriate vias for interconnection with the above layers. On top of the nitride layer 172 is constructed a bottom copper layer 174 which interconnects with the CMOS layer 170 as appropriate. Next, a nickel ferrous layer 176 is constructed which includes portions for the core of the electromagnets 134 to 156 and the actuator 128 and guides 158, 160. On top of the NiFe layer 176 is constructed a second copper layer 178 which forms the rest of the electromagnetic device. The copper layer 178 can be constructed using a dual damascene process. Next, a PTFE layer 180 is laid down followed by a nitride layer 182 which defines the side filter portions 124 and side wall portions 162, 164 of the nozzle chamber 122. The ejection port 126 and a nozzle rim 184 are etched into the nitride layer 182. A number of apertures 186 are defined in the nitride layer 182 to facilitate etching away any sacrificial material used in the construction of the various lower layers including the nitride layer 182.

It will be understood by those skilled in the art of construction of micro-electro-mechanical systems (MEMS) that the various layers 170 to 182 can be constructed using a sacrificial material to support the layers. The sacrificial material is then etched away to release the components of the nozzle arrangement 120.

For a general introduction to a micro-electro mechanical system (MEMS) reference is made to standard proceedings in this field including the proceedings of the SPIE (International Society for Optical Engineering), volumes 2642 and 2882 which contain the proceedings for recent advances and conferences in this field.

Figure 38:
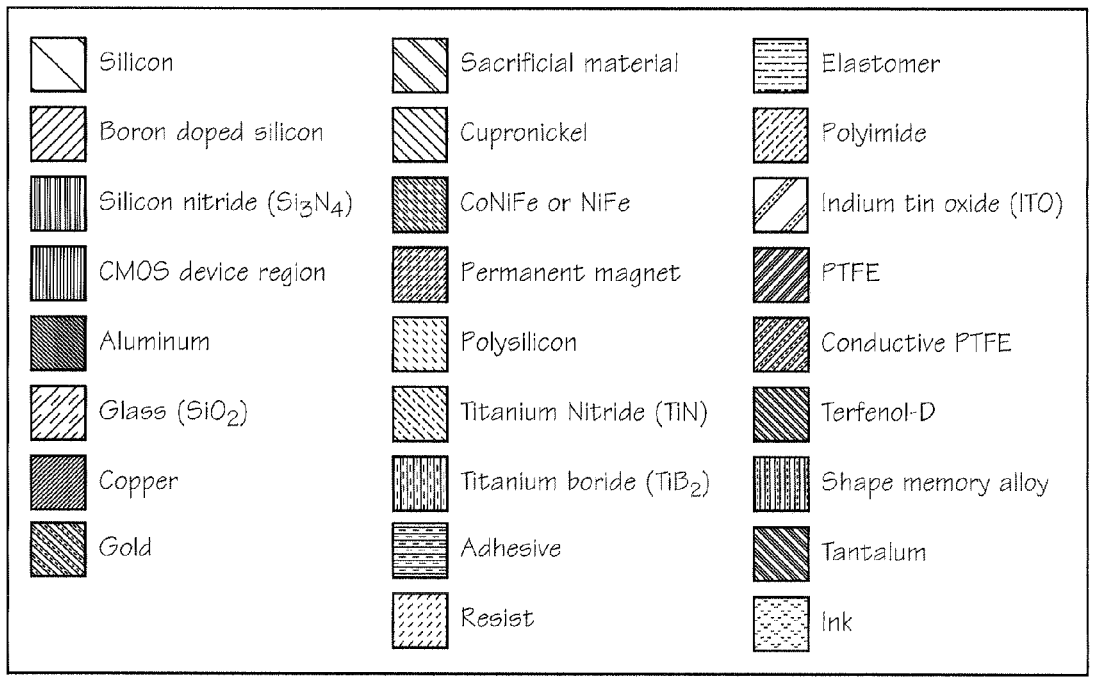
FIG. 38 provides a legend of the materials indicated in FIGS. 39 to 59.
Figure 39:
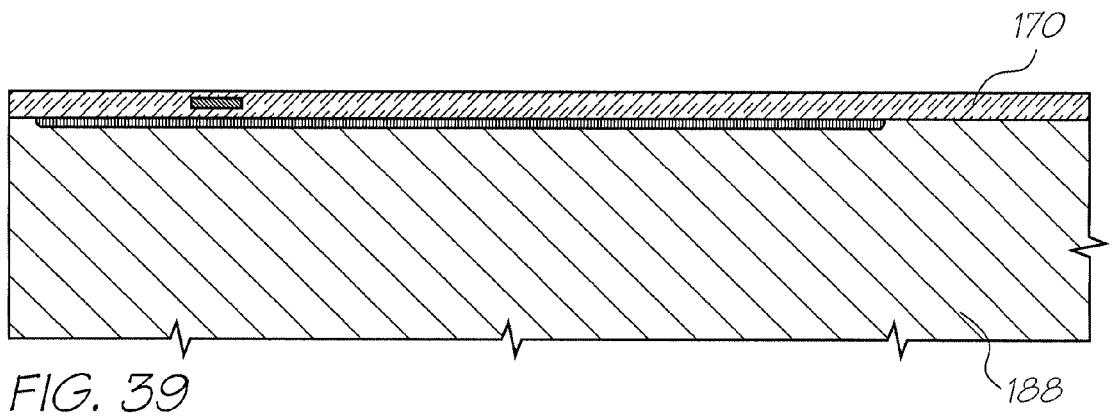
FIGS. 39 to 59 illustrate sectional views of the manufacturing steps in one form of construction of the ink jet printhead nozzle of FIG. 36.

One form of detailed manufacturing process which can be used to fabricate monolithic ink jet print heads operating in accordance with the principles taught by the present embodiment can proceed utilizing the following steps:

1. Using a double sided polished wafer 188, complete drive transistors, data distribution, and timing circuits using a 0.5 micron, one poly, 2 metal CMOS process. This step is shown in FIG. 39. For clarity, these diagrams may not be to scale, and may not represent a cross section though any single plane of the nozzle 120. FIG. 38 is a key to representations of various materials in these manufacturing diagrams, and those of other cross-referenced ink jet configurations.

2. Deposit 1 micron of sacrificial material 190.

Figure 40:
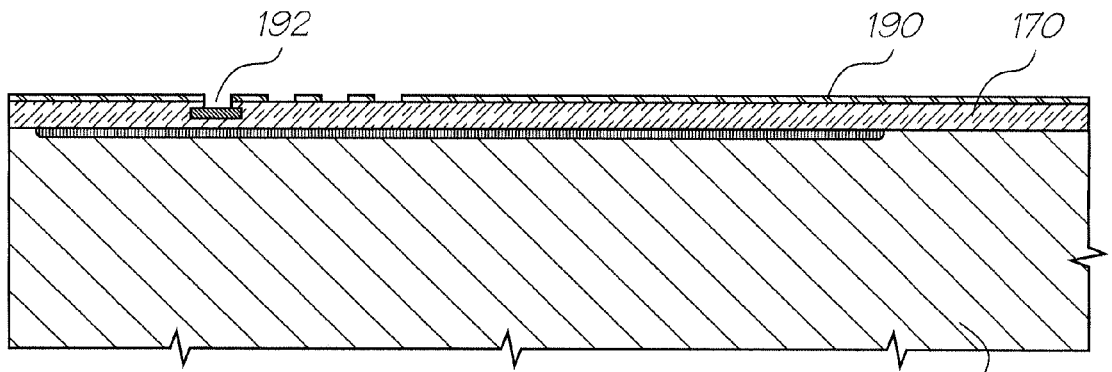

3. Etch the sacrificial material 190 and the CMOS oxide layers down to second level metal using Mask 1. This mask defines contact vias 192 from the second level metal electrodes to the solenoids. This step is shown in FIG. 40.

4. Deposit a barrier layer of titanium nitride (TiN) and a seed layer of copper.

Figure 41:
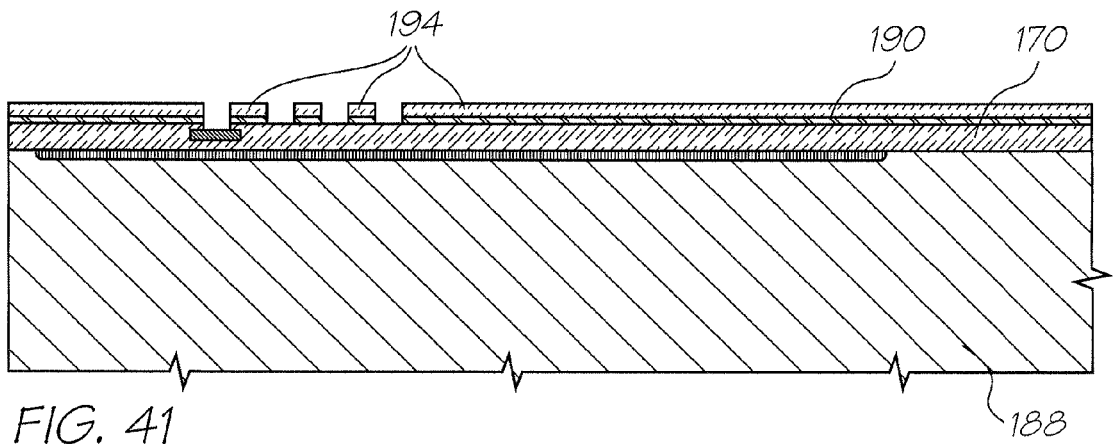

5. Spin on 2 microns of resist 194, expose with Mask 2, and develop. This mask defines the lower side of a solenoid square helix. The resist 194 acts as an electroplating mold. This step is shown in FIG. 41.

6. Electroplate 1 micron of copper 196. Copper is used for its low resistivity (which results in higher efficiency) and its high electromigration resistance, which increases reliability at high current densities.

Figure 42:
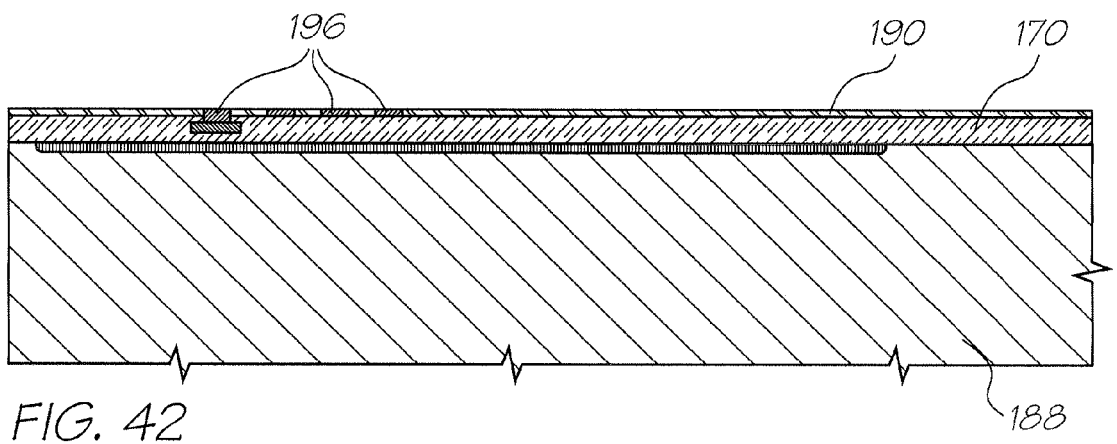

7. Strip the resist 198 and etch the exposed barrier and seed layers. This step is shown in FIG. 42.

8. Deposit 0.1 microns of silicon nitride.

9. Deposit a seed layer of cobalt nickel iron alloy. CoNiFe is chosen due to a high saturation flux density of 2 Tesla, and a low coercivity. [Osaka, Tetsuya et al, A soft magnetic CoNiFe film with high saturation magnetic flux density, Nature 392, 796-798 (1998)].

Figure 43:
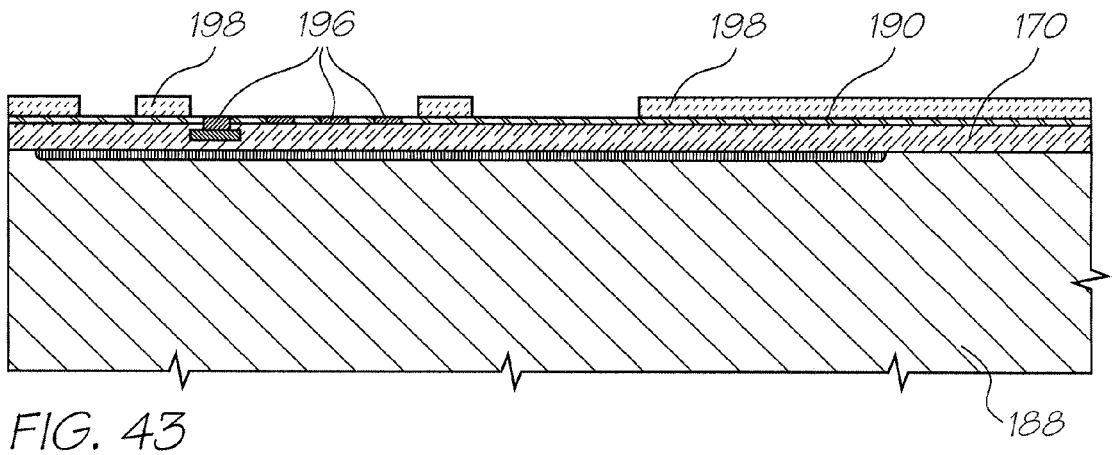

10. Spin on 3 microns of resist 198, expose with Mask 3, and develop. This mask defines all of the soft magnetic parts, being the fixed magnetic pole of the electromagnets, 134 to 156, the moving poles of the linear actuator 128, the horizontal guides 158, 160, and the core of the ink plunger 130. The resist 198 acts as an electroplating mold. This step is shown in FIG. 43.

Figure 44:
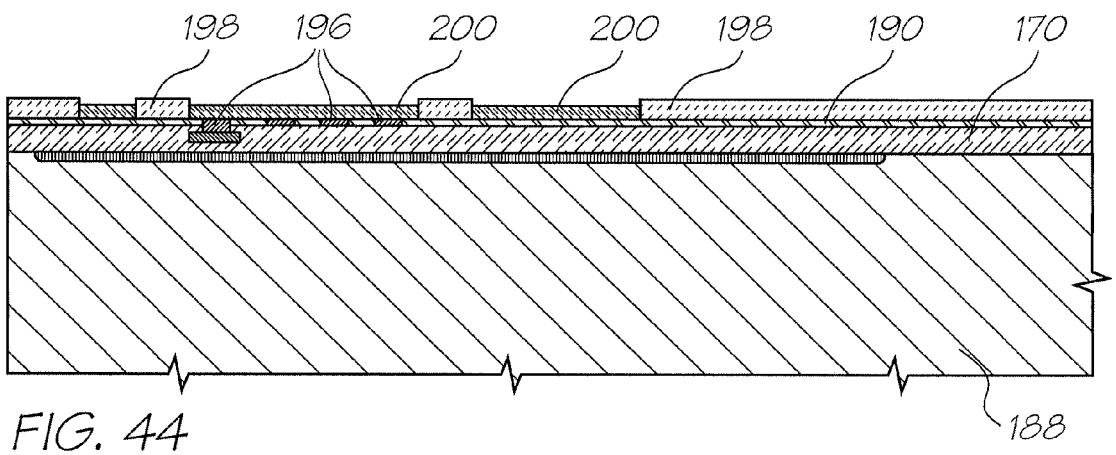

11. Electroplate 2 microns of CoNiFe 200. This step is shown in FIG. 44.

Figure 45:
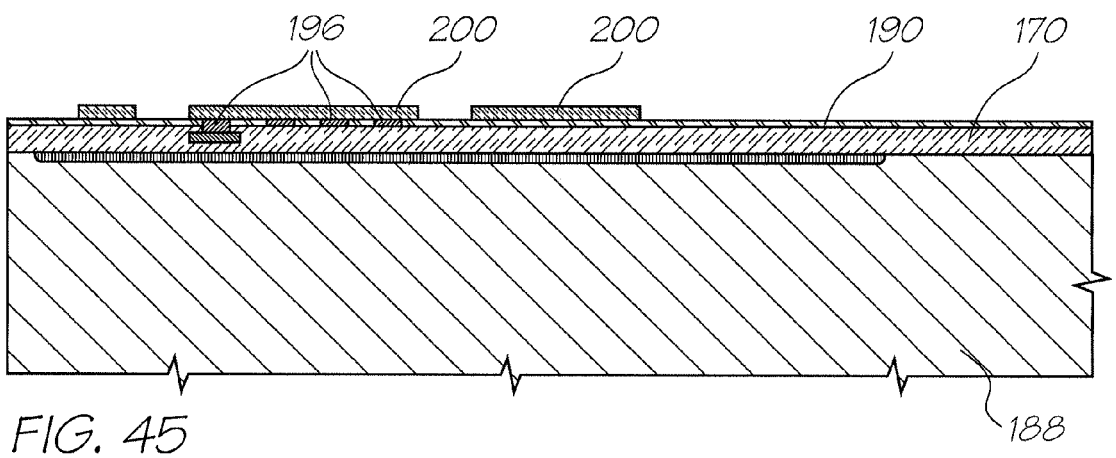

12. Strip the resist 198 and etch the exposed seed layer. This step is shown in FIG. 45.

13. Deposit 0.1 microns of silicon nitride (Si3N4) (not shown).

Figure 46:
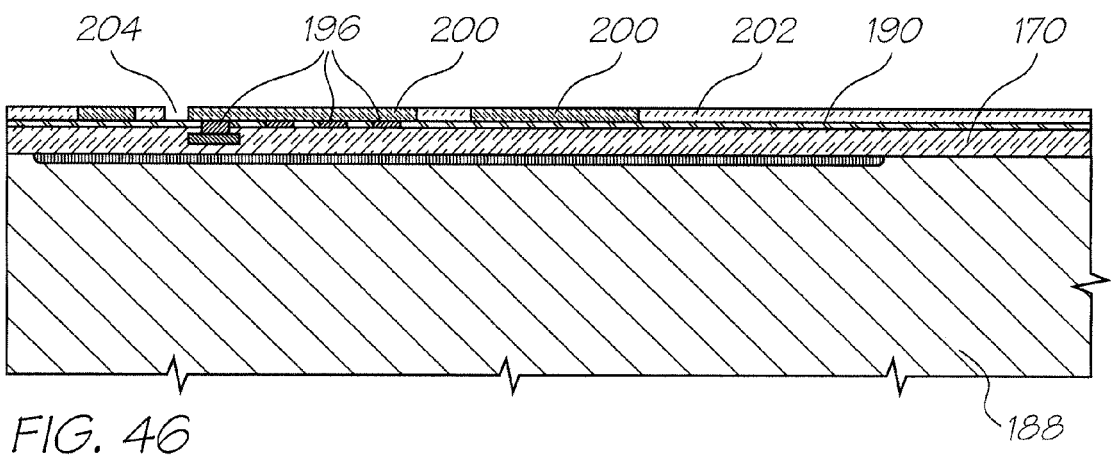

14. Spin on 2 microns of resist 202, expose with Mask 4, and develop. This mask defines solenoid vertical wire segments 204, for which the resist acts as an electroplating mold. This step is shown in FIG. 46.

15. Etch the nitride down to copper using the Mask 4 resist.

Figure 47:
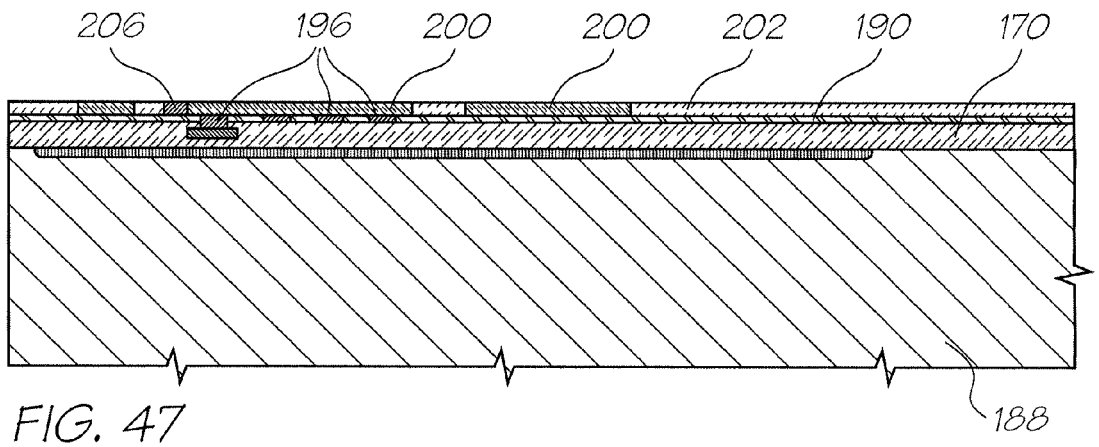

16. Electroplate 2 microns of copper 206. This step is shown in FIG. 47.

17. Deposit a seed layer of copper.

Figure 48:
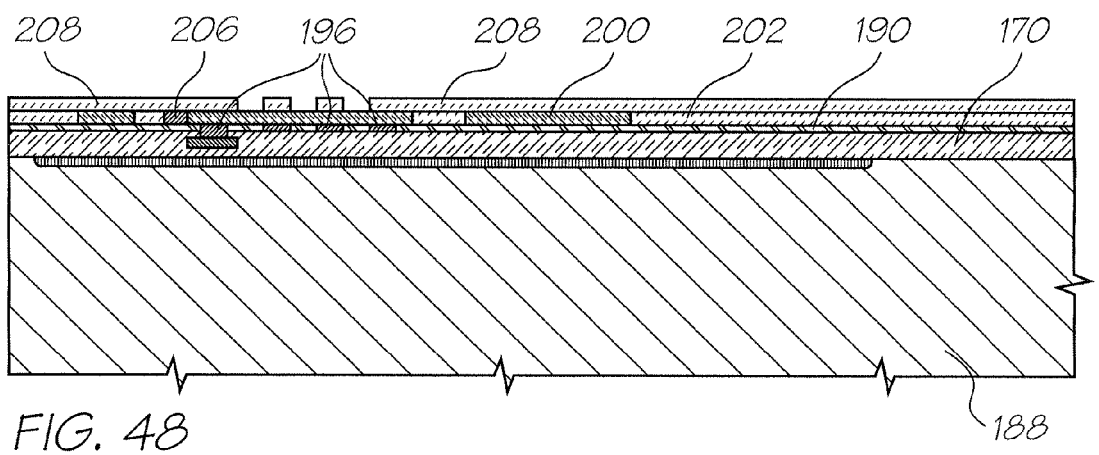

18. Spin on 2 microns of resist 208, expose with Mask 5, and develop. This mask defines the upper side of the solenoid square helix. The resist 208 acts as an electroplating mold. This step is shown in FIG. 48.

Figure 49:
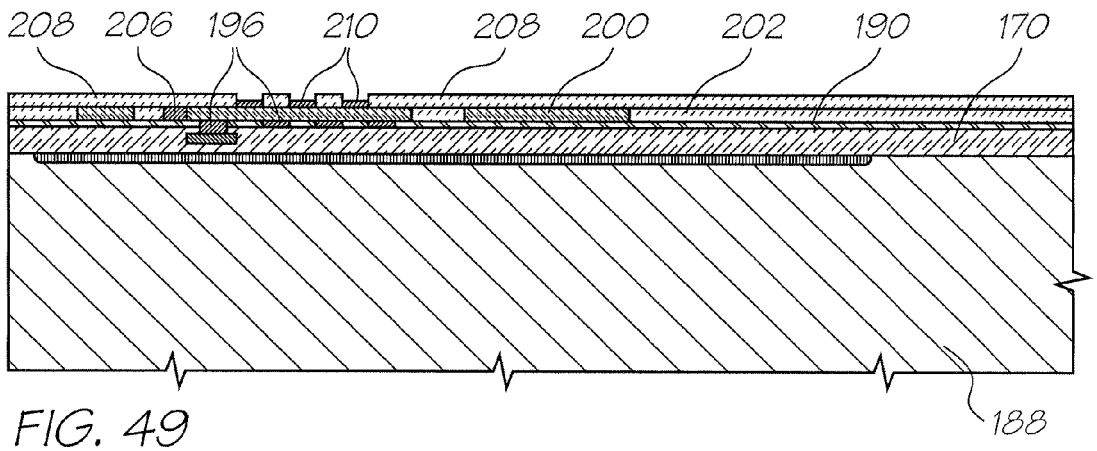

19. Electroplate 1 micron of copper 210. This step is shown in FIG. 49.

Figure 50:
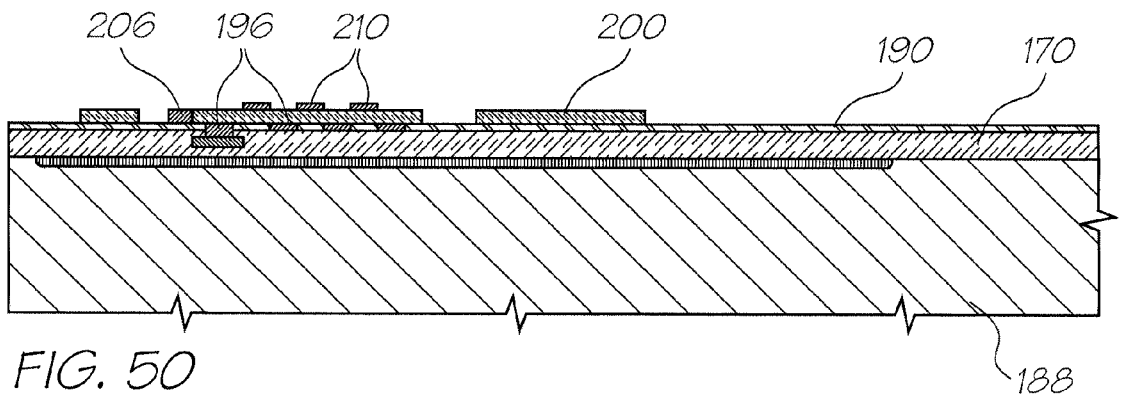

20. Strip the resist and etch the exposed copper seed layer, and strip the newly exposed resist. This step is shown in FIG. 50.

21. Open the bond pads using Mask 6.

22. Wafer probe. All electrical connections are complete at this point, bond pads are accessible, and the chips are not yet separated.

23. Deposit 5 microns of PTFE 212.

Figure 51:
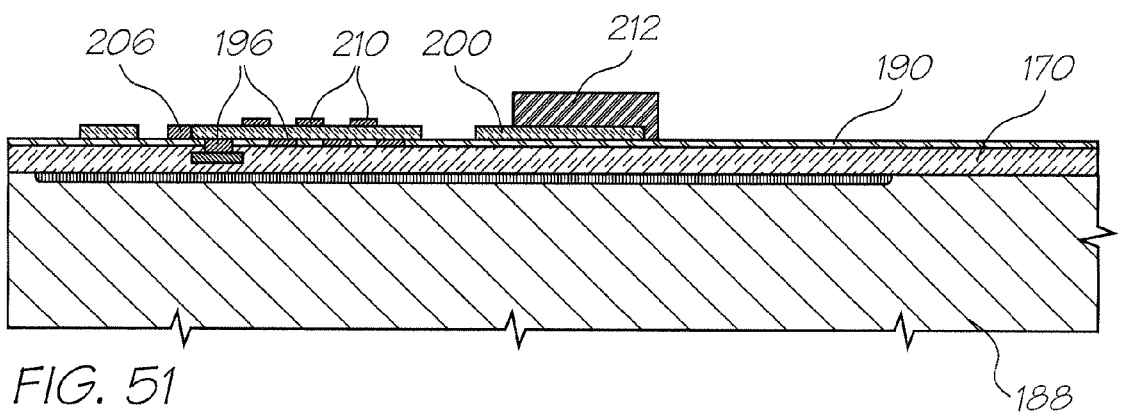

24. Etch the PTFE 212 down to the sacrificial layer using Mask 7. This mask defines the ink plunger 130. This step is shown in FIG. 51.

Figure 52:
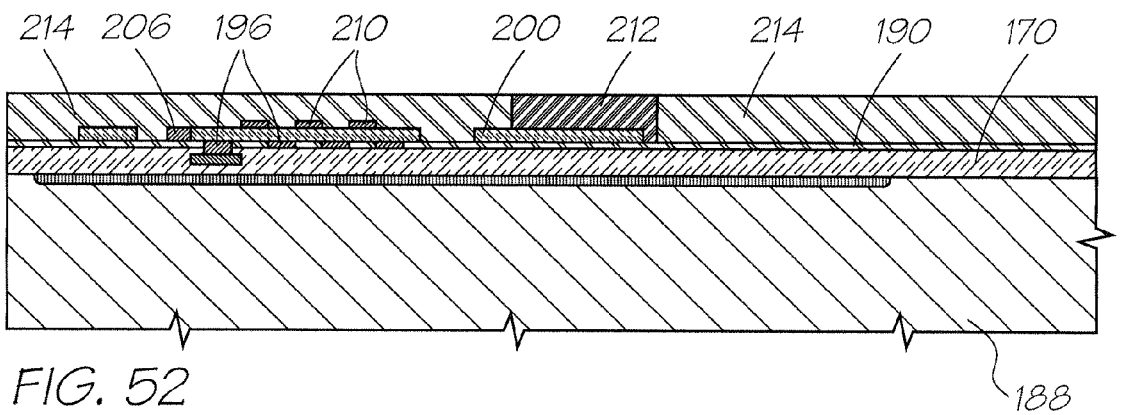

25. Deposit 8 microns of sacrificial material 214. Planarize using CMP to the top of the PTFE ink plunger 130. This step is shown in FIG. 52.

Figure 53:
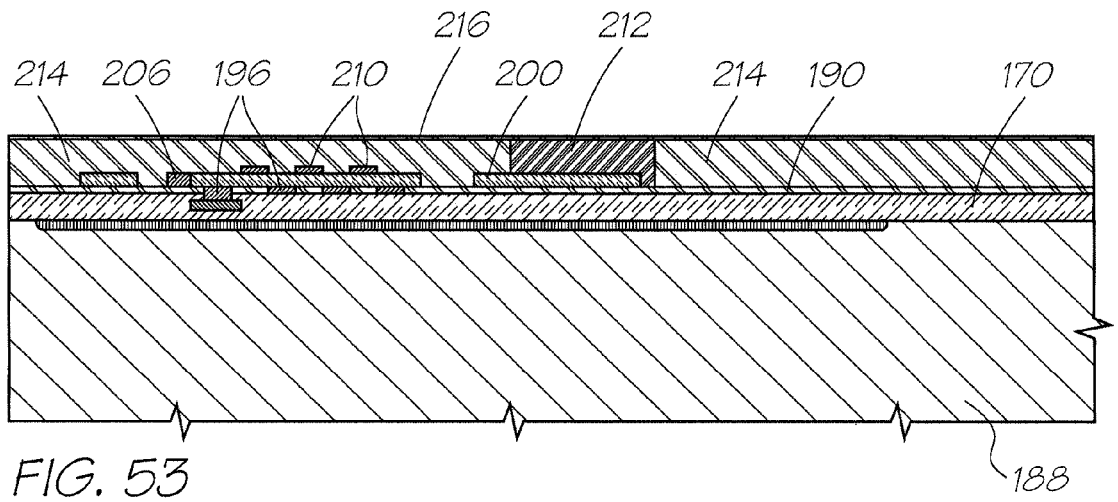

26. Deposit 0.5 microns of sacrificial material 216. This step is shown in FIG. 53.

Figure 54:
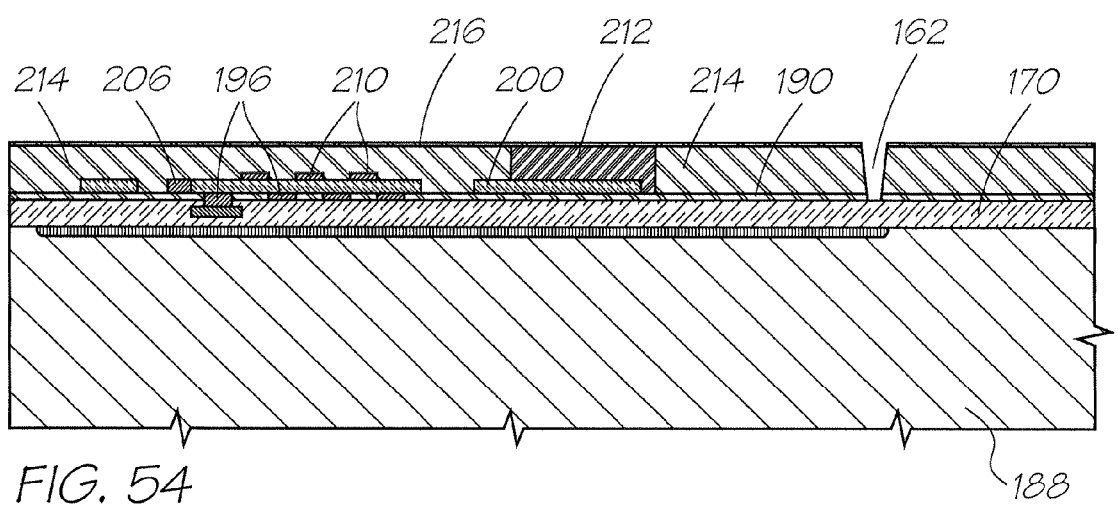

27. Etch all layers of sacrificial material using Mask 8. This mask defines the nozzle chamber walls 162, 164. This step is shown in FIG. 54.

28. Deposit 3 microns of PECVD glass 218.

Figure 55:
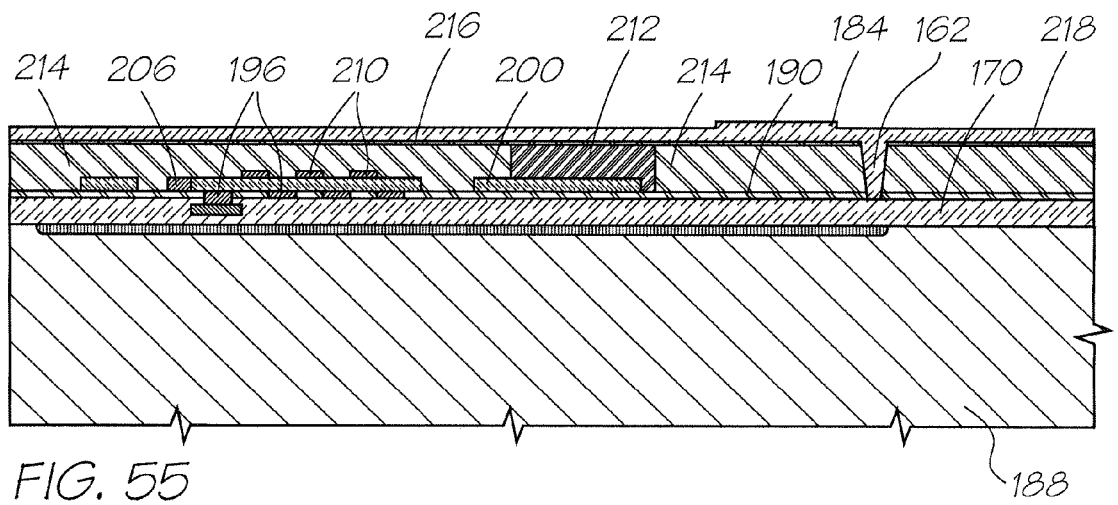

29. Etch to a depth of (approx.) 1 micron using Mask 9. This mask defines the nozzle rim 184. This step is shown in FIG. 55.

Figure 56:
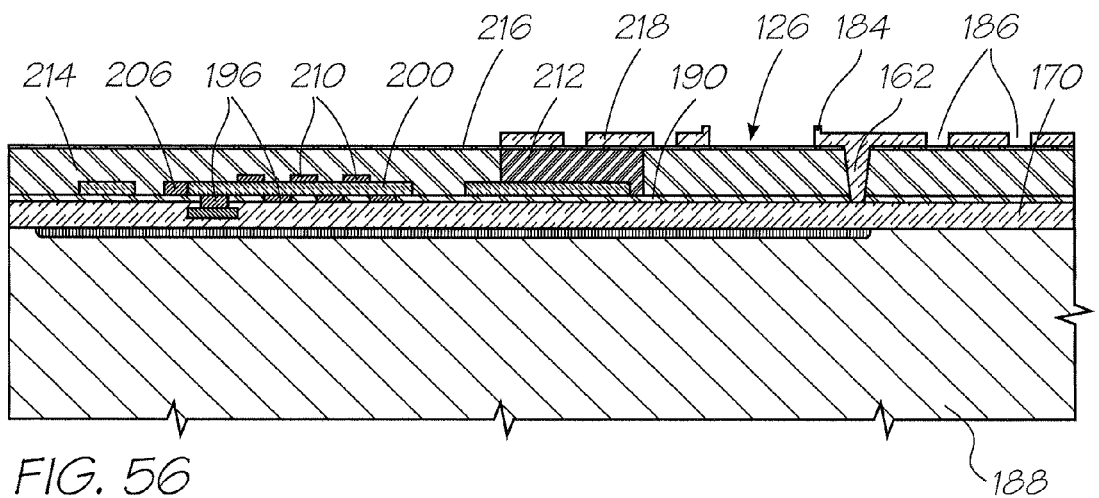

30. Etch down to the sacrificial layer using Mask 10. This mask defines the roof of the nozzle chamber 122, the ink ejection port 126, and the sacrificial etch access apertures 186. This step is shown in FIG. 56.

Figure 57:
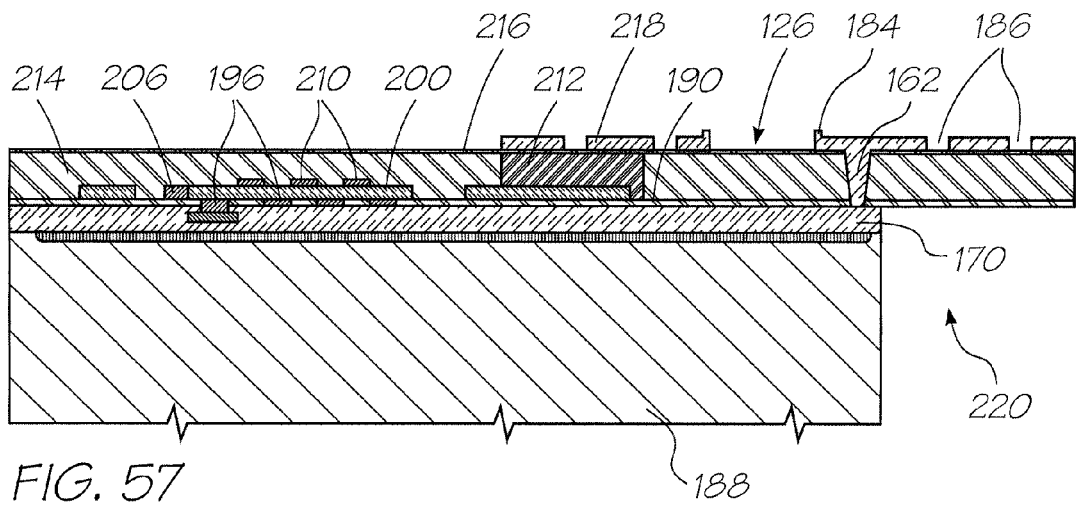

31. Back-etch completely through the silicon wafer (with, for example, an ASE Advanced Silicon Etcher from Surface Technology Systems) using Mask 11. Continue the back-etch through the CMOS glass layers until the sacrificial layer is reached. This mask defines ink inlets 220 which are etched through the wafer 168. The wafer 168 is also diced by this etch. This step is shown in FIG. 57.

Figure 58:
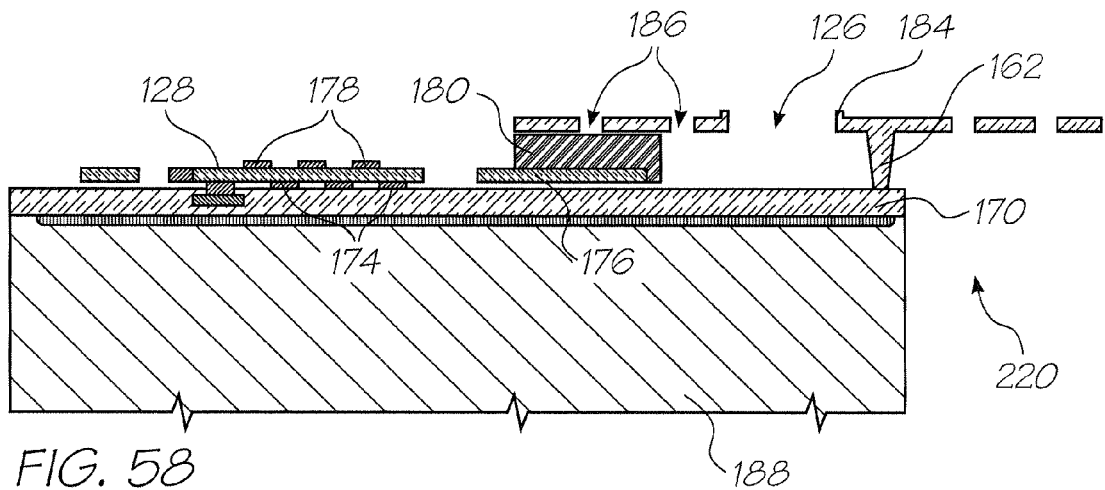

32. Etch the sacrificial material away. The nozzle chambers 122 are cleared, the actuators 128 freed, and the chips are separated by this etch. This step is shown in FIG. 58.

33. Mount the printheads in their packaging, which may be a molded plastic former incorporating ink channels which supply the appropriate color ink to the ink inlets 220 at the back of the wafer. The package also includes a piezoelectric actuator attached to the rear of the ink channels. The piezoelectric actuator provides the oscillating ink pressure required for the ink jet operation.

34. Connect the printheads to their interconnect systems. For a low profile connection with minimum disruption of airflow, TAB may be used. Wire bonding may also be used if the printer is to be operated with sufficient clearance to the paper.

35. Hydrophobize the front surface of the printheads.

Figure 59:
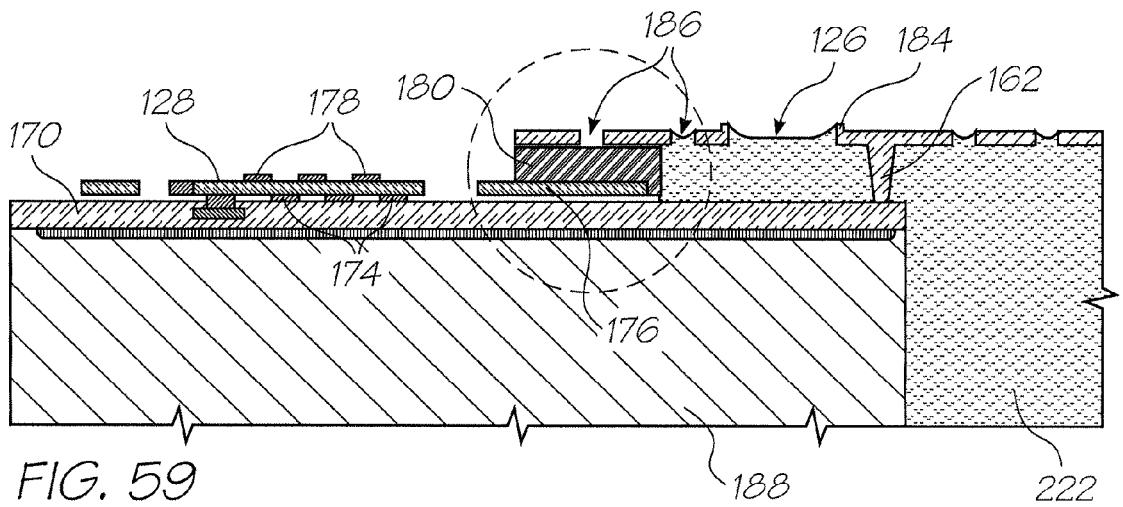
Figure 59A:
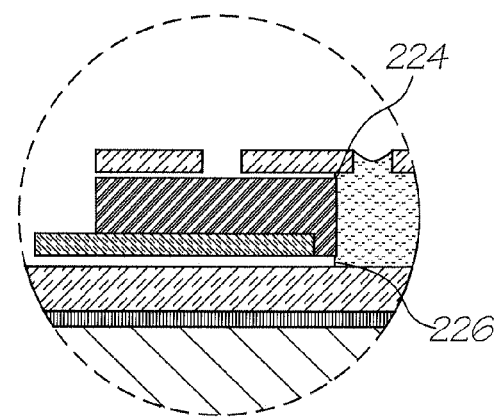

36. Fill the completed printheads with ink 222 and test them. A filled nozzle is shown in FIG. 59.

IJ27 Printhead—U.S. Pat. No. 6,390,603

The following embodiment is referred to by the Applicant as the IJ27 printhead. This printhead is described below with reference to FIGS. 60 to 75, and in U.S. Pat. No. 6,390,603 the contents of which are incorporated by cross reference above. In the description of the IJ27 embodiment, features and elements shown in FIGS. 60 to 75 are indicated by the same reference numerals as those used to indicate the same or closely corresponding features and elements of the embodiments shown in FIGS. 1 to 59.

In the IJ27 embodiment, a "roof shooting" ink jet printhead is constructed utilizing a buckle plate actuator for the ejection of ink. In the preferred embodiment, the buckle plate actuator is constructed from polytetrafluoroethylene (PTFE) which provides superior thermal expansion characteristics. The PTFE is heated by an integral, serpentine shaped heater, which preferably is constructed from a resistive material, such as copper.

Figure 60:
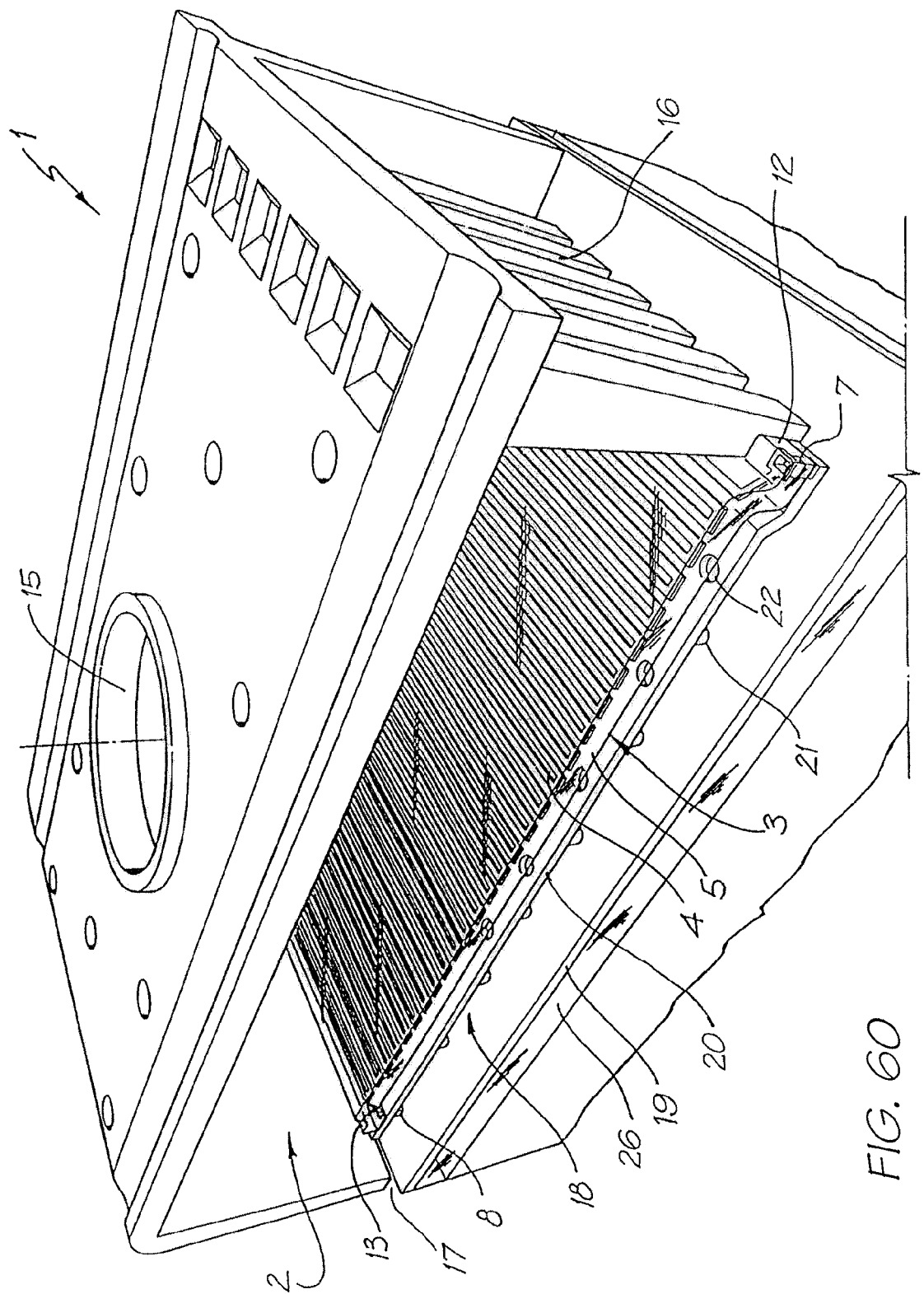
FIG. 60 is a perspective view partly in sections of a single ink jet nozzle constructed in accordance with the preferred embodiment.

Turning now to FIG. 60 there is shown a sectional perspective view of an ink jet printhead 1 of the preferred embodiment. The ink jet printhead includes a nozzle chamber 2 in which ink is stored to be ejected. The chamber 2 can be independently connected to an ink supply (not shown) for the supply and refilling of the chamber. At the base of the chamber 2 is a buckle plate 3 which comprises a heater element 4 which can be of an electrically resistive material such as copper. The heater element 4 is encased in a polytetrafluoroethylene layer 5. The utilization of the PTFE layer 5 allows for high rates of thermal expansion and therefore more effective operation of the buckle plate 3. PTFE has a high coefficient of thermal expansion ($770\times10^{-6}$) with the copper having a much lower degree of thermal expansion. The copper heater element 4 is therefore fabricated in a serpentine pattern so as to allow the expansion of the PTFE layer to proceed unhindered. The serpentine fabrication of the heater element 4 means that the two coefficients of thermal expansion of the PTFE and the heater material need not be closely matched. The PTFE is primarily chosen for its high thermal expansion properties.

Current can be supplied to the buckle plate 3 by means of connectors 7, 8 which inter-connect the buckle plate 3 with a lower drive circuitry and logic layer 26. Hence, to operate the ink jet head 1, the heater coil 4 is energized thereby heating the PTFE 5. The PTFE 5 expands and buckles between end portions 12, 13. The buckle causes initial ejection of ink out of a nozzle 15 located at the top of the nozzle chamber 2. There is an air bubble between the buckle plate 3 and the adjacent wall of the chamber which forms due to the hydrophobic nature of the PTFE on the back surface of the buckle plate 3. An air vent 17 connects the air bubble to the ambient air through a channel 18 formed between a nitride layer 19 and an additional PTFE layer 20, separated by posts, e.g. 21, and through holes, e.g. 22, in the PTFE layer 20. The air vent 17 allows the buckle plate 3 to move without being held back by a reduction in air pressure as the buckle plate 3 expands. Subsequently, power is turned off to the buckle plate 3 resulting in a collapse of the buckle plate and the sucking back of some of the ejected ink. The forward motion of the ejected ink and the sucking back is resolved by an ink drop breaking off from the main volume of ink and continuing onto a page. Ink refill is then achieved by surface tension effects across the nozzle part 15 and a resultant inflow of ink into the nozzle chamber 2 through the grilled supply channel 16.

Subsequently the nozzle chamber 2 is ready for refiring.

It has been found in simulations of the preferred embodiment that the utilization of the PTFE layer and serpentine heater arrangement allows for a substantial reduction in energy requirements of operation in addition to a more compact design.

Figure 61:
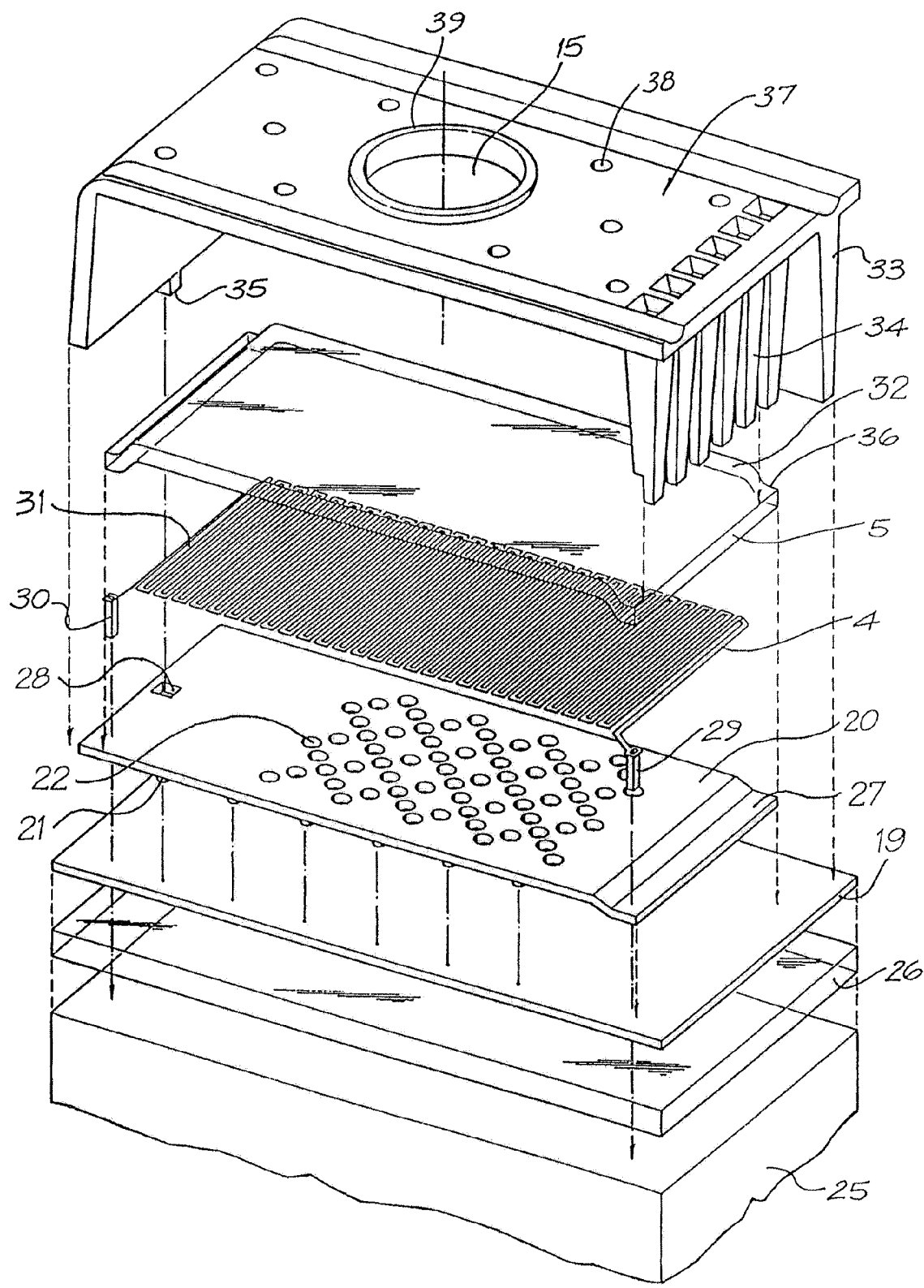
FIG. 61 is an exploded perspective view partly in section illustrating the construction of a single ink nozzle in accordance with the preferred embodiment of the present invention.

Turning now to FIG. 61, there is provided an exploded perspective view partly in section illustrating the construction of a single ink jet nozzle in accordance with the preferred embodiment. The nozzle arrangement 1 is fabricated on top of a silicon wafer 25. The nozzle arrangement 1 can be constructed on the silicon wafer 25 utilizing standard semi-conductor processing techniques in addition to those techniques commonly used for the construction of micro-electro-mechanical systems (MEMS). For a general introduction to a micro-electro mechanical system (MEMS) reference is made to standard proceedings in this field including the proceedings of the SPIE (International Society for Optical Engineering), volumes 2642 and 2882 which contain the proceedings for recent advances and conferences in this field.

On top of the silicon layer 25 is deposited a two level CMOS circuitry layer 26 which substantially comprises glass, in addition to the usual metal layers. Next a nitride layer 19 is deposited to protect and passivate the underlying layer 26. The nitride layer 19 also includes vias for the interconnection of the heater element 4 to the CMOS layer 26. Next, a PTFE layer 20 is constructed having the aforementioned holes, e.g. 22, and posts, e.g. 21. The structure of the PTFE layer 20 can be formed by first laying down a sacrificial glass layer (not shown) onto which the PTFE layer 20 is deposited. The PTFE layer 20 includes various features, for example, a lower ridge portion 27 in addition to a hole 28 which acts as a via for the subsequent material layers. The buckle plate 3 (FIG. 60) comprises a conductive layer 31 and a PTFE layer 32. A first, thicker PTFE layer is deposited onto a sacrificial layer (not shown). Next, a conductive layer 31 is deposited including contacts 29, 30. The conductive layer 31 is then etched to form a serpentine pattern. Next, a thinner, second PTFE layer is deposited to complete the buckle plate 3 (FIG. 60) structure.

Finally, a nitride layer can be deposited to form the nozzle chamber proper. The nitride layer can be formed by first laying down a sacrificial glass layer and etching this to form walls, e.g. 33, and grilled portions, e.g. 34. Preferably, the mask utilized results in a first anchor portion 35 which mates with the hole 28 in layer 20. Additionally, the bottom surface of the grill, for example 34 meets with a corresponding step 36 in the PTFE layer 32. Next, a top nitride layer 37 can be formed having a number of holes, e.g. 38, and nozzle port 15 around which a rim 39 can be etched through etching of the nitride layer 37. Subsequently the various sacrificial layers can be etched away so as to release the structure of the thermal actuator and the air vent channel 18 (FIG. 60).

Figure 62:
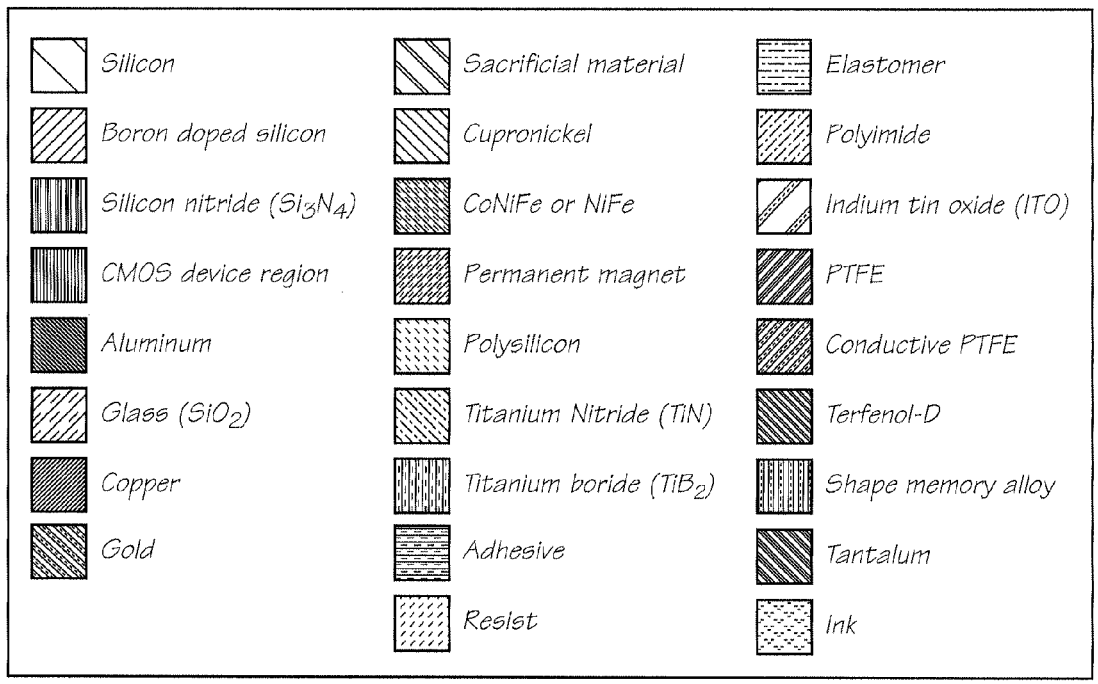
FIG. 62 provides a legend of the materials indicated in FIG. 63 to 75.
Figure 63:
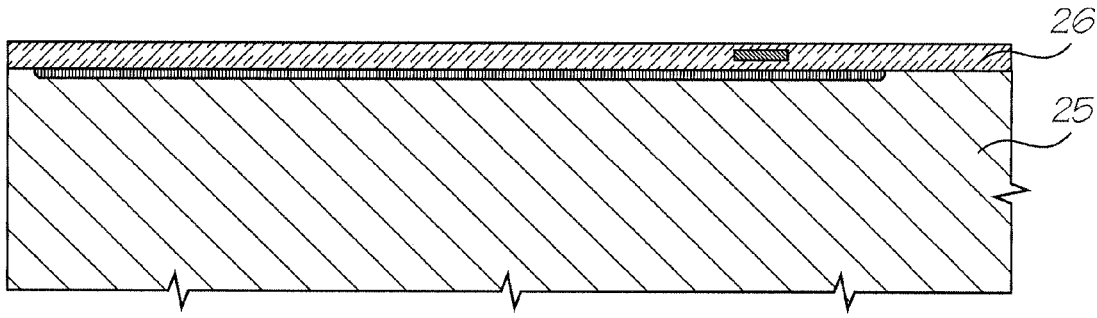
FIGS. 63 to 75 illustrate sectional views of the manufacturing steps in one form of construction of an ink jet printhead nozzle.

One form of detailed manufacturing process which can be used to fabricate monolithic ink jet print heads operating in accordance with the principles taught by the present embodiment can proceed utilizing the following steps:

1. Using a double sided polished wafer 25, complete drive transistors, data distribution, and timing circuits 26 using a 0.5 micron, one poly, 2 metal CMOS process. Relevant features of the wafer 25 at this step are shown in FIG. 63. For clarity, these diagrams may not be to scale, and may not represent a cross section though any single plane of the nozzle. FIG. 62 is a key to representations of various materials in these manufacturing diagrams, and those of other cross referenced ink jet configurations.

2. Deposit 1 micron of low stress nitride 19. This acts as a barrier to prevent ink diffusion through the silicon dioxide of the chip surface.

3. Deposit 2 microns of sacrificial material 50 (e.g. polyimide).

Figure 64:
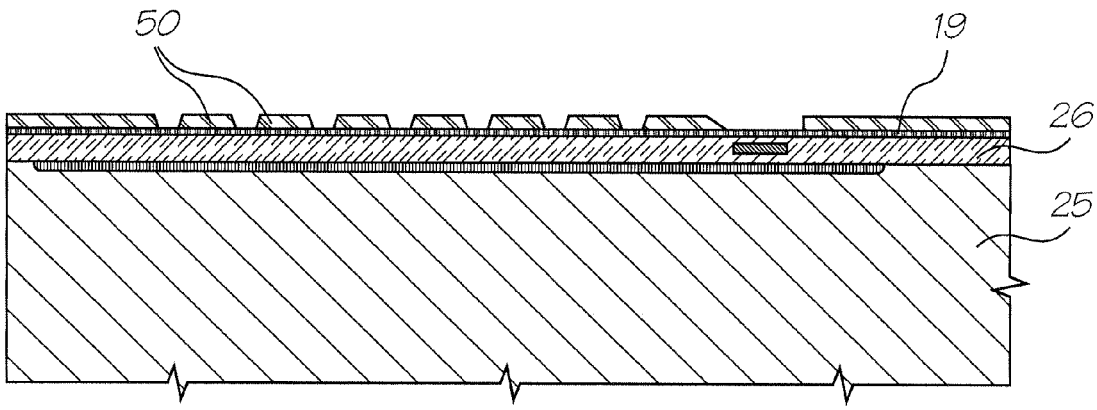

4. Etch the sacrificial layer 50 using Mask 1. This mask defines the PTFE venting layer support pillars 21 and anchor point. This step is shown in FIG. 64.

5. Deposit 2 microns of PTFE 20.

Figure 65:
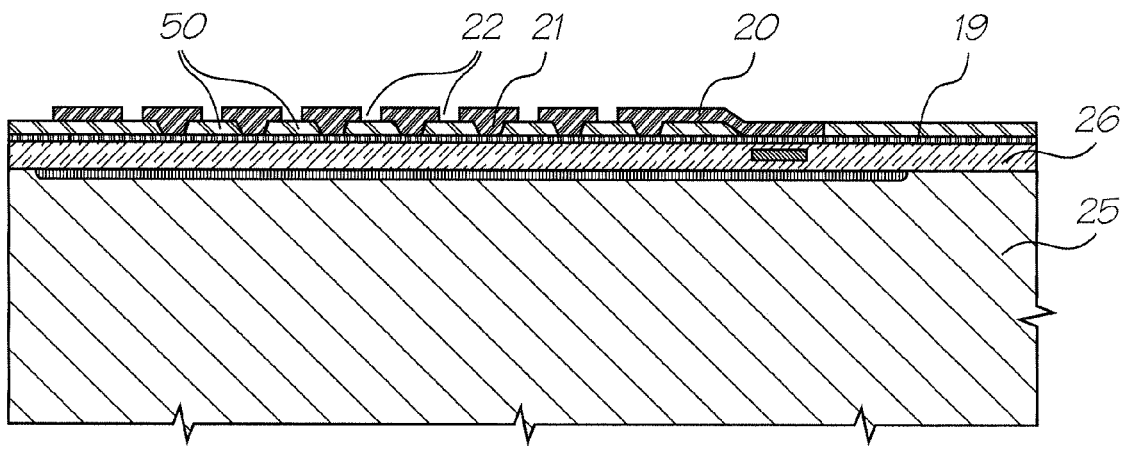

6. Etch the PTFE 20 using Mask 2. This mask defines the edges of the PTFE venting layer 20, and the holes 22 in this layer 20. This step is shown in FIG. 65.

7. Deposit 3 microns of sacrificial material 51.

Figure 66:
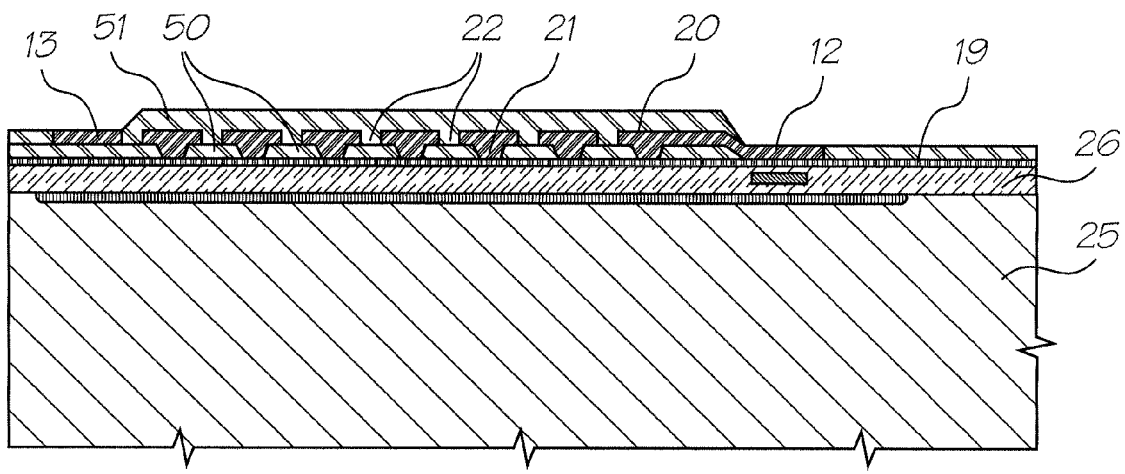

8. Etch the sacrificial layer 51 using Mask 3. This mask defines the anchor points 12, 13 at both ends of the buckle actuator. This step is shown in FIG. 66.

9. Deposit 1.5 microns of PTFE 31.

10. Deposit and pattern resist using Mask 4. This mask defines the heater 11.

Figure 67:
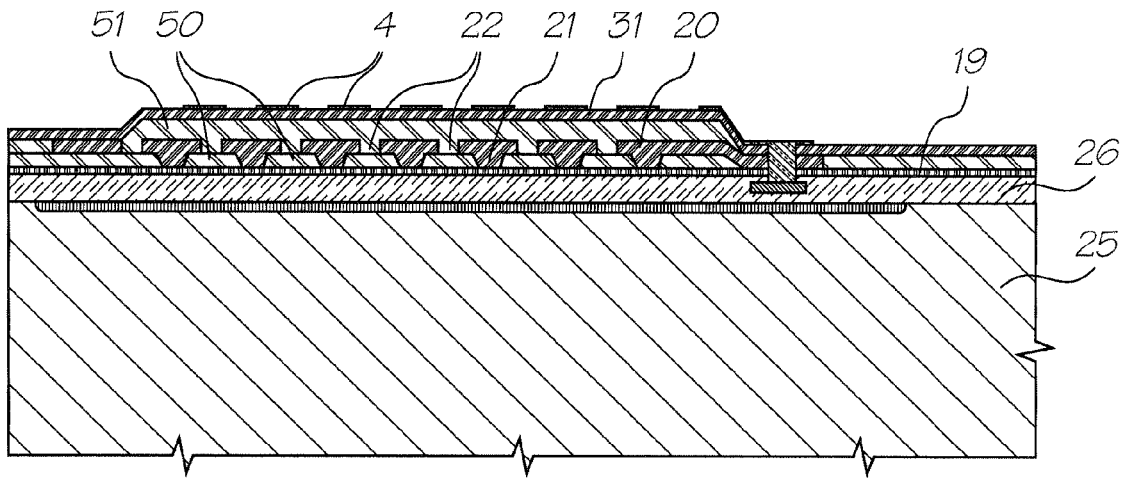

11. Deposit 0.5 microns of gold (or other heater material with a low Young's modulus) and strip the resist. Steps 10 and 11 form a lift-off process. This step is shown in FIG. 67.

12. Deposit 0.5 microns of PTFE 32.

Figure 68:
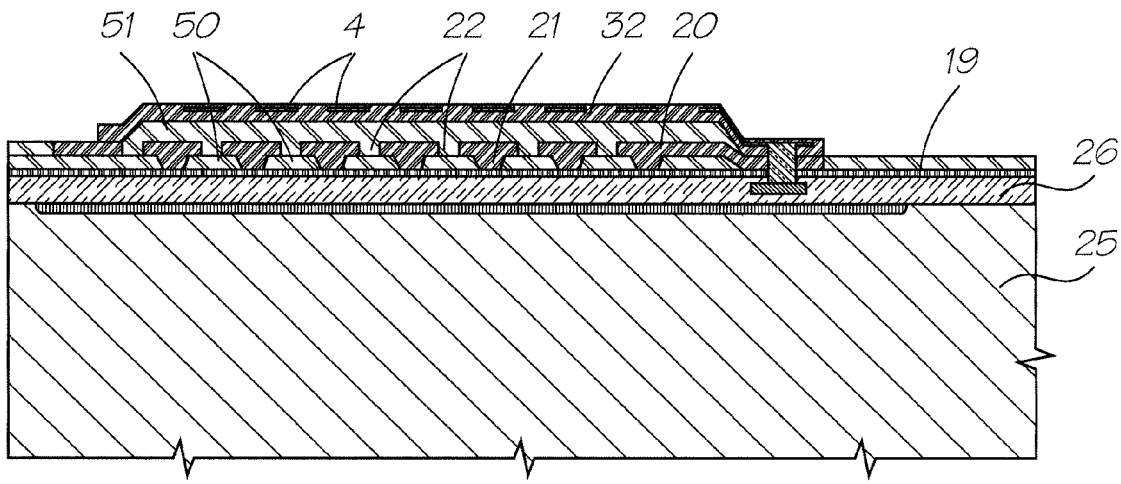

13. Etch the PTFE 32 down to the sacrificial layer 51 using Mask 5. This mask defines the actuator paddle 3 and the bond pads. This step is shown in FIG. 68.

14. Wafer probe. All electrical connections are complete at this point, and the chips are not yet separated.

15. Plasma process the PTFE to make the top and side surfaces of the buckle actuator hydrophilic. This allows the nozzle chamber 2 to fill by capillarity.

16. Deposit 10 microns of sacrificial material 52.

Figure 69:
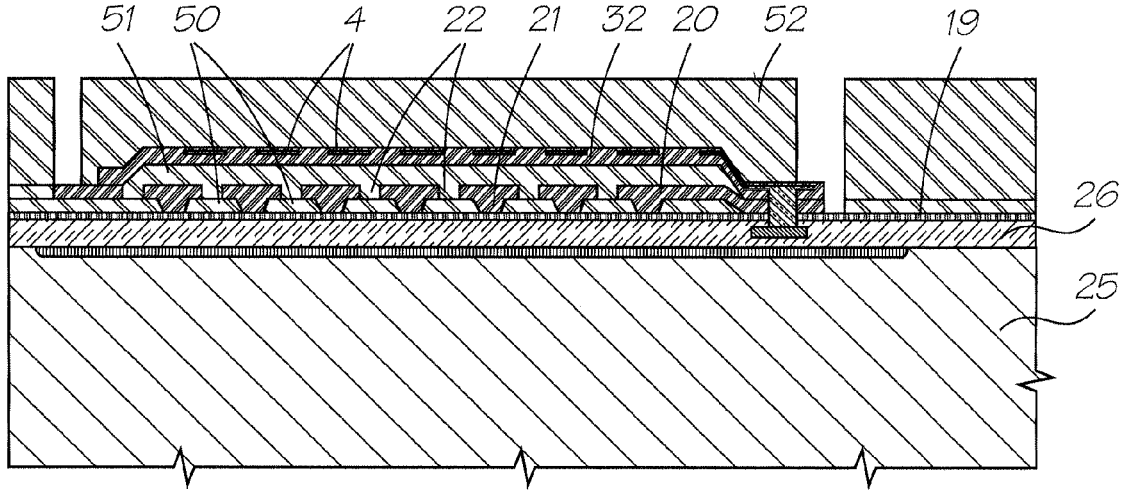

17. Etch the sacrificial material 52 down to nitride 19 using Mask 6. This mask defines the nozzle chamber 2. This step is shown in FIG. 69.

Figure 70:
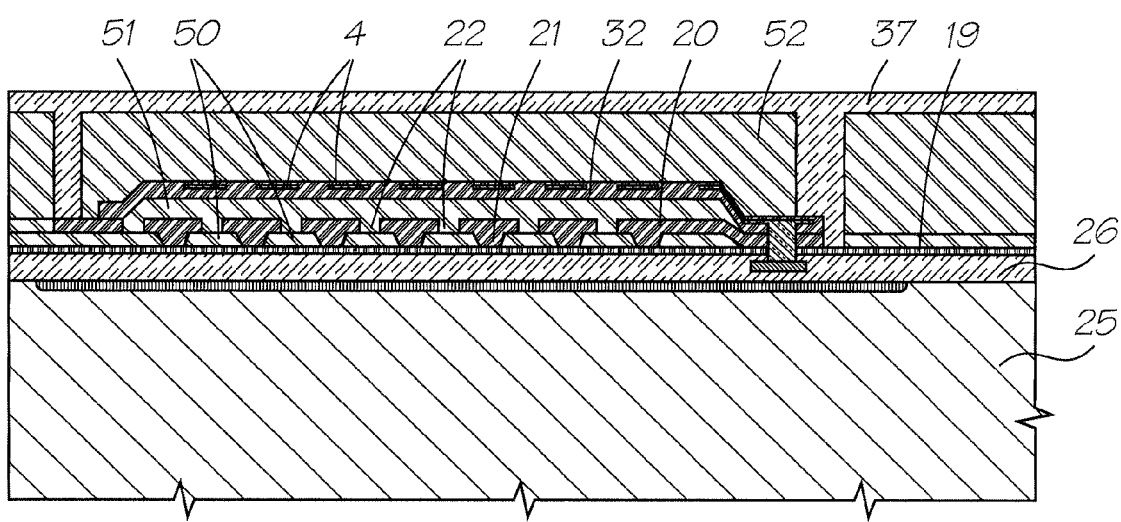

18. Deposit 3 microns of PECVD glass 37. This step is shown in FIG. 70.

Figure 71:
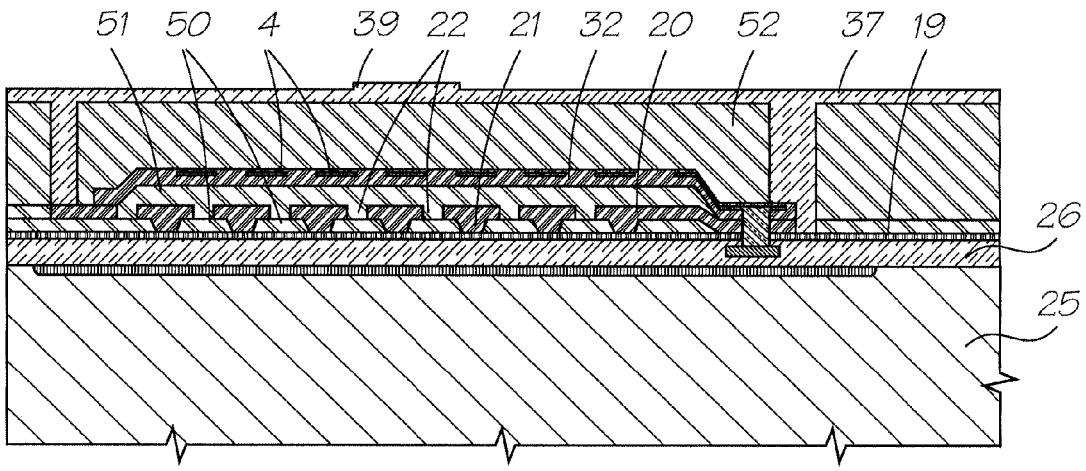

19. Etch to a depth of 1 micron using Mask 7. This mask defines the nozzle rim 39. This step is shown in FIG. 71.

Figure 72:
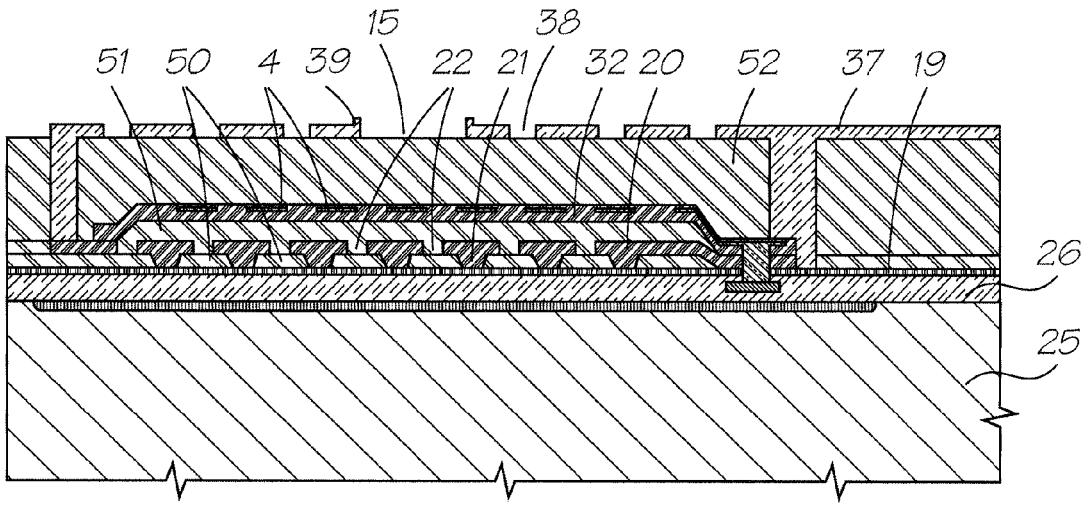

20. Etch down to the sacrificial layer 52 using Mask 8. This mask defines the nozzle 15 and the sacrificial etch access holes 38. This step is shown in FIG. 72.

Figure 73:
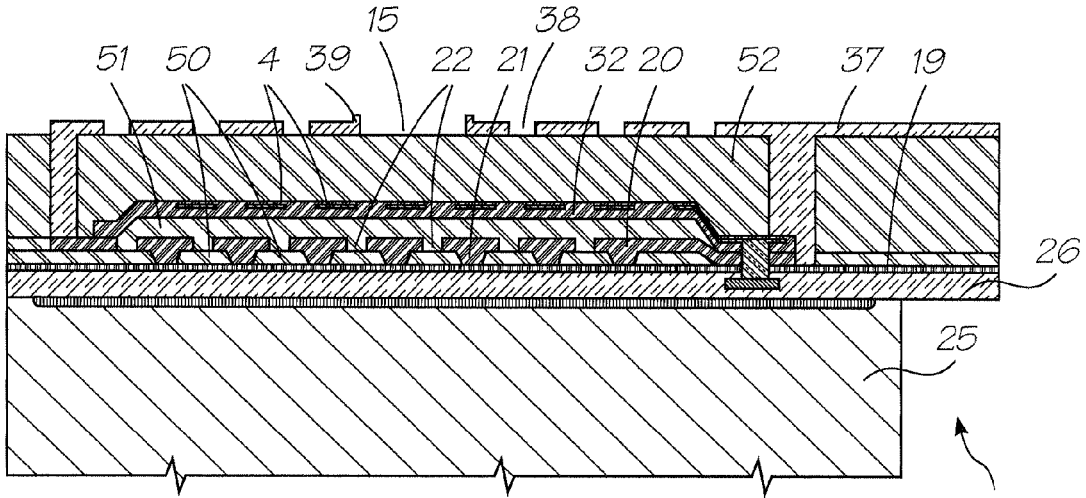

21. Back-etch completely through the silicon wafer 25 (with, for example, an ASE Advanced Silicon Etcher from Surface Technology Systems) using Mask 9. This mask defines the ink inlets which are etched through the wafer 25. The wafer 25 is also diced by this etch. This step is shown in FIG. 73.

22. Back-etch the CMOS oxide layers 26 and subsequently deposited nitride layers 19 and sacrificial layer 50 and 51 through to PTFE 20 and 32 using the back-etched silicon as a mask.

Figure 74:
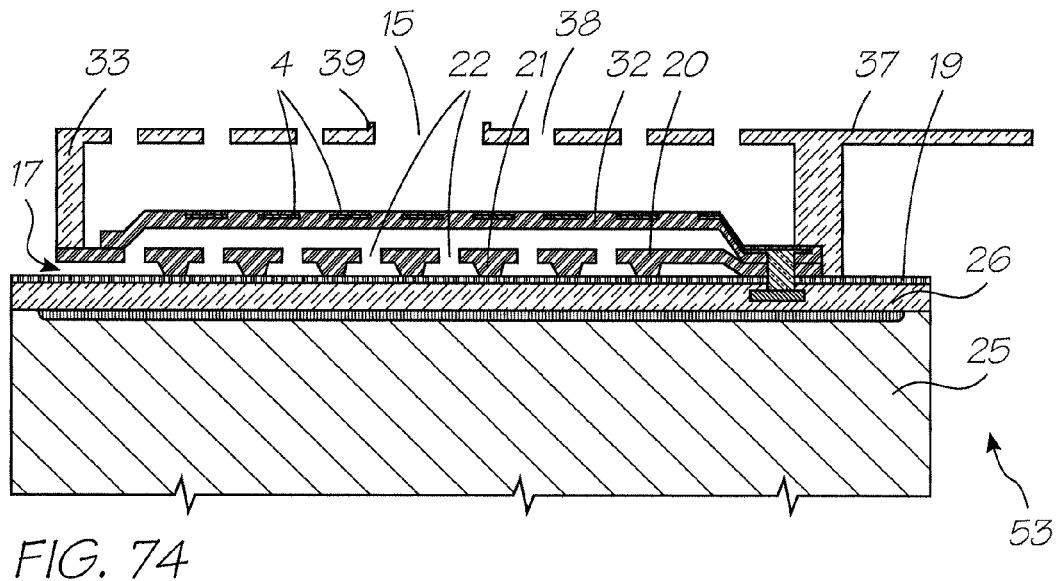

23. Etch the sacrificial material 52. The nozzle chambers are cleared, the actuators freed, and the chips are separated by this etch. This step is shown in FIG. 74.

24. Mount the printheads in their packaging, which may be a molded plastic former incorporating ink channels which supply the appropriate color ink to the ink inlets at the back of the wafer.

25. Connect the printheads to their interconnect systems. For a low profile connection with minimum disruption of airflow, TAB may be used. Wire bonding may also be used if the printer is to be operated with sufficient clearance to the paper.

26. Hydrophobize the front surface of the printheads.

Figure 75:
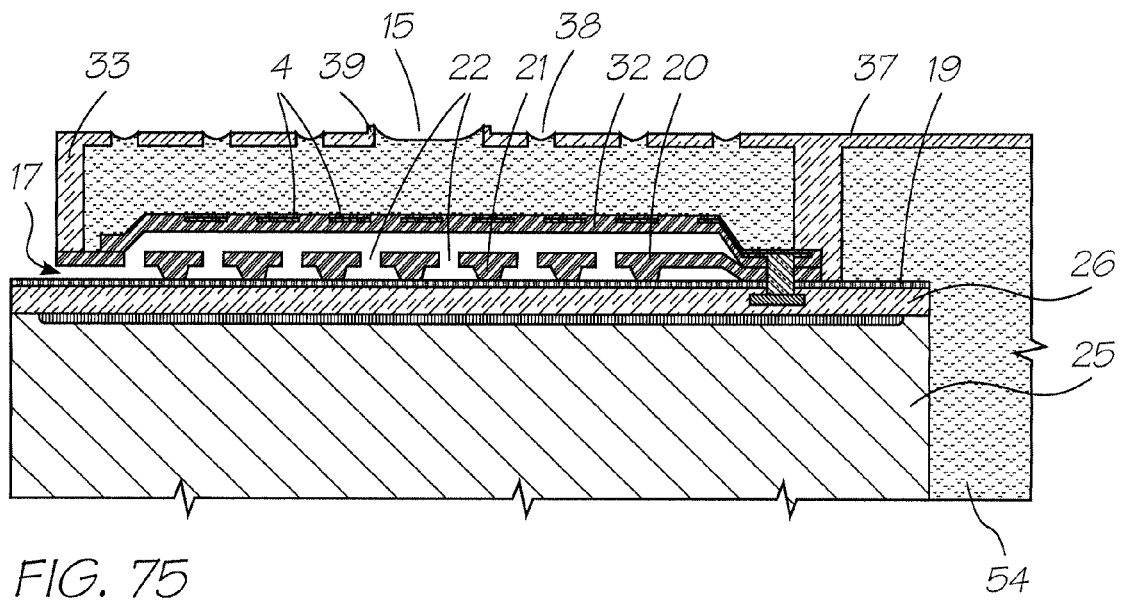

27. Fill the completed printheads with ink 54 and test them. A filled nozzle is shown in FIG. 75.

It will be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

The presently disclosed ink jet printing technology is potentially suited to a wide range of printing systems including: color and monochrome office printers, short run digital printers, high speed digital printers, offset press supplemental printers, low cost scanning printers, high speed pagewidth printers, notebook computers with inbuilt pagewidth printers, portable color and monochrome printers, color and monochrome copiers, color and monochrome facsimile machines, combined printer, facsimile and copying machines, label printers, large format plotters, photograph copiers, printers for digital photographic 'minilabs', video printers, PHOTO CD (PHOTO CD is a registered trademark of the Eastman Kodak Company) printers, portable printers for PDAs, wallpaper printers, indoor sign printers, billboard printers, fabric printers, camera printers and fault tolerant commercial printer arrays.

Ink Jet Technologies

The embodiments of the invention use an ink jet printer type device. Of course many different devices could be used. However presently popular ink jet printing technologies are unlikely to be suitable.

The most significant problem with thermal ink jet is power consumption. This is approximately 100 times that required for high speed, and stems from the energy-inefficient means of drop ejection. This involves the rapid boiling of water to produce a vapor bubble which expels the ink. Water has a very high heat capacity, and must be superheated in thermal ink jet applications. This leads to an efficiency of around 0.02%, from electricity input to drop momentum (and increased surface area) out.

The most significant problem with piezoelectric ink jet is size and cost. Piezoelectric crystals have a very small deflection at reasonable drive voltages, and therefore require a large area for each nozzle. Also, each piezoelectric actuator must be connected to its drive circuit on a separate substrate. This is not a significant problem at the current limit of around 300 nozzles per printhead, but is a major impediment to the fabrication of pagewidth printheads with 19,200 nozzles.

Ideally, the ink jet technologies used meet the stringent requirements of in-camera digital color printing and other high quality, high speed, low cost printing applications. To meet the requirements of digital photography, new ink jet technologies have been created. The target features include:

low power (less than 10 Watts)
high resolution capability (1,600 dpi or more)
photographic quality output
low manufacturing cost
small size (pagewidth times minimum cross section)
high speed (<2 seconds per page).

All of these features can be met or exceeded by the ink jet systems described above.

The invention claimed is:

1. A printhead for an inkjet printer, the printhead comprising:
   an array of ink ejection devices, each ink ejection device having a chamber for holding a quantity of ink, the chamber being partially defined by at least one sidewall, an inlet in fluid communication with the chamber, an actuator disposed in the chambers respectively, a nozzle in fluid communication with each of the chambers respectively, the nozzle is formed in a nozzle plate on the printhead exterior; wherein,
   the inlet defines a flow path into the chamber and has a column feature extending through the flow path, the column feature and the at least one sidewall being integrally formed with the nozzle plate.

2. A printhead according to claim 1 wherein the actuator is configured to displace a surface within the chamber to eject ink from the nozzle.

3. A printhead according to claim 2 wherein the actuator has a heater element for displacing the surface using thermal expansion.

4. A printhead according to claim 3 wherein the surface is positioned in the chamber such that it opposes the nozzle and the flow path from the inlet feeds ink between the nozzle and the surface of the actuator.

5. A printhead according to claim 4 wherein the surface defines a wall of the chamber opposite the nozzle.

6. A printhead according to claim 5 wherein the surface is formed from material including polytetrafluoroethylene.

7. A printhead according to claim 6 wherein during use, the surface reduces the chamber volume to eject ink from the nozzle.

8. A printhead according to claim 7 wherein during use, the surface increases the chamber volume as the actuator returns to its quiescent position after ejecting ink in order to draw refill ink through the baffler structure in the inlet.

9. A printhead according to claim 8 wherein the surface has a quadrilateral geometry and is fixed at two opposing parallel sides such that the surface buckles into the chamber when during actuation, and flattens when returning to its quiescent state.

10. A printhead according to claim 9 wherein the heater element is a conductor with a serpentine geometry extending across most of the surface.

11. A printhead according to claim 10 further comprising an air space on non-ink contacting side of the surface.

12. A printhead according to claim 11 wherein the air space is vented to atmosphere.

13. A printhead according to claim 12 wherein the non-ink contacting side of the surface is hydrophobic for maintaining the air space.

14. A printhead according to claim 13 wherein the column feature creates a flow restriction for the refill ink flow to damp oscillations in ink in the chamber immediately after refill.

15. A printhead according to claim 1 wherein the column feature in a grille for filtering contaminants out of the ink flow into the chamber.

* * * * *